US011970900B2

(12) United States Patent
Wexler

(10) Patent No.: US 11,970,900 B2
(45) Date of Patent: Apr. 30, 2024

(54) FRAMELESS SUPPLEMENTAL WINDOW FOR FENESTRATION

(71) Applicant: WexEnergy LLC, Rochester, NY (US)

(72) Inventor: Ronald M. Wexler, Rochester, NY (US)

(73) Assignee: WEXENERGY LLC, Rochester, NY (US)

( * ) Notice: Subject to any disclaimer, the term of this patent is extended or adjusted under 35 U.S.C. 154(b) by 47 days.

(21) Appl. No.: 17/124,002

(22) Filed: Dec. 16, 2020

(65) Prior Publication Data

US 2021/0102422 A1 Apr. 8, 2021

Related U.S. Application Data

(63) Continuation of application No. 16/265,746, filed on Feb. 1, 2019, now Pat. No. 10,883,303, which is a (Continued)

(51) Int. Cl.
*E06B 3/28* (2006.01)
*E06B 3/30* (2006.01)

(52) U.S. Cl.
CPC ................ *E06B 3/285* (2013.01); *E06B 3/28* (2013.01); *E06B 3/30* (2013.01)

(58) Field of Classification Search
CPC ............... E06B 3/285; E06B 3/28; E06B 3/30
See application file for complete search history.

(56) References Cited

U.S. PATENT DOCUMENTS

| | | | | |
|---|---|---|---|---|
| 1,630,208 A * | 5/1927 | Emil | B60J 10/70 | 52/203 |
| 1,635,906 A * | 7/1927 | Reed | B60S 1/023 | 52/203 |

(Continued)

FOREIGN PATENT DOCUMENTS

| | | | |
|---|---|---|---|
| CN | 203547398 U | 4/2014 | |
| GB | 2095737 A | 10/1982 | |

(Continued)

OTHER PUBLICATIONS

Ballard, D. & Brown, C., 1982, Computer Vision, Chapter 4, pp. 123-131, Prentice Hall.

(Continued)

*Primary Examiner* — Andrew J Triggs
(74) *Attorney, Agent, or Firm* — Troutman Pepper Hamilton Sanders LLP (Rochester)

(57) ABSTRACT

A novel and useful frameless supplemental window for fenestration incorporating infiltration blockers suitable for use with existing windows. The supplemental window, in one embodiment, comprises plastic sheet material with bullnose edging around it. Corner braces add rigidity and strength to corners in several embodiments. An attachment mechanism secured either to the sheet material or the bullnose edge functions to fasten and/or seal the supplemental window to an existing window. Infiltration blockers fastened to the sheet or bullnose prevent or minimize air leakage around various window elements. The bullnose edging and infiltration blockers function to substantially enclose (i.e. trap) a volume of air between the window pane and the plastic sheet material. The supplemental window is configured such that the layer of air enclosed is of an optimum thickness within a preferred range of 0.15 to 0.75

(Continued)

inches to maximize thermal insulation properties of the supplemental window.

17 Claims, 44 Drawing Sheets

Related U.S. Application Data continuation of application No. 15/232,680, filed on Aug. 9, 2016, now Pat. No. 10,196,850, which is a continuation-in-part of application No. 14/644,642, filed on Mar. 11, 2015, now Pat. No. 9,663,983, which is a continuation-in-part of application No. 14/540,030, filed on Nov. 12, 2014, now Pat. No. 9,845,636, which is a continuation-in-part of application No. 14/315,503, filed on Jun. 26, 2014, now Pat. No. 9,234,381, which is a continuation-in-part of application No. 13/735,449, filed on Jan. 7, 2013, now Pat. No. 8,923,650.

(56) References Cited

U.S. PATENT DOCUMENTS 1,636,879 A * 7/1927 Tichota .................... B60J 1/002 52/171.2
1,645,879 A 7/1927 Rudolph
1,679,802 A * 8/1928 Allerheiligen ........... B60J 1/002 52/203
1,681,443 A * 8/1928 Steinman ................. B60J 1/002 52/203
1,694,676 A * 12/1928 Will ......................... B60J 1/002 52/203
1,694,677 A * 12/1928 Will ......................... B60J 1/002 52/203
1,753,618 A * 4/1930 Norbeck .................. B60J 1/002 160/370.21
RE17,821 E * 10/1930 Steinman ................. B60J 1/002 52/203
1,783,861 A * 12/1930 Thiem ...................... B60J 1/002 52/203
1,799,445 A * 4/1931 Stansberry ............... B60J 1/002 52/203
2,053,186 A 9/1936 Frase
3,069,654 A 12/1962 Hough et al.
3,116,519 A 1/1964 Sumner
3,553,913 A 1/1971 Eisenberg
3,616,838 A 11/1971 Barr
3,936,670 A 2/1976 Allen, Sr.
3,978,612 A 9/1976 Young
4,044,813 A * 8/1977 Emmons ................... E06B 9/52 160/354
4,046,246 A 9/1977 Kondur, Jr.
4,056,229 A 11/1977 Jones
4,085,238 A 4/1978 Chenel et al.
4,085,999 A 4/1978 Chahroudi
4,089,143 A * 5/1978 La Pietra .................. E06B 3/28 52/208
4,132,035 A 1/1979 Frambach
4,158,278 A 6/1979 Cardinale et al.
4,182,088 A 1/1980 Ball
4,189,880 A 2/1980 Ballin
4,206,615 A 6/1980 Sobajima et al.
4,210,191 A 7/1980 Li
4,257,419 A 3/1981 Goliner et al.
4,272,934 A 6/1981 Cowden et al.
4,292,773 A 10/1981 Laing et al.
4,295,920 A 10/1981 Bovone
4,351,137 A 9/1982 Enyart et al.
4,361,116 A 11/1982 Kilham
4,372,094 A 2/1983 Boschetti
4,380,140 A 4/1983 Abbott
4,382,588 A 5/1983 Vovk et al.
4,387,542 A 6/1983 Wehr
4,399,640 A 8/1983 Porter
4,406,246 A * 9/1983 DeMeyer ................ B05B 12/20 118/301
4,422,492 A 12/1983 Bledsoe
4,424,653 A 1/1984 Heinen
4,453,585 A * 6/1984 Ruggeberg, Sr. ..... F16B 5/0692 160/354
4,456,224 A 6/1984 Newsome
4,463,942 A 8/1984 Newsome
4,471,589 A 9/1984 Schmislin
4,473,980 A 10/1984 Foster
4,492,355 A 1/1985 Bylin
4,499,703 A * 2/1985 Rundo ................ E06B 3/66328 52/746.1
4,539,516 A 9/1985 Thompson
4,544,587 A * 10/1985 Nesbitt ................... E06B 3/285 428/920
4,561,223 A 12/1985 Gold
4,588,153 A 5/1986 Boston et al.
4,590,883 A 6/1986 Steed et al.
4,598,520 A 7/1986 Elistrom
4,624,539 A 11/1986 King et al.
4,640,619 A 2/1987 Edmark, III
4,648,572 A 3/1987 Sokol
4,684,996 A 8/1987 Baumeister
4,694,973 A 9/1987 Rose et al.
4,702,051 A 10/1987 Miller et al.
4,733,956 A 3/1988 Erickson
4,736,539 A 4/1988 Dickinson
4,841,696 A 6/1989 Miller
4,842,322 A 6/1989 Lu
4,846,429 A 7/1989 Scheurer
4,848,913 A 7/1989 Greiner
4,867,222 A 9/1989 Roman et al.
D304,737 S 11/1989 Mori
4,896,855 A 1/1990 Furnish
4,902,879 A 2/1990 Walters et al.
4,905,569 A 3/1990 Seksaria
4,915,058 A 4/1990 Murray
4,947,596 A 8/1990 Kight
4,959,117 A 9/1990 De Leonibus et al.
4,971,028 A 11/1990 Fagan
4,972,896 A 11/1990 Roberts
4,979,323 A 12/1990 Wenkman et al.
4,984,760 A 1/1991 Cohn et al.
4,991,806 A 2/1991 Nakamura et al.
5,016,937 A 5/1991 White
5,031,684 A * 7/1991 Soong .................... B60J 1/2091 160/368.1
5,039,045 A 8/1991 Adams et al.
5,048,258 A 9/1991 Grether
5,075,991 A 12/1991 Wenkman et al.
5,085,390 A 2/1992 Murphy
5,116,274 A 5/1992 Artwohl et al.
5,126,926 A 6/1992 Chiang
5,137,238 A 8/1992 Huten
D331,211 S 11/1992 Harris
5,168,636 A 12/1992 Golden
5,174,607 A 12/1992 Hill
D332,390 S 1/1993 Adams
5,247,391 A 9/1993 Gormley
D340,181 S 10/1993 Adams
D345,903 S 4/1994 Adams
5,319,879 A 6/1994 Rozycki
5,333,665 A 8/1994 Safar
5,345,743 A 9/1994 Baier
5,363,595 A 11/1994 Wirsing
5,390,454 A 2/1995 Coddens
5,390,837 A 2/1995 Ruffolo, Jr.
5,395,159 A 3/1995 Pinto
5,405,112 A 4/1995 Trethewey
5,429,335 A 7/1995 Cunningham
5,441,095 A 8/1995 Trethewey
5,465,776 A 11/1995 Mirza
5,483,916 A 1/1996 Kolvites et al.
5,485,709 A 1/1996 Guillemet
5,489,890 A 2/1996 Moser
5,495,543 A 3/1996 Alpen

(56) References Cited

U.S. PATENT DOCUMENTS 5,496,598 A 3/1996 Delisle et al.
5,496,643 A 3/1996 Von Alpen
5,511,752 A 4/1996 Trethewey
RE35,291 E 7/1996 Lafond
5,537,483 A 7/1996 Stapleton
5,550,681 A 8/1996 Mazarac
5,551,657 A 9/1996 Liethen
5,552,768 A 9/1996 Mikiel et al.
5,553,420 A 9/1996 Klimek
5,554,421 A 9/1996 Delisle et al.
5,573,214 A 11/1996 Jones et al.
5,588,476 A 12/1996 Trethewey
5,606,129 A 2/1997 Lehmann
5,622,414 A 4/1997 Artwohl
5,640,815 A 6/1997 Chinzi
5,645,254 A 7/1997 Ng et al.
5,649,389 A 7/1997 Coddens
5,732,760 A 3/1998 Pattison
5,737,885 A * 4/1998 Stoyke .................... E06B 3/28 52/202
5,747,816 A 5/1998 Kurosaki
5,761,686 A 6/1998 Bloomberg
5,776,506 A 7/1998 Thomas et al.
5,780,140 A 7/1998 Nilsen
5,784,213 A 7/1998 Howard
5,787,956 A 8/1998 Chen
5,794,404 A * 8/1998 Kim .................... E06B 3/28 52/786.13
5,799,661 A 9/1998 Boyd et al.
5,825,564 A 10/1998 Mazarac
5,897,158 A 4/1999 Henke
5,918,430 A * 7/1999 Rowland .................... E06B 3/28 52/202
5,937,595 A 8/1999 Miller
5,943,117 A 8/1999 Van de Velde
5,950,398 A 9/1999 Hubbard
5,962,072 A 10/1999 Yerman
5,979,889 A 11/1999 Klopfenstein
5,996,951 A 12/1999 O'burill et al.
6,038,351 A 3/2000 Rigakos
6,038,553 A 3/2000 Hyde, Jr.
6,053,356 A 4/2000 Emoff et al.
6,064,393 A 5/2000 Lengyle et al.
6,089,517 A 7/2000 Johnstone
6,148,890 A 11/2000 Lafond
6,155,009 A 12/2000 Pena
6,167,661 B1 1/2001 Christensen
6,180,196 B1 1/2001 Glover et al.
6,192,967 B1 2/2001 Huang
6,247,518 B1 6/2001 Wickersty
6,252,185 B1 6/2001 Shibata et al.
6,259,943 B1 7/2001 Cosman et al.
6,339,909 B1 1/2002 Brunnhofer et al.
6,375,143 B1 4/2002 Burns
6,381,917 B1 5/2002 Thielow et al.
6,400,334 B1 6/2002 Lindenmeier et al.
6,400,848 B1 6/2002 Gallagher
6,412,225 B1 7/2002 Mcmanus
6,464,185 B1 10/2002 Minelli et al.
6,485,106 B1 11/2002 Hermansen et al.
6,502,355 B1 * 1/2003 Bori .................... E06B 9/02 248/363
6,525,651 B1 2/2003 Heller
6,578,326 B1 6/2003 Dyrby et al.
6,603,882 B2 8/2003 Oh et al.
6,606,837 B2 8/2003 Trpkovski et al.
6,625,302 B2 9/2003 Kalscheur et al.
6,625,927 B2 9/2003 Woodruff
6,651,831 B2 11/2003 Samelson
6,658,775 B1 12/2003 Lanzisero
6,662,523 B2 12/2003 Hornung et al.
6,663,064 B1 12/2003 Minelli et al.
6,666,251 B2 12/2003 Ikle
6,669,341 B2 12/2003 Wirt
6,678,062 B2 1/2004 Haugen et al.
6,679,013 B2 1/2004 Hornung
6,688,027 B2 2/2004 Fink
6,694,047 B1 2/2004 Farrokhnia et al.
6,735,341 B1 5/2004 Rorie
6,749,797 B2 6/2004 Kownacki et al.
6,765,569 B2 7/2004 Neumann et al.
6,771,808 B1 8/2004 Wallack
6,798,925 B1 9/2004 Wagman
6,807,294 B2 10/2004 Yamazaki
6,824,000 B2 11/2004 Samelson
6,689,861 B2 12/2004 Kobrehel et al.
6,848,492 B2 * 2/2005 Thomas .................... E06B 3/28 160/368.1
6,869,053 B2 3/2005 Adams, IV
6,877,286 B2 4/2005 Johnson
6,880,790 B2 4/2005 Lutz
6,883,930 B2 4/2005 Saban et al.
6,889,480 B2 5/2005 Guhl et al.
6,898,907 B2 5/2005 Diamond
6,904,162 B2 6/2005 Robar et al.
6,918,426 B1 7/2005 Westby
6,928,776 B2 8/2005 Hornung
6,932,528 B2 8/2005 Relles et al.
6,941,700 B1 9/2005 Kobrehel et al.
6,947,610 B2 9/2005 Sun
6,963,390 B1 11/2005 Smith et al.
6,971,205 B2 12/2005 Woodruff
6,974,518 B2 12/2005 Hornung et al.
6,985,631 B2 1/2006 Zhang
6,991,346 B2 1/2006 Saban et al.
7,000,356 B2 * 2/2006 Tamai .................... B29C 66/65 52/745.1
7,020,320 B2 3/2006 Filatov
7,038,701 B2 5/2006 Niemi
7,059,482 B2 6/2006 Reid et al.
7,064,831 B2 6/2006 Lutz et al.
7,093,643 B2 8/2006 Ikle
7,095,531 B2 8/2006 Mizes et al.
D542,935 S 5/2007 Tedford
7,228,662 B1 6/2007 John
7,229,059 B1 6/2007 Hood
7,231,063 B2 6/2007 Naimark et al.
7,231,081 B2 6/2007 Snow et al.
7,244,325 B2 7/2007 Abate et al.
7,259,727 B2 8/2007 Chan
7,238,202 B2 10/2007 Smith et al.
7,286,208 B2 10/2007 Smith et al.
7,293,368 B1 11/2007 Faulk et al.
7,293,391 B2 11/2007 Guhl et al.
7,301,564 B2 11/2007 Fan
7,311,112 B2 12/2007 Pacheco
7,325,365 B2 2/2008 Warner
7,327,865 B2 2/2008 Fu et al.
7,331,523 B2 2/2008 Meier et al.
7,373,173 B2 5/2008 Brittan et al.
7,377,425 B1 5/2008 Ma et al.
7,380,759 B1 6/2008 Whiteside
7,426,316 B2 9/2008 Vehvilainen
7,455,269 B1 11/2008 Chien et al.
7,464,506 B2 12/2008 Atkinson
7,487,598 B2 2/2009 Krachtus
7,496,241 B1 2/2009 Reneker et al.
7,515,250 B2 4/2009 Smith et al.
7,518,741 B2 4/2009 Miyata
7,593,595 B2 9/2009 Heaney, Jr. et al.
7,606,741 B2 10/2009 King et al.
7,618,349 B1 11/2009 Muderick
7,625,595 B2 12/2009 Zhuang et al.
7,634,128 B2 12/2009 Snow et al.
7,651,063 B2 1/2010 Jenson
7,652,595 B2 1/2010 Niemi et al.
7,665,706 B2 2/2010 Chien et al.
7,675,057 B2 3/2010 Drechsel et al.
7,680,739 B1 3/2010 Venturo et al.
7,705,720 B2 4/2010 Jachmann
7,706,567 B2 4/2010 Mccomb
7,716,875 B2 5/2010 Langner
7,735,271 B1 6/2010 Shipston et al.
7,751,645 B2 7/2010 Reneker et al.

(56) References Cited

U.S. PATENT DOCUMENTS 7,763,334 B2 7/2010 Berkowitz
7,769,236 B2 8/2010 Fiala
7,770,353 B2 8/2010 Olsen
7,778,457 B2 8/2010 Nepomniachtchi et al.
7,793,831 B2 9/2010 Beskitt
7,805,897 B2 10/2010 Holland et al.
7,806,484 B1 10/2010 Young
7,818,927 B1 10/2010 John
7,829,003 B2 11/2010 Debiasi et al.
7,836,638 B2 11/2010 Ogieglo
7,847,711 B2 12/2010 Niemi et al.
7,866,101 B2 1/2011 Boggs, Jr.
7,885,451 B1 2/2011 Walls et al.
7,886,651 B2 2/2011 Hall
7,893,963 B2 2/2011 Gallagher et al.
7,899,512 B2 3/2011 Labadie et al.
7,900,408 B2 3/2011 Holland et al.
7,912,320 B1 3/2011 Minor
7,912,743 B2 3/2011 Kollman
7,949,176 B2 5/2011 Nepomniachtchi
7,950,716 B2 5/2011 Schlater
7,953,268 B2 5/2011 Nepomniachtchi
7,957,582 B2 6/2011 Li et al.
7,963,075 B2 6/2011 Howland
7,978,900 B2 7/2011 Nepomniachtchi et al.
7,983,468 B2 7/2011 Ibikunle et al.
7,986,826 B2 7/2011 Li et al.
7,996,317 B1 8/2011 Gurz
8,000,514 B2 8/2011 Nepomniachtchi et al.
8,039,102 B1 10/2011 Lavature et al.
8,040,530 B2 10/2011 Cooper
8,104,692 B2 1/2012 Sjolander et al.
8,109,235 B2 2/2012 Lipscomb et al.
8,118,216 B2 2/2012 Hoch et al.
8,126,260 B2 2/2012 Wallack
8,151,540 B2 4/2012 Paz
8,151,542 B2 4/2012 Trpkovski
8,151,687 B2 4/2012 Hall
8,163,224 B2 4/2012 Higashi et al.
8,171,681 B2 5/2012 Miller
8,180,137 B2 5/2012 Faulkner et al.
8,181,400 B2 5/2012 Kindschuh
8,206,631 B1 6/2012 Sitti et al.
8,235,284 B1 8/2012 Prasad et al.
8,237,788 B2 8/2012 Cooper et al.
8,245,619 B2 8/2012 Hall
8,249,691 B2 8/2012 Chase et al.
8,254,663 B2 8/2012 Kataoka et al.
8,256,122 B2 9/2012 Hatfield
8,272,178 B2 * 9/2012 Pardue ...................... E06B 3/28
52/204.597
8,276,498 B1 10/2012 Hannibal
8,297,003 B2 10/2012 Kollegger et al.
8,303,071 B2 11/2012 Eun
8,316,613 B2 11/2012 Hall
8,326,015 B2 12/2012 Nepomniachtchi
8,339,642 B2 12/2012 Ono
8,340,452 B2 12/2012 Marchesotti
8,379,914 B2 2/2013 Nepomniachtchi et al.
8,393,113 B2 3/2013 Rex
8,393,584 B2 3/2013 Burns
8,398,909 B1 3/2013 Sitti et al.
8,402,714 B2 3/2013 Labrecque
8,402,716 B2 3/2013 Tinianov et al.
8,428,393 B2 4/2013 Kraft
8,439,154 B1 5/2013 Lewis et al.
8,472,009 B2 6/2013 Takenaka
8,490,345 B2 7/2013 Fields
8,490,346 B2 7/2013 Wedren
8,510,283 B2 8/2013 Hull
8,550,140 B2 10/2013 Kelly
8,553,280 B2 10/2013 Hoover et al.
8,572,911 B1 11/2013 Binienda
8,582,087 B2 11/2013 Kaufman et al.
8,586,193 B2 11/2013 Rapp et al.
8,590,229 B2 11/2013 Taylor et al.
8,590,261 B2 11/2013 Deiss et al.
8,595,994 B1 12/2013 Grommesh et al.
8,596,024 B2 12/2013 Trpkovski
8,620,045 B2 12/2013 Adams
8,643,933 B2 2/2014 Brown
8,649,052 B2 2/2014 Hoover et al.
8,656,665 B2 2/2014 Rotter
8,695,309 B2 4/2014 Deiss et al.
8,713,865 B2 5/2014 Hall
8,720,077 B1 5/2014 Fallisgaard
8,733,040 B2 5/2014 Paetow et al.
8,757,186 B2 6/2014 Vulpitta et al.
8,789,343 B2 7/2014 Zurn et al.
8,795,568 B2 8/2014 Trpkovski
8,839,564 B2 9/2014 Happel et al.
8,844,217 B2 9/2014 Marchand
8,851,423 B1 10/2014 Lewis et al.
8,869,473 B2 10/2014 Melesky
8,875,774 B1 11/2014 Flores
8,923,650 B2 12/2014 Wexler
9,217,276 B1 12/2015 Ory
9,234,381 B2 1/2016 Wexler
9,353,567 B2 5/2016 Pardue
9,416,586 B1 8/2016 Ory
9,458,662 B2 10/2016 Marchand
9,493,978 B2 11/2016 Welyki
10,280,679 B2 7/2019 Kassas
2001/0009179 A1 7/2001 Huang
2002/0012462 A1 1/2002 Fujiwara
2002/0041717 A1 4/2002 Murata et al.
2002/0044689 A1 4/2002 Roustaei et al.
2002/0067846 A1 6/2002 Foley
2002/0100562 A1 8/2002 Ikle
2002/0150279 A1 10/2002 Scott et al.
2002/0154283 A1 10/2002 Tanaka et al.
2002/0189743 A1 12/2002 Hornung et al.
2003/0024481 A1 2/2003 Kalscheur et al.
2003/0041557 A1 3/2003 Trpkovski et al.
2003/0053029 A1 3/2003 Wirth
2003/0086615 A1 5/2003 Dance et al.
2003/0089054 A1 5/2003 Hornung
2003/0142862 A1 7/2003 Snow et al.
2003/0145532 A1 8/2003 Kownacki et al.
2003/0151674 A1 8/2003 Lin
2003/0156201 A1 8/2003 Zhang
2003/0161523 A1 8/2003 Moon et al.
2003/0177100 A1 9/2003 Filatov
2003/0226332 A1 12/2003 Trpkovski et al.
2004/0012679 A1 1/2004 Fan
2004/0028258 A1 2/2004 Naimark et al.
2004/0080749 A1 4/2004 Lutz et al.
2004/0096578 A1 5/2004 Colwell
2004/0123627 A1 7/2004 Larsen
2004/0159057 A1 8/2004 Hornung
2004/0165024 A1 8/2004 Vilanova et al.
2004/0221967 A1 11/2004 Ikle
2004/0226208 A1 11/2004 Kownacki et al.
2004/0233280 A1 11/2004 Aoyama
2004/0261959 A1 12/2004 Forcelli
2005/0065893 A1 3/2005 Josephson
2005/0097046 A1 5/2005 Singfield
2005/0099446 A1 5/2005 Mizes et al.
2005/0143136 A1 6/2005 Lev et al.
2005/0194086 A1 9/2005 Abate et al.
2005/0196071 A1 9/2005 Prakash et al.
2005/0220324 A1 10/2005 Klein et al.
2005/0222793 A1 10/2005 Lloyd et al.
2005/0223663 A1 10/2005 Schuler
2005/0228256 A1 10/2005 Labadie et al.
2005/0228270 A1 10/2005 Lloyd et al.
2005/0228614 A1 10/2005 Usbeck et al.
2005/0237541 A1 10/2005 Smith et al.
2005/0242186 A1 11/2005 Ohbuchi
2005/0261990 A1 11/2005 Gocht et al.
2005/0264783 A1 12/2005 Smith et al.
2006/0002630 A1 1/2006 Fu et al.
2006/0045379 A1 3/2006 Heaney et al.
2006/0124164 A1 6/2006 Pacheco

(56) References Cited

U.S. PATENT DOCUMENTS

2006/0127612 A1 6/2006 Larsen
2006/0140504 A1 6/2006 Fujimoto et al.
2006/0164682 A1 7/2006 Lev
2006/0177118 A1 8/2006 Ibikunle et al.
2006/0210192 A1 9/2006 Orhun
2006/0221415 A1 10/2006 Kawamoto
2006/0249859 A1 11/2006 Eiles et al.
2006/0291727 A1 12/2006 Bargeron
2007/0017997 A1 1/2007 Talley et al.
2007/0042703 A1 2/2007 Lee
2007/0053574 A1 3/2007 Verma et al.
2007/0065004 A1 3/2007 Kochi et al.
2007/0076940 A1 4/2007 Goodall et al.
2007/0084911 A1 4/2007 Crowell
2007/0100490 A1 5/2007 Hartt et al.
2007/0168153 A1 7/2007 Minor et al.
2007/0171288 A1 7/2007 Inoue et al.
2007/0188633 A1 8/2007 Mandy et al.
2007/0199259 A1* 8/2007 Parsley .................... E06B 3/28 52/203
2007/0206877 A1 9/2007 Wu et al.
2007/0269103 A1 11/2007 Snow et al.
2007/0288382 A1 12/2007 Narayanan et al.
2008/0007705 A1 1/2008 Smith et al.
2008/0062437 A1 3/2008 Rizzo
2008/0063767 A1 3/2008 Sus et al.
2008/0127581 A1 6/2008 Walters
2008/0183576 A1 7/2008 Kim et al.
2008/0190070 A1 8/2008 Duncan et al.
2008/0198177 A1 8/2008 Niemi et al.
2008/0245002 A1 10/2008 Van De et al.
2008/0287807 A1 11/2008 Chase et al.
2008/0317333 A1 12/2008 Li et al.
2009/0074251 A1 3/2009 Sears et al.
2009/0074300 A1 3/2009 Hull et al.
2009/0076650 A1 3/2009 Faes
2009/0092322 A1 4/2009 Erol et al.
2009/0185241 A1 7/2009 Nepomniachtchi
2009/0185736 A1 7/2009 Nepomniachtchi
2009/0185737 A1 7/2009 Nepomniachtchi
2009/0185738 A1 7/2009 Nepomniachtchi
2009/0225165 A1 9/2009 Reneker et al.
2009/0238446 A1 9/2009 Kataoka et al.
2009/0249694 A1 10/2009 Nilsson
2009/0250576 A1 10/2009 Fullerton et al.
2009/0261158 A1 10/2009 Lawson
2010/0045701 A1 2/2010 Scott et al.
2010/0073735 A1 3/2010 Hunt et al.
2010/0079683 A1 4/2010 Kobori et al.
2010/0104171 A1 4/2010 Faulkner et al.
2010/0122782 A1 5/2010 Fox et al.
2010/0150424 A1 6/2010 Nepomniachtchi et al.
2010/0172546 A1 7/2010 Sharp
2010/0176539 A1 7/2010 Higashi et al.
2010/0214344 A1 8/2010 Sjolander et al.
2010/0287851 A1 11/2010 Kindschuh
2010/0294154 A1 11/2010 Rapkin et al.
2011/0009929 A1 1/2011 Nuccitelli et al.
2011/0030290 A1 2/2011 Slovak et al.
2011/0071524 A1 3/2011 Keller
2011/0078964 A1* 4/2011 Pardue ................. E06B 7/2318 52/202
2011/0079011 A1 4/2011 Sabo
2011/0091092 A1 4/2011 Nepomniachtchi et al.
2011/0098722 A1 4/2011 Ulfarsson et al.
2011/0102817 A1 5/2011 Hoover et al.
2011/0116693 A1 5/2011 Li et al.
2011/0118597 A1 5/2011 Labadie et al.
2011/0194750 A1 8/2011 Nepomniachtchi
2011/0208043 A1 8/2011 Chase et al.
2011/0258921 A1 10/2011 Rotter
2011/0298721 A1 12/2011 Eldridge
2011/0304886 A1 12/2011 Hoover et al.
2012/0105825 A1 5/2012 Gogolla et al.
2012/0113489 A1 5/2012 Heit et al.
2012/0125419 A1 5/2012 Pfeiffer et al.
2012/0154784 A1 6/2012 Kaufman et al.
2012/0217152 A1 8/2012 Miller
2012/0262553 A1 10/2012 Chen et al.
2012/0285588 A1 11/2012 Sheppard
2012/0319320 A1 12/2012 Sitti et al.
2012/0324806 A1 12/2012 Chen
2012/0328822 A1 12/2012 Sitti et al.
2013/0011069 A1 1/2013 Quan et al.
2013/0022231 A1 1/2013 Nepomniachtchi et al.
2013/0051610 A1 2/2013 Roach et al.
2013/0060146 A1 3/2013 Yang et al.
2013/0085935 A1 4/2013 Nepomniachtchi et al.
2013/0157493 A1 6/2013 Brown
2013/0191292 A1 7/2013 Meadow et al.
2013/0251937 A1 9/2013 Sitti et al.
2014/0005524 A1 1/2014 Ulfarsson et al.
2014/0027293 A1 1/2014 Lu
2014/0268247 A1 9/2014 Sakaida
2014/0307100 A1 10/2014 Myllykoski et al.
2014/0331578 A1 11/2014 Wexler et al.
2015/0068140 A1 3/2015 Wexler
2015/0110421 A1 4/2015 Wexler
2015/0184444 A1 7/2015 Wexler
2015/0369593 A1 12/2015 Myllykoski
2016/0044301 A1 2/2016 Jovanovich et al.
2016/0104288 A1 4/2016 Wexler
2016/0134860 A1 5/2016 Jovanovic et al.
2016/0348418 A1 12/2016 Wexler
2016/0371855 A1 12/2016 Jovanovic et al.
2021/0102422 A1* 4/2021 Wexler ..................... E06B 3/30

FOREIGN PATENT DOCUMENTS

WO WO2012/078249 6/2012
WO WO2013155379 10/2013
WO WO2014/123936 8/2014
WO WO2014/144136 9/2014
WO WO2014/152485 9/2014

OTHER PUBLICATIONS

Rulerphone, Measure Anything Your iPhone can Take a Picture of, accessed via http://www.benkamens.com/rulerphone, Jan. 31, 2013.
Uphotomeasure, 2010, Photograph it. It's measured, accessed via http://www.uphotomeasure.com/UPM_a2/index.html, Jan. 25, 2013.
Lamont, S. et al., U.S. Appl. No. 61/623,178, filed Apr. 12, 2012, "Orthographic Image Capture System".
Myllykoski K. M., U.S. Appl. No. 61/732,636, filed Dec. 3, 2012, "A Smart Picture System That Creates Digital Pictures that Can Be Accurately Measured".
International Search Report for PCT/US2014/010203, dated Apr. 18, 2014.
European Search Report for EP Application No. 14735142.3, dated Jul. 11, 2016.
International Search Report and Written Opinion for corresponding PCT/US2018/034183, dated Aug. 3, 2018.
China Office Action for corresponding China application No. 201880050222.0 dated Jun. 3, 2021.
India Office Action for corresponding India application No. 201947053616 dated Aug. 3, 2021.
Informal translation of Brazilian Patent Application No. BR1120190251529 Office Action (dated Sep. 20, 2022).

* cited by examiner

FRAMELESS SUPPLEMENTAL WINDOW FOR FENESTRATION

This application is a continuation of U.S. application Ser. No. 16/265,746, filed Feb. 1, 2019; which is a continuation application of U.S. application Ser. No. 15/232,680, filed Aug. 9, 2016, now U.S. Pat. No. 10,196,850; which is a continuation-in-part of U.S. application Ser. No. 14/644, 642, filed Mar. 11, 2015, now U.S. Pat. No. 9,663,983; which is a continuation-in-part of U.S. application Ser. No. 14/540,030, filed Dec. 12, 2014 now U.S. Pat. No. 9,845, 636; which is a continuation-in-part of U.S. application Ser. No. 14/315,503, filed Jun. 26, 2014, now U.S. Pat. No. 9,234,381; which is a continuation-in-part of U.S. application Ser. No. 13/735,449, filed Jan. 7, 2013, now U.S. Pat. No. 8,923,650; all of which are incorporated herein by reference in their entirety.

FIELD

The present invention relates generally to fenestration and in particular to a frameless supplemental window incorporating infiltration blockers and related method of construction and mounting for use with existing windows.

BACKGROUND

In recognition of the ecological and cost impact of fossil fuels and other conventional energy sources, significant effort has been expended in developing methods for more efficient use of such energy sources. An important area of energy use for which greater energy efficiency is needed is the heating and cooling of spaces in which human activity is desired. Many approaches have been developed to decrease the amount heat transfer through the shell of such spaces. One of the most active and important areas of activity is the transfer of energy through fenestration where the activity has included use of window films or inserts, increasing the number of glazings per opening, and window treatments such as drapes, blinds, etc. While these approaches have shown considerable improvement in building energy efficiency, significant problems prevent more widespread and effective utilization.

Several problems exist in the approaches to minimizing heat transfer through fenestration. In particular for existing windows, it is desirable to maintain undistorted optical transparency, operation of the window treatments and windows and the aesthetics of the interior view of the window while providing thermal insulation. Furthermore, reuse of the insulating materials is highly desirable so that new materials do not need to be purchased each season. Supplemental windows known in the art either require the end user to customize one or more supplemental windows features to the dimensions of each window at the site of installation or are designed in ways that make size customization difficult in manufacturing.

When adding supplemental window features such as films, film support elements and window treatments, ease of installation (including measurement and fabrication), reusability and storage and aesthetics during and after use are very important while obtaining the thermal and radiation insulation desired. With window films intended for creating an additional "dead air" insulating layer adjacent to the window as well as window treatments, the dimension of the "dead air" space perpendicular to the window pane is subject to the film attachment areas that are generally dictated by existing features of the window and/or frame. In addition, such window films often must be mounted in such a way that inhibits the operability of non-fixed windows. Further, such window films are generally made for use only on the interior side of the window pane. Other window films, such as tints, infrared or ultraviolet reflective, or low-e films, generally adhere directly to the window pane and do not allow for simultaneous formation of an insulating layer.

Another problem with existing solutions is that most do not have any features designed to eliminate or reduce air flow or leakage around various elements of the window while maintaining operability of the window and associated window treatments with the supplemental window remaining in place. For example, it is common in sliding windows to have air leakage through the gaps between the jamb and the window frame, between the upper and lower sashes, between the sashes and the parts of the window frame that are in contact with them when in a closed state.

There is thus a need for a reduced cost frameless supplemental window that overcomes the disadvantages of prior art supplemental windows and that is effective at minimizing heat loss, retaining transparency and minimizing refractive index changes in the non-perimeter area of the window pane, is relatively simple to manufacture, prevents or minimizes air leakage between window elements, is easy to install and remove and does not impede the operability of the existing window.

SUMMARY

The present invention is a frameless supplemental window for fenestration suitable for use with existing windows. The supplemental window, in one embodiment, comprises sheet material with an edging seal around it. In several embodiments, corner braces add rigidity and strength to corners in several embodiments. In other embodiments, corner braces also provide a portion of the corner closure of the edging seal. An attachment mechanism secured either to the sheet material or the edging functions to fasten and/or seal the supplemental window to an existing window. The edging functions to substantially enclose (i.e., trap) a volume of air between the window pane and the plastic sheet material. The supplemental window is configured such that the layer of trapped air is of an optimum thickness within a preferred range of 0.15 to 0.75 inches to maximize thermal insulation properties and mechanical stability of the supplemental window when mounted.

Several advantages of the supplemental window include (1) frameless designs that significantly reduce material cost; (2) decreased heat transfer through the window pane area; (3) retaining undistorted visual transparency through the window; (4) decreased heat transfer through the various window elements other than the window pane by the use of infiltration blockers; (5) having a reduced cost of manufacture; (6) ease of mounting and dismounting; (7) designable so as to not impede the operability of the existing window or associated window treatments; and (8) self-adjusting dimensions to fit the window while allowing for measurement error.

The aesthetics of the fenestration during and after use of the supplemental window can be maintained. This relates to maintaining the appearance of the interior view of the fenestration and its immediate surrounding as well as the ability to see through the fenestration when desired. Also, it relates to the ability to return the fenestration to its original state when the supplemental element is not being used without the need to repair mounting areas.

Operability of the fenestration and associated treatment during use of the supplemental window can be maintained without the need to demount the entire supplemental window. Since the fenestration is often designed for opening and closing, it is beneficial to maintain this capability while the supplemental window is in place or to design the supplemental window to be very easily dismounted and remounted. This would allow for temporarily bringing fresh air into the space adjacent to the fenestration. This can be particularly useful during periods of moderate temperatures within a heating or cooling season.

The supplemental window also provides the ability to gain energy efficiency improvement during both heating and cooling seasons. The advent of spectrally selective, infrared reflective and low-emissivity coatings or laminates for window films provides for additional energy savings. Incorporation of such coatings or films in the sheet, infiltration blocker and/or edging provides an opportunity for combining these additional energy saving technologies with the insulating properties provided by the substantially enclosed air volume provided by the present invention. Optimal placement of such films, however, requires the ability to move such films to either keep heat in during the heating season or keep heat out in the cooling season.

There is thus provided in accordance with the invention, a supplemental window apparatus, comprising a substantially non porous sheet material having dimensions defining a perimeter area of a window pane, a spacer and attachment mechanism operative to releasably attach the supplemental window apparatus to the window pane, wherein the spacer and attachment mechanism determine the distance between the window pane and the sheet material when the supplemental window apparatus is attached to the window pane, an infiltration blocker configured to substantially enclose the outward interior side of a volume of gas between the window pane and the sheet material when the supplemental window apparatus is installed, inhibit air leakage around one or more window elements into an interior space by simultaneous contact with both a movable window element and a stationary window element, and wherein the sheet material is positioned substantially parallel to the window pane.

There is also provided in accordance with the invention, a supplemental window apparatus, comprising an infiltration blocker constructed from a substantially non porous material, an attachment mechanism operative to releasably attach the infiltration blocker to an interior or inward facing surface of at least one of a window element and a second supplemental window apparatus, with a portion of the infiltration blocker residing on the interior side of the interface defined by two window elements, and wherein the infiltration blocker is operative to inhibit air leakage around one or more window elements into an interior space by simultaneous contact with at least one of, both a movable window element and a stationary window element, and both at least a portion of a second supplemental window apparatus and a stationary window element.

There is further provided in accordance with the invention, a supplemental window apparatus for improving the thermal insulating properties of an existing window, comprising a substantially non porous sheet material having dimensions defining a perimeter area of a window pane, an edge seal attached to the sheet material and operative to substantially enclose a volume of air between the window pane and the sheet material, a corner brace positioned in one or more corners of the supplemental window apparatus, each corner brace operative to provide support to the sheet material in the corner regions and to substantially block air movement through the supplemental window in the corner regions, a spring affixed to the pane side of the sheet material and configured to apply an outward force against a respective corner brace, an infiltration blocker configured to substantially enclose the outward interior side of a volume of gas between the window pane and the sheet material when the supplemental window apparatus is installed, inhibit air leakage around one or more window elements into an interior space by simultaneous contact with both a movable window element and a stationary window element, wherein attachment to the existing window is made via an adhesive strip located between the existing window element and at least one of the edge seal and the infiltration blocker, wherein a distance between the window pane and the sheet material when the supplemental window apparatus is installed is determined by at least one of the edge seal, the corner brace and the spring, and wherein the sheet material is positioned substantially parallel to the window pane.

BRIEF DESCRIPTION OF THE DRAWINGS

The invention is herein described, by way of example only, with reference to the accompanying drawings, wherein.

DETAILED DESCRIPTION

Figure 1:
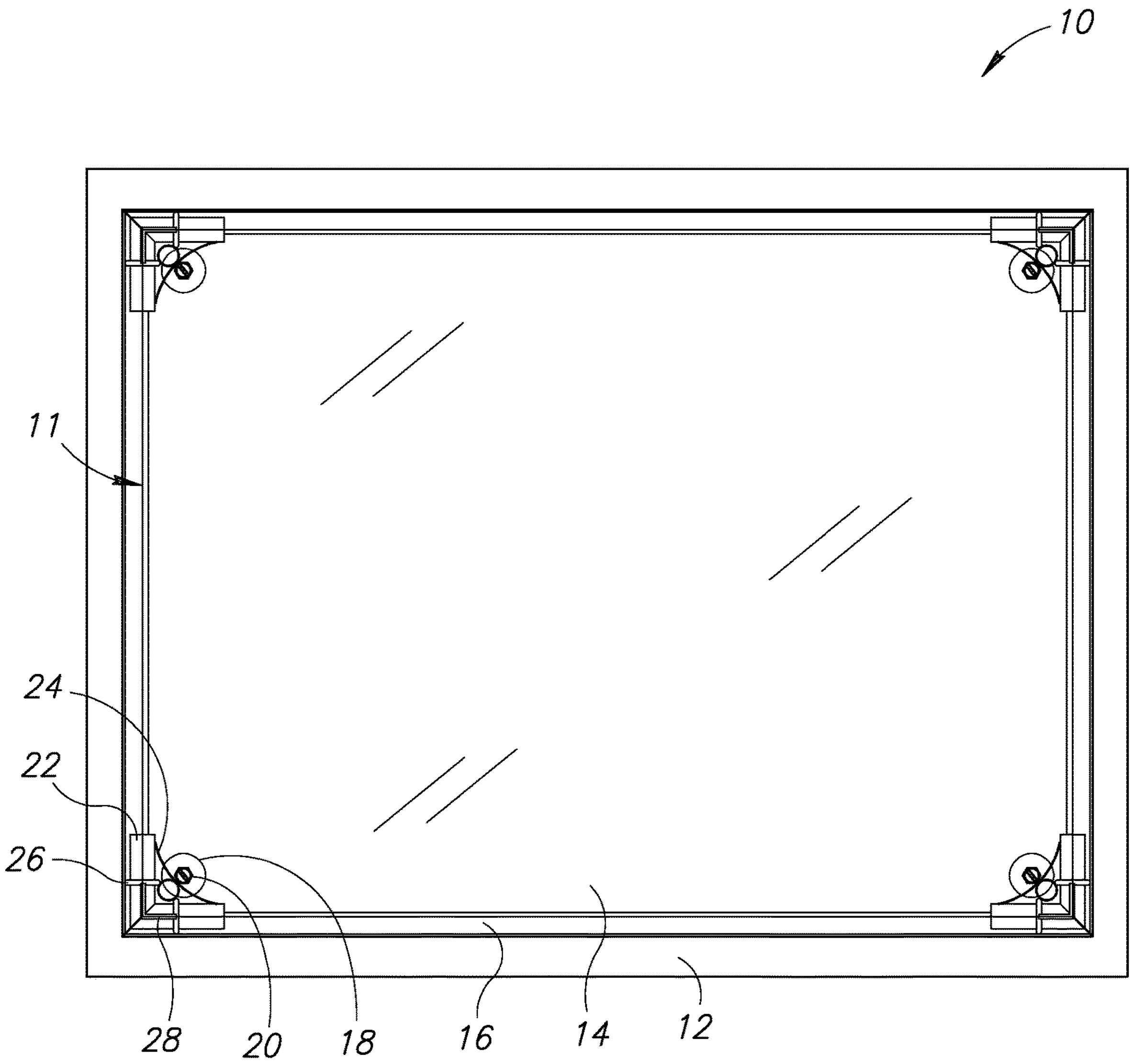
FIG. 1 is a diagram illustrating a front view of a first example frameless supplemental window.

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The present invention provides for several embodiments for mounting of sheet material in or over fenestration and substantially enclosing or trapping a volume of gas in or adjacent to the fenestration. The term "frameless supplemental window" in the present invention refers to a supplemental window that lacks a substantially rigid or non-flexible structure completely surrounding an area that is approximately the same size as the window pane on which the supplemental window is to be mounted.

In the present invention, in one embodiment, sheet material, a spacer or post of predetermined dimension perpendicular to the sheet material, a bullnose edge seal, a corner brace, spring mechanism and infiltration blocker are combined together to provide a frameless supplemental window unit that substantially encloses and traps a volume of gas (typically air but not limited to air). Optionally, the sheet material (typically clear but may be tinted or coated) may function as a portion of the edge seal. In one embodiment, the post may contact or attach to the window pane of the fenestration. The sheet material can be any desired type of material such as, but not limited to, clear, non-opaque, translucent, low emissivity, semi-transparent, opaque, visible light transmitting, infrared reflecting or a material having minimal refractive distortion when viewed from the interior side of the window, etc. The extent of visible light transmission properties of the sheet material is not critical to the insulation aspect of the invention, although it is preferred to maintain as much as much undistorted optical clarity as possible to maintain the function of the window for viewing through the fenestration.

Note that such embodiments may be specified using manual measurement of the fenestration or portions thereof or, specified and delivered using the methods described in U.S. Pat. No. 8,923,650 to Wexler cited supra and U.S. application Ser. No. 14/320,973, entitled "System And Method Of Measuring Distances Related To An Object" to Wexler et al., both of which are incorporated herein by reference in their entirety. In addition to these measurement methods, the methods described in U.S. application Ser. No. 14/320,973 may be used to confirm the accuracy of manual measurements taken by the user that are provided to the service provider or fabricator as well as to provide feedback to the manual measurement taker regarding such accuracy, optionally including a request for re-measurement is the measurements do not pass certain criteria.

Various terms are used in the art to describe aspects of fenestration and windows in particular. In describing the present invention, "window" may refer to window components within a single frame that includes one light or multiple lights that are not separated by a mullion or transom. In describing the present invention, the terms "interior" and "exterior" are used to describe the indoor side and outdoor side, respectively, relative to a perimeter wall in which the fenestration resides. "Inward" and "outward" refers to location in a direction closer to and further from, respectively, the center of the fenestration. The term "window element" refers to any window part including but not limited to the window pane, frame, sash, rail, style, muntin, track, check rail, jamb, or parts thereof.

Note that various people or entities may perform different aspects of the present invention. An "end user" refers to a person or entity or their designee, that specifies, orders, installs or uses the supplemental parts of the present invention and may perform digital image capture, supply metadata and/or confirmation of design steps of the process of the present invention. A "service provider" refers to a person or entity performing a service that is part of the method of the present invention such as reviewing and accepting or confirming orders from an end user, providing image processing capability, designing (as a "designer"), fabricating (as a "fabricator") or installing (as an "installer") parts, or providing support for installation of such parts.

Each supplemental window embodiment creates a substantially "dead air" space or layer of substantially enclosed or trapped air adjacent to a window pane, preferably having a dimension between the window pane and clear sheet in the range of approximately 0.15 to 0.75 inches that provides insulating properties and preferably inhibits the formation of convective loops. A dimension less than about 0.15 inches will likely impact insulating properties and a dimension greater than about 0.75 inches will likely lead to undesirable convective heat transfer. Such "dead air" spaces optionally may have a desiccant material contacting the "dead air" space to keep the humidity of the space low and decrease the possibility of condensation forming in the space, particularly when one side of the space is a window pane in direct contact with the outdoors.

To allow for actuation of window or window treatment operating elements with the supplemental parts mounted, the plastic sheet may be mounted such that the entire supplemental window unit, or a portion thereof is mounted so as not to interfere with movement or actuation of any window treatment, window treatment operating elements or moveable portions of the window. One aspect of the current invention that enables opening and closing of the window, especially for vertical or horizontal sliding windows, is the capability for easy mounting and dismounting of part of the custom supplemental window apparatus.

A diagram illustrating a front interior view of a first example frameless supplemental window is shown in FIG. 1. The window, generally referenced 10, comprises an existing window frame or sash 12, a frameless supplemental window 11 mounted on the existing window and window pane (not in view) exterior to the supplemental window 11. Note that the supplemental window may be mounted to the exterior side of the window pane such that the window pane faces the interior side of the supplemental window. The supplemental window comprises sheet material 14, a bullnose edge or seal 16, corner brace 22, post 20 with attachment mechanism 18 (e.g., suction cup), spring 24 and seals 26 and 28 (e.g., pile, O-ring, gel, dry adhesive material, foam, etc.). Note that the sheet material defines a perimeter area that extends between the edge of the sheet projected onto the window pane and the nearest edge of the window pane. Also, note that while the seal 16 of this embodiment and seal embodiments described infra show a bullnose shape and a spiral shape, other shapes that seal to the sheet and form an enclosed space with the window pane are contemplated by and may be used in the current invention. Such other shapes may include, but are not limited to, "[" shape, "<" shape or shape edge or seal. When attaching a seal to a planar sheet, it may be beneficial to form a cross-sectional seal shape having a planar portion for attaching to the sheet and a corner that is bent or formed to aid in conforming to a corner brace or closure such as described infra.

The sheet material may comprise, for example, a polymer plastic material such as polyethylene terephthalate (PET), polyethylene terephthalate glycol (PET-G) or polypropylene (UV stabilized preferred) or thin flexible glass such as is known in the art. When using polymer plastic material such as PET, the recommended thickness is in the range from about 3 to about 20 mil. When forming the spacer and the foot from the sheet material such that all are formed from a single continuous piece of material, 10 to 20 mil thickness is preferred to minimize optical distortions and keep such distortions localized to the perimeter area. Also, this preferred thickness range provides for 1) a thin slot dimension and smaller constraint step when a constraint is used so that less material use is required; 2) improved user handling compared to smaller thicknesses; 3) maintaining a light weight; and 4) ease of forming the spacer and foot. Note that polymer plastic sheets thicker than approximately 60 mil may lead to pane attachment failure and more difficult handling for the user. Sheets thinner than about 3 mil may lead to handling difficulty in manufacture, ease of out of plane deformation/deflection when mounted and reduced durability. The factors used in determining the thickness include ease of handling by the user, weight constraint for reduced cost, the mounting integrity and the size of the attachment (i.e., higher weight may necessitate larger attachment area to the window pane. For example, to stay within a standard "mini" size suction cup total rating of about 2 pounds for four suction cups, a sheet thickness less than about 70 mil is required for PET material or less than about 40 mil for flexible glass for a sheet area of about two square feet). When using other attachment mechanisms, however, such as dry adhesive or VHB acrylic adhesive mechanisms describe infra, thicker sheet material may be used as a result of high load capability and larger attachment surface area. The combination of thermally shaped seal beam strength and sheet thickness provides ease of handling. For PET, a sum of the edging seal and sheet thicknesses is preferably greater than about 6 mil for ease of handling.

Figure 2:
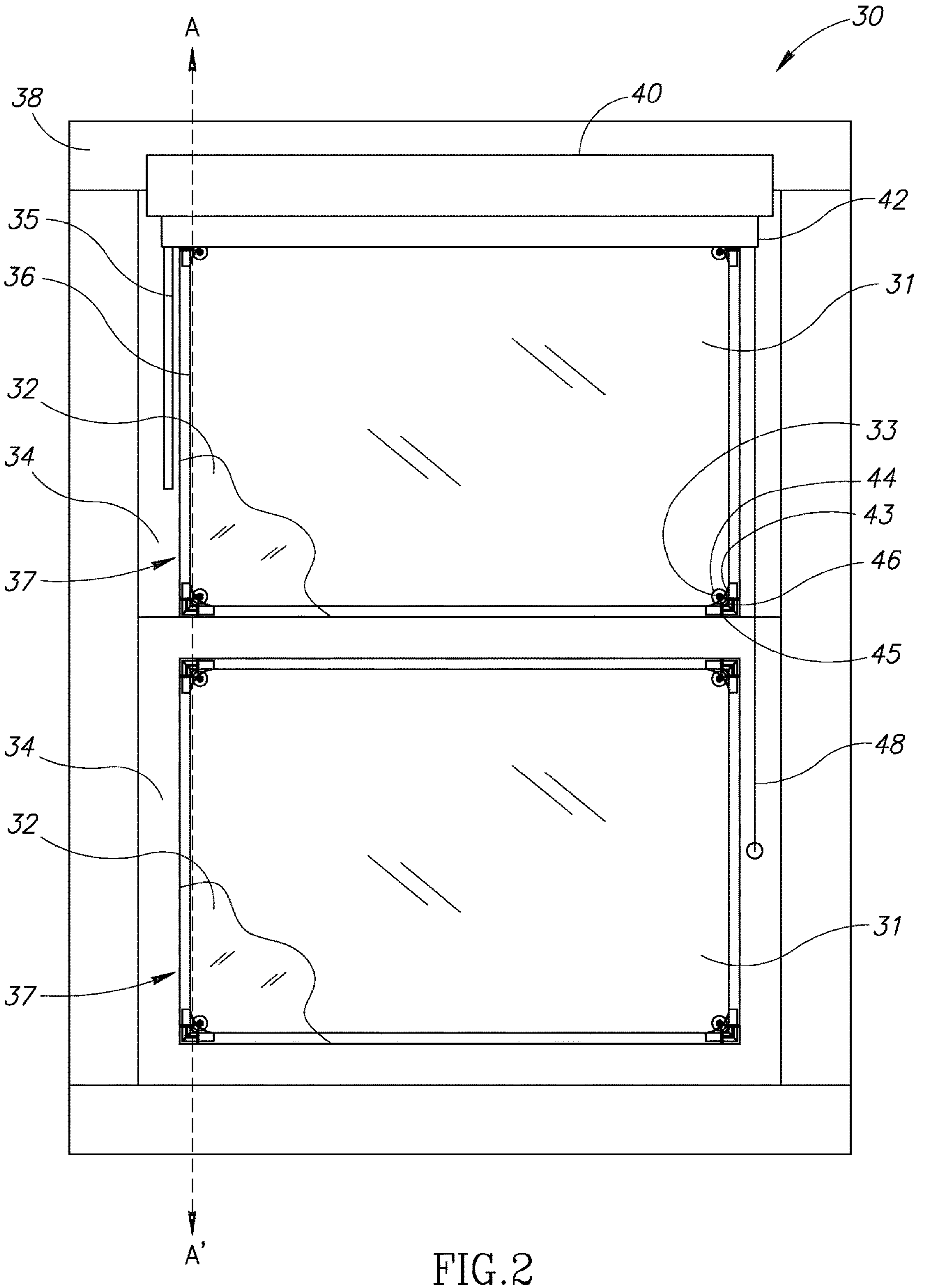
FIG. 2 is a diagram illustrating a front view of a second example frameless supplemental window.

A diagram illustrating a front view of a second example frameless supplemental window is shown in FIG. 2. The vertical sliding window (e.g., double hung window), generally referenced 30, comprises an existing window frame 38 such as found in vertical sliding (single or double hung) windows having a bottom sash that is moveable. The upper and lower window sashes each have a frameless supplemental window installed on the upper and lower window panes 31, respectively. The sheet material 32 of the lower and upper supplemental windows is partially shown for illustration purposes and normally covers all or nearly all of the window pane. The window 30 comprises an existing window frame 38, upper and lower sash 34 holding the window panes 31, upper and lower frameless supplemental window 37, window treatment (e.g., blind) including header 40, retracted blind 42, lift cord 48 and wand 35. Each supplemental window 37 comprises sheet material 32, a bullnose edge or seal 36, corner brace 46, post 33 with attachment mechanism 44 (e.g., suction cup), spring 43 and seal (e.g., pile, O-ring, gel, dry adhesive material, foam, etc.) 45.

Figure 3:
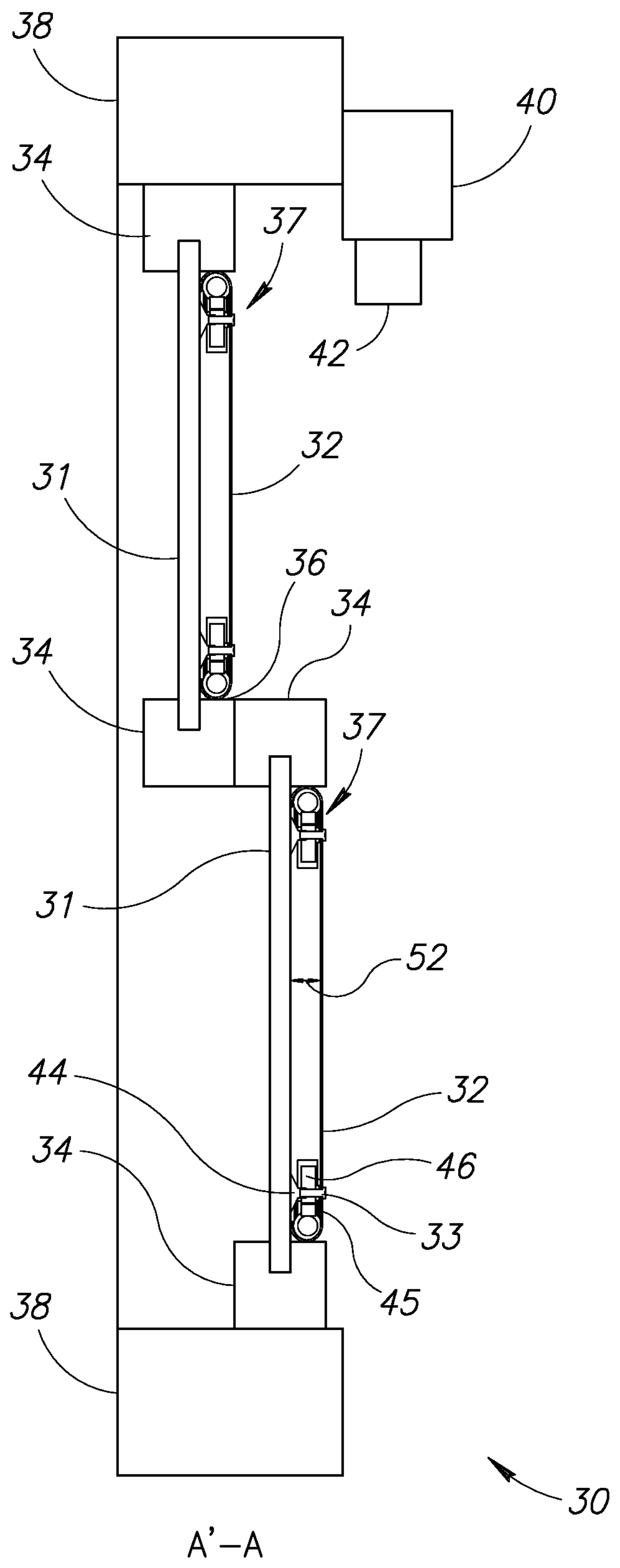
FIG. 3 is a diagram illustrating a side sectional view A-A' of the example window of FIG. 2.

A diagram illustrating a side sectional view A-A' of the example window of FIG. 2 is shown in FIG. 3. The window, generally referenced 30, comprises lower and upper existing window frame and sill 38, window treatment (e.g., blind) including header 40, retracted blind 42, upper and lower window pane 31, upper and lower sash rails 34 of the upper and lower windows and upper and lower supplemental windows 37. Both upper and lower supplemental windows 37 comprise sheet material 32, corner brace 46, post 33 with attachment mechanism 44 (e.g., suction cup), bullnose edge or seal 36, seal (e.g., pile, O-ring, gel, foam, etc.) 45 creating substantially enclosed (or trapped) space (e.g., air) 52 between the plastic sheet and window pane.

In the window of FIGS. 2 and 3, the attachment mechanism and viewable area through the plastic sheet are predominantly within the pane viewable area. For interior or exterior mounting, the supplemental window unit spacing and thickness dimensions perpendicular to the pane 31 that would reside within the sash-to-sash interface during opening and closing operation of the window may beneficially be made smaller than the spacing and thickness dimensions of the supplemental window unit perpendicular to the pane 31 that would not reside in the sash-to-sash interface during operation of the window. As is also shown in FIGS. 2 and 3, the supplemental window unit on the top sash is exterior to the movement path of the bottom sash so that the window remains operable with the supplemental window unit in place.

In the case of vertical or horizontal sliding windows, the supplemental window sheet to pane spacing dimension over the stationary portion may beneficially be made smaller (e.g., to as small as about 0.15 inch) than the supplemental window sheet to pane spacing dimension over the sliding portion to allow the custom supplemental window unit to remain in place when opening the window by sliding the sliding portion. In such a case, the supplemental window members for mounting the plastic sheet should also have a dimension perpendicular to the attached sheet of less than about 0.25 inch. A similar mounting arrangement may be used for horizontal sliding windows to allow operability of the window. Alternatively, operability of the sliding portions of windows may be achieved by dismounting the supplemental parts on the stationary sash prior to opening the window and remounting after closing the window. In such cases, the supplemental window unit spacing dimension on the non-moving sash may be made larger than the distance between the non-moving sash pane and movable sash.

Figure 4A:
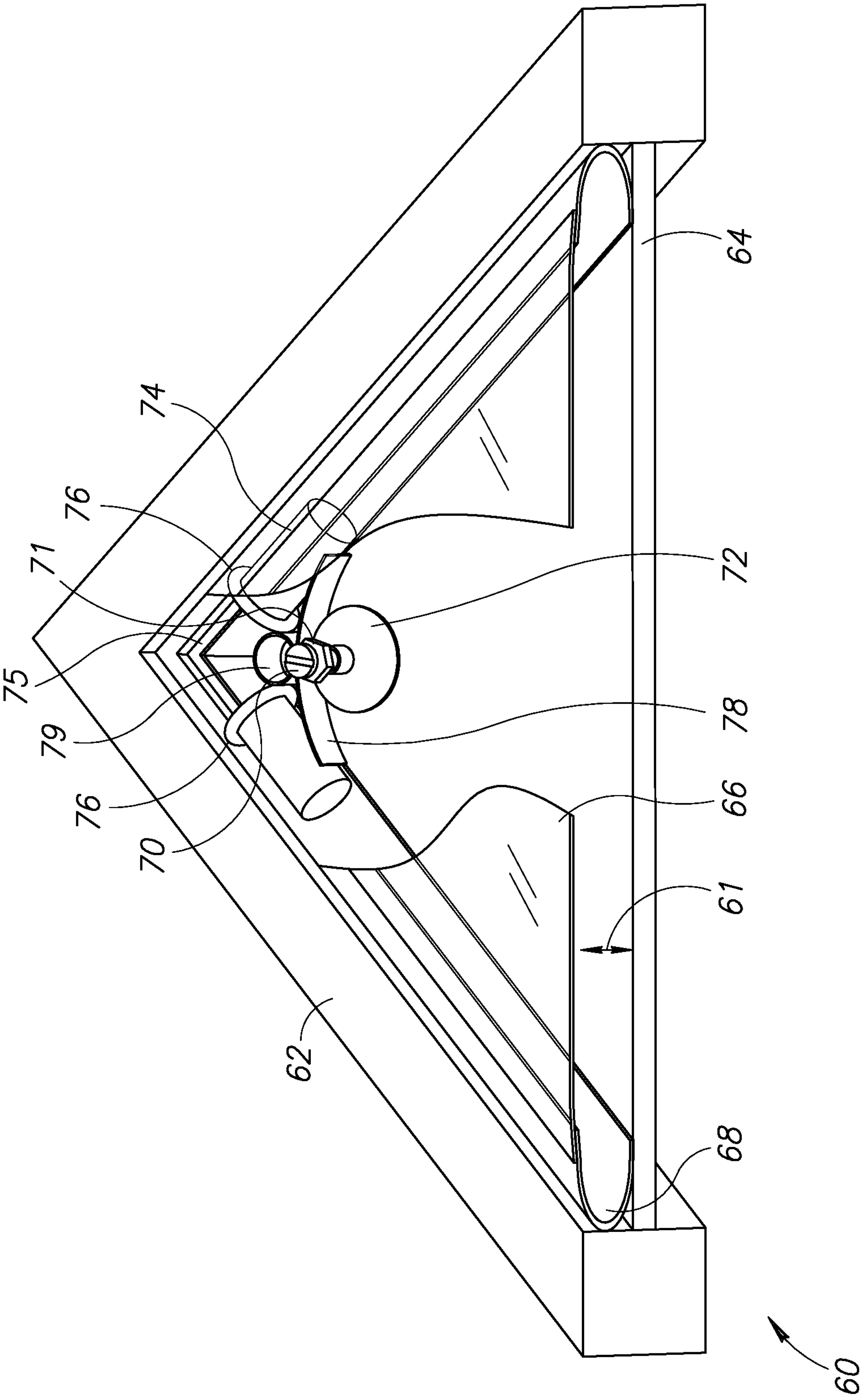
FIG. 4A is a diagram illustrating a perspective view of one embodiment of the frameless supplemental window.

A diagram illustrating a perspective view of one embodiment of the frameless supplemental window is shown in FIG. 4A. The window, generally referenced 60, comprises the window frame or sash 62, window glass pane 64, sheet material 66, bullnose edge seal 68, corner brace 74, O-ring or pile seal 76, post 70, attachment mechanism 72 and springs 78, 79. While two springs are shown, either one alone may be used or both may be used together. The sheet material is only partially shown to allow the corner area of the supplemental window to be shown. In one embodiment, sheet material 66 is a part separate from but bonded to the bullnose edge seal part 68. They may comprise the same or different materials and/or the same material but different thicknesses. Alternatively, sheet 66 and edging 68 may be fabricated from the same single sheet of material as a unitary element.

While edging 68 is shown in a preferred attaching configuration to the surface of sheet 66 that is closer to pane 64, this attachment may alternatively be made to the surface of sheet 66 that is further from pane 64. The bullnose edge can be formed by forcing the edge into an arced shape and heat treating the material while in such arced shape such that the material retains an approximate 'U' shape after the heat source is removed. The arc generated by the bullnose edge compresses upon mounting, contacts the pane near its perimeter substantially enclosing the air space and aids in keeping the sheet material from sagging toward the window pane. Suitable materials for use as the bullnose edge include polyethylene terephthalate (PET), polyethylene terephthalate glycol-modified (PETG), polypropylene, or polyethylene, e.g., about 2 mil to about 10 mil thick, preferably about 2 mil to about 6 mil thick PET commercially available under a variety of trade names. When using PET, PETG, polyethylene or polypropylene, an ultraviolet stabilizer may be incorporated in the material to improve the lifetime of the supplemental window.

The edge material may be optically clear, semi-transparent, translucent or opaque. Non-limiting examples of non-clear materials include plastic materials comprising gas or air micro-voids or high index materials, such as an inorganic oxide or sulfate materials, such as may be found in commercially available materials such as the well known Melinex™ or Hostaphan™ line of film products such as manufactured by Mitsubishi Polyester Film, Inc., Mitsubishi Plastics, Inc., Greer, South Carolina, USA. While the edge material embodiments described show the edge material to comprise an open arc, the edge material may comprise a closed arc such as would be formed using, for example, extruded tubing having a wall thickness similar to that described for the open arc.

The post 70 pierces and is fastened to the sheet material via any suitable mechanism such as a screw 70 and nut 71. The attachment mechanism 72 is fastened to the portion of the post adjacent to the pane 64. In this example, the attachment mechanism is a suction cup. Additional options for the attachment mechanism are described in more detail infra. The spring mechanism in this example comprises a relatively flat plastic or metal band 78 fastened to a circular shaped element 79. Resting against the post, the function of the spring mechanism is to apply an outward force against the corner brace 74 to maintain its position against the corner of the window frame or sash 62. Alterative options for the spring mechanism are described in more detail infra.

The corner brace 74 may be fabricated from any suitable material such as a solid plastic or a closed cell foam and functions to (1) provide structural rigidity to the corner portions of the supplemental window, (2) provide a platform for one or more seals 76 to prevent the leakage of air into or out of the trapped air layer 61 formed between the sheet material 66 and the window pane 64, or (3) provide a mechanism for preventing such leakage in instances when the corner is not otherwise sealed. Alternative options for the corner brace and sealing mechanisms are described in more detail infra.

Note that in this embodiment, the combination of the post and attachment mechanism not only provides the means of attaching the supplemental window to the window pane but also sets the optimum spacing between the window pane and the sheet material. Alternatively, these functions may be provided by independent elements, e.g., a separate discreet offset spacer may be inserted between the window pane and the sheet material, the spacer function is provided by a spacer mechanism (e.g., post, etc.) or any other suitable means for providing this function. In these alternative embodiments, the attachment mechanism is not required to perform any spacing function and thus there is no spacing related constraint on the dimensions of this element.

Note that the spacing function can be achieved in numerous ways with the actual implementation not critical to the invention. In one embodiment, the spacing function can be provided by a discrete spacer part (not shown). In another embodiment, the spacer function can be incorporated into the attachment mechanism (i.e. the post or mounting mechanism) can be made a specific length to provide the proper spacing between the window pane and plastic sheet. In yet another embodiment, the spacer function can be provided by a stiff bullnose edge material or a closed corner comprised of a contiguous or welded bullnose edge material constructed using any suitable means such as thermoforming. Alternatively, the spacing function can be incorporated into the corner brace via a projection or other means where the thickness of the corner brace and any projection is set to a length that provides the proper spacing between the window pane and plastic sheet.

Figure 4B:
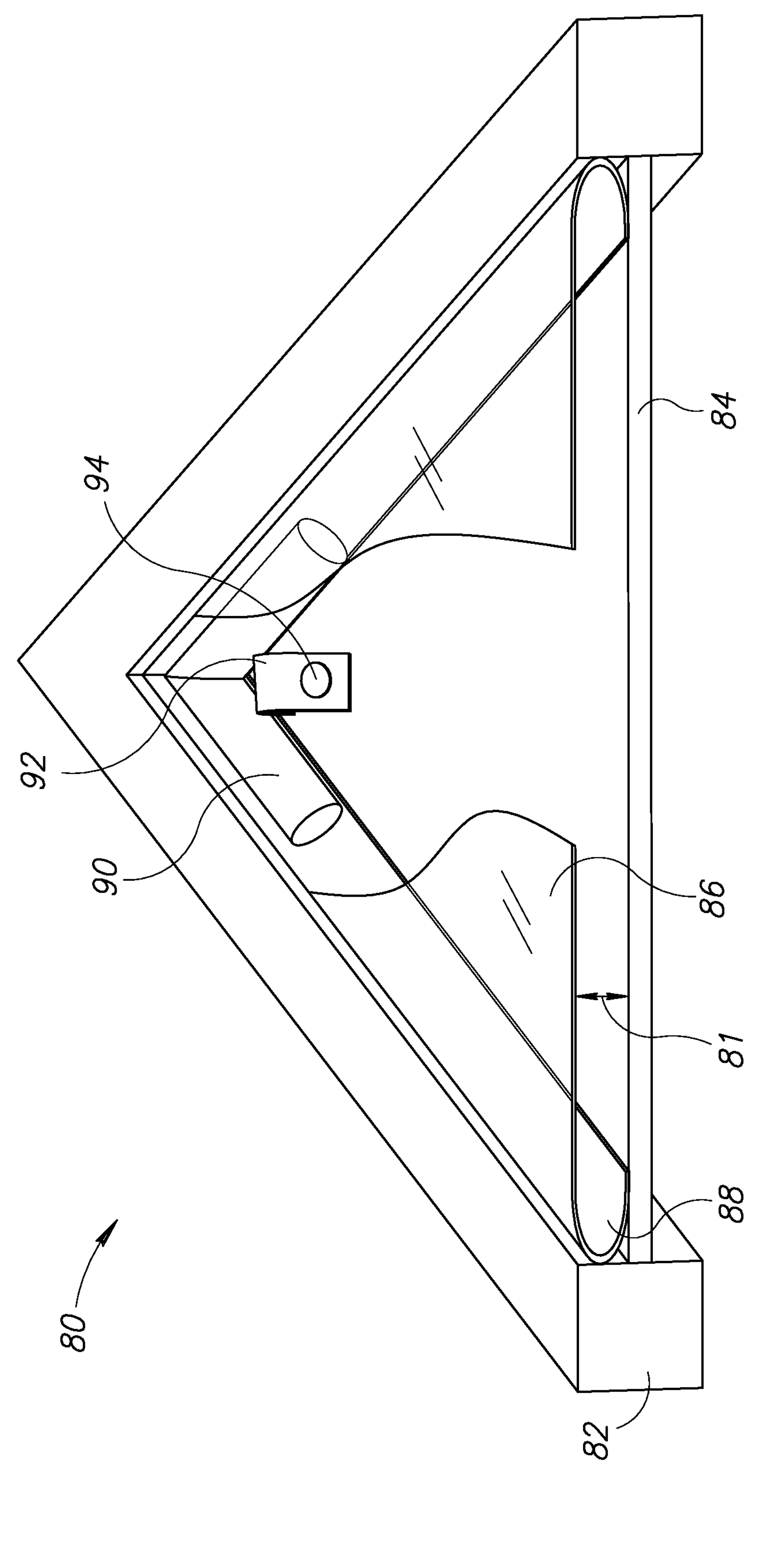
FIG. 4B is a diagram illustrating a perspective view of another embodiment of the frameless supplemental window.

A diagram illustrating a perspective view of another embodiment of the frameless supplemental window is shown in FIG. 4B. The window, generally referenced 80, comprises the window frame or sash 82, window glass pane 84, sheet material 86, bullnose edge seal 88, corner brace 90, optional O-ring or pile seal (not shown), spring mechanism 92 and fastener 94. The sheet material is only partially shown to allow the corner area of the supplemental window to be shown. In one embodiment, sheet material 86 is separate from but bonded to the bullnose edge seal 88. They may comprise the same or different materials and/or the same material but different thicknesses. Alternatively, they made be fabricated from the same single sheet of material as a unitary element. The bullnose edge can be formed by forcing the edge into an arced shape and heat treating the material while in such arced shape such that the material retains an approximate 'U' shape after the heat source is removed.

In this embodiment, the spring mechanism 92 comprises a 'U' shaped piece of plastic or metal fastened to the sheet material via any suitable means 94 such as a screw, rivet, adhesive, etc., which may or may not pierce the sheet material. The function of the spring mechanism is to apply force against the corner brace 90 to maintain the position of the corner brace in the corner of the window frame 82. The spring mechanism may or may not also function to determine the optimal spacing 81 for the trapped air layer between the sheet material 86 and the window pane 84. Spring mechanism 92 may be used in conjunction with attachment mechanisms described both supra and infra.

Figure 4C:
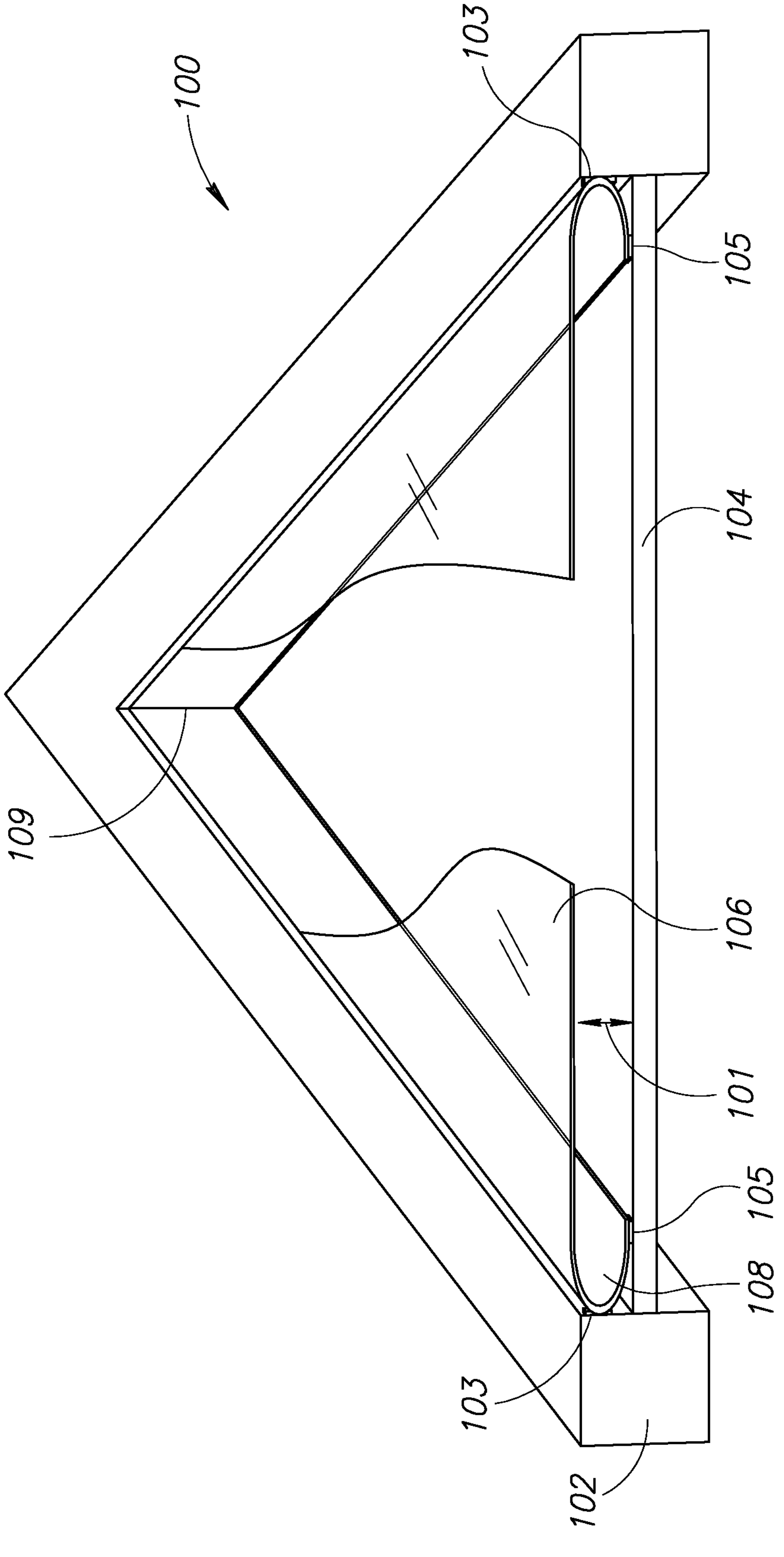
FIG. 4C is a diagram illustrating a perspective view of an additional embodiment of the frameless supplemental window.

A diagram illustrating a perspective view of an additional embodiment of the frameless supplemental window is shown in FIG. 4C. This example embodiment is not only frameless but also lacks a corner brace and spring unlike the embodiments of FIGS. 4A and 4B described supra. The window, generally referenced 100, comprises the window frame or sash 102, window glass pane 104, sheet material 106 and bullnose edge seal 108. The sheet material is only partially shown to allow the corner area of the supplemental window to be shown. The sheet material 106 can be separate from but bonded to the bullnose edge seal 108 as described supra, or as shown in this embodiment, they may be constructed from the same material as a single integrated entity. They may comprise the same or different materials and/or the same material but different thicknesses. Alternatively, they made be fabricated from the same single sheet of material as a unitary element. The bullnose edge can be formed by forcing the edge into an arced shape and heat treating the material while in such arced shape such that the material retains an approximate 'U' shape after the heat source is removed.

In this embodiment, the comers of the bullnose edge are mitered and bonded using any suitable means, such as gluing, heat welding, laser welding, ultrasonic welding, solvent welding, stapling, etc. Regardless of the actual mechanism used to form the mitered corners, it is important that the bond be substantially air tight so as to prevent leaks of air into or out of the enclosed or trapped air layer 101. The portion of such bullnose edge corner that is perpendicular to sheet 106, shown as corner 109, may be a contiguous piece of bullnose edge material or may be a joint formed by separate bullnose edge 108 pieces bonded using any of the suitable means described supra. In addition, the bottom portion of the bullnose edge seal 108 optionally comprises a strip 105 of sealing material substantially along the entire perimeter defined by the bullnose edge seal adjacent to pane 104. This sealing material may comprise any suitable material such as an oil coating, grease coating, gel, dry adhesive material, foam, rubber, etc. Examples of suitable dry adhesive materials include double sided tape, nanosuction adhesive material EverSTIK Nanosuction material sold by UM! Brands, Chino, California, USA, materials and methods such as those described in U.S. Pat. Nos. 8,206,631; 8,398,909; and U.S. Publication Nos. 2012/0319320; 2012/0328822; and 2013/0251937 or Geckskin™ materials and structures. Preferably, the properties of the material are sufficient to provide functions of both (1) sealing the enclosed air layer; and (2) affixing (i.e. adhering) the supplemental window to the window pane. These functions may be achieved by a single strip 103 or 105 of material placed, respectively, at the side of the bullnose edge contacting the window frame or sash 102, or at the bottom (near the pane 104) of the bullnose edge. Alternatively, they may be achieved utilizing two separate strips of materials: (1) a first strip 105 on the bottom of the bullnose edge for sealing the trapped air layer; and (2) a second strip 103 on the side of the bullnose edge for contacting the supplemental window to the window frame or sash. Alternatively, the functions of the strips may be reversed with the strip on the side of the bullnose edge providing sealing and the strip on the bottom of the bullnose edge providing adhesion to the window pane.

Figure 11A:
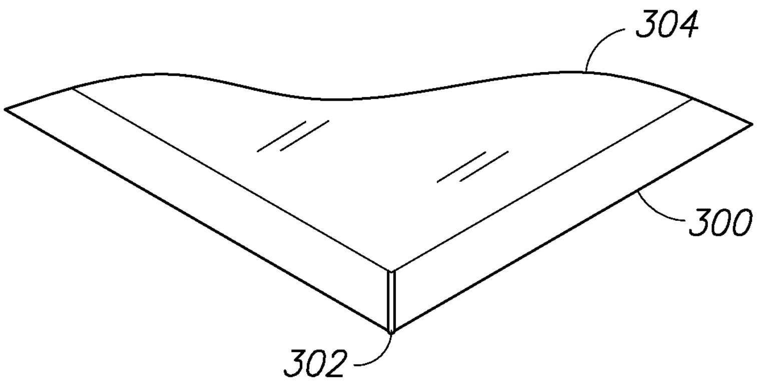
FIG. 11A is a diagram illustrating a perspective view of a first example bullnose corner.
Figure 21A:
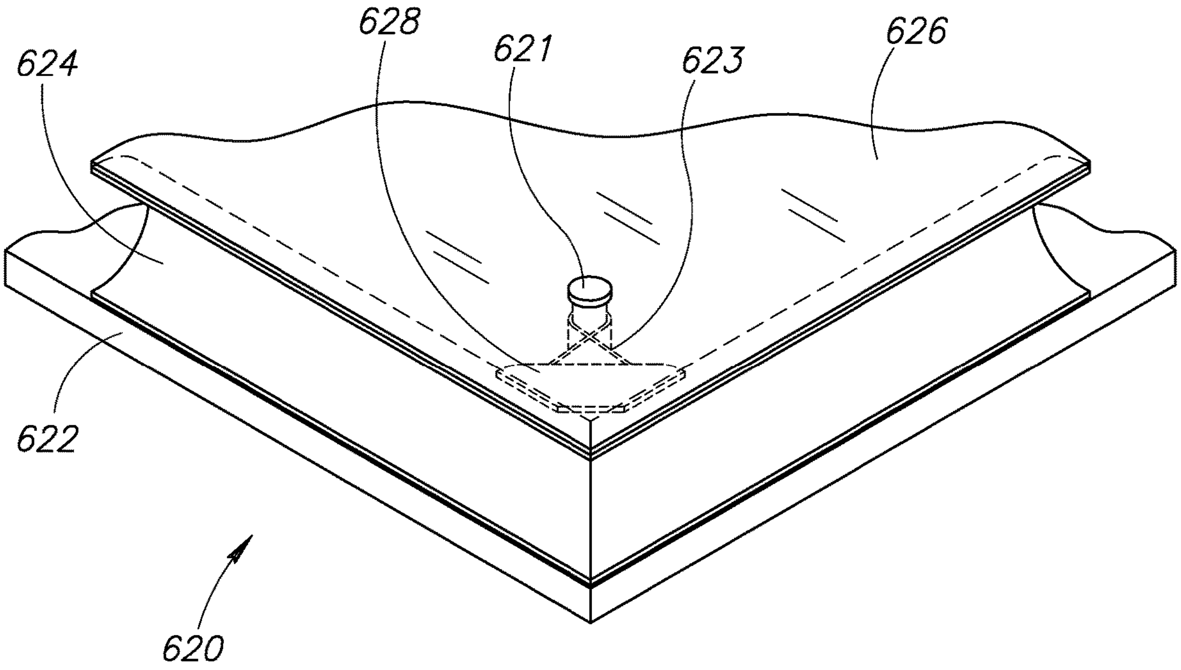
FIG. 21A is a diagram illustrating a top perspective view of a corner portion of an example supplemental window incorporating a reverse bullnose seal.
Figure 21B:
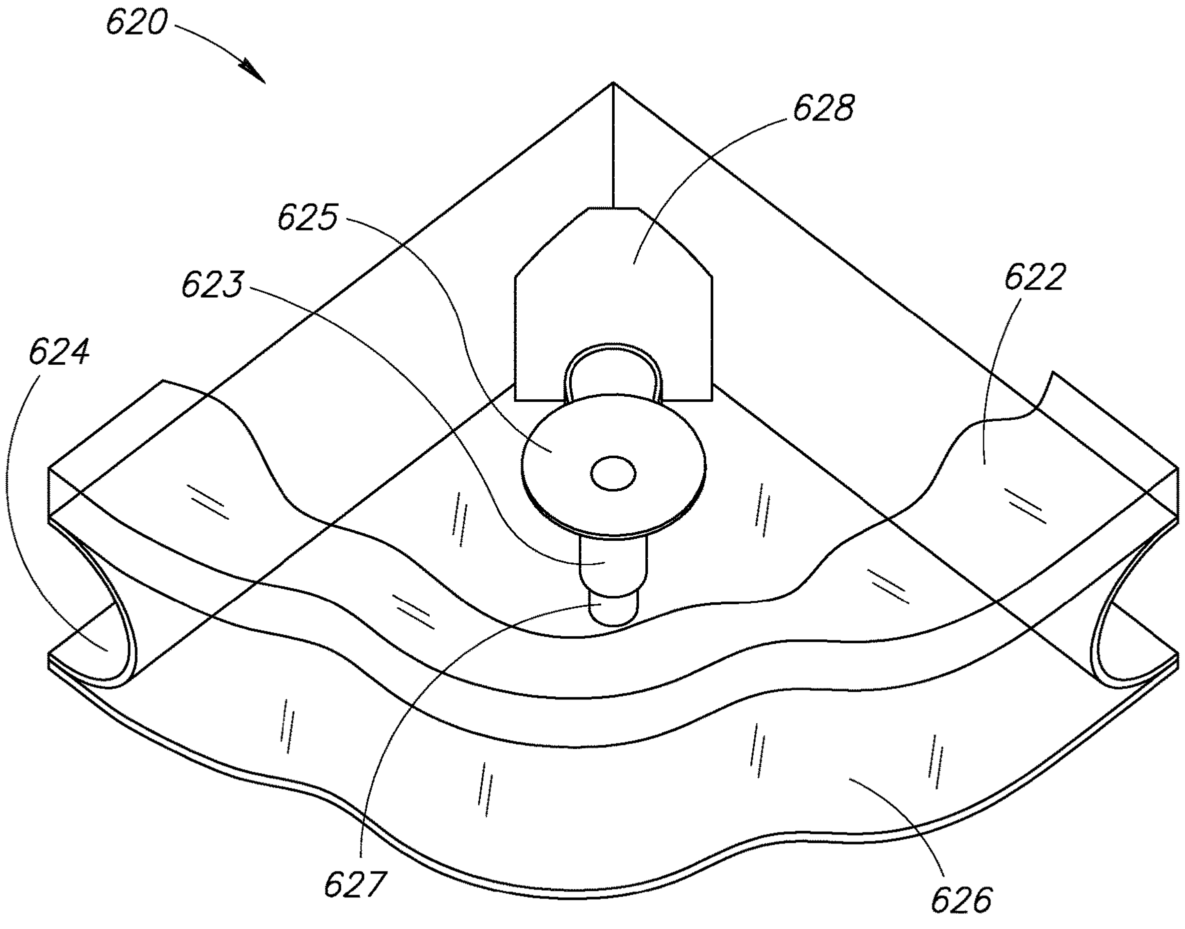
FIG. 21B is a diagram illustrating a bottom perspective view of a corner portion of an example supplemental window incorporating a reverse bullnose seal.

In the embodiment of FIG. 4C, the bullnose edge seal along edges or at comers such as in FIG. 11A described infra provide the desired optimum sheet to pane spacing. While the bullnose edge seal embodiments described supra show the open portion of the 'U' shape to the inward side of the bullnose edge seal, those skilled in the art will recognize that the bullnose edge seal may alternatively be open in the outward direction such as shown in FIGS. 21A and 21B. In such embodiments, the ends of the bullnose edge seal may be mitered and corner openings may be blocked with corner braces such as described infra, placed outward of the bullnose edge seal. Alternatively, any corner opening of such embodiments may be blocked with a truncated rectangle (also known as a snip corner rectangle), for example an elongated octagon, of plastic film or sheet that is formed and configured to provide an inward bullnose shape and placed between the spring and bullnose edge seal. When mounted, such an embodiment may be configured with the bullnose edge seals contacting the corner formed by the window sash and pane.

Figure 5A:
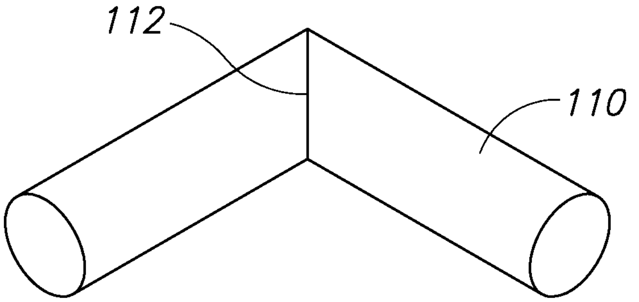
FIG. 5A is a diagram illustrating a first example of the corner brace.

Several options for the construction of the corner brace component will now be described. A diagram illustrating a first example of the corner brace is shown in FIG. 5A. In this embodiment, the corner brace comprises a substantially solid cylindrical shaped material 110 having a mitered or otherwise formed inside corner 112. The corner brace may be constructed from any suitable material such closed cell foam, solid plastic, etc. As described supra, the corner brace may function to provide structural rigidity and corner closure for the supplemental window when placed in a window frame or sash.

Figure 5B:
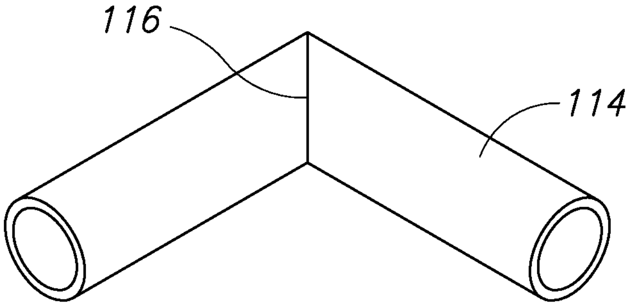
FIG. 5B is a diagram illustrating a second example of the corner brace.

A diagram illustrating a second example of the corner brace is shown in FIG. 5B. In this embodiment, the corner brace comprises a substantially hollow cylindrical shaped material 114 having a mitered or otherwise formed inside corner 116. The corner brace may be constructed from any suitable material such closed cell foam, solid plastic, etc.

Figure 5C:
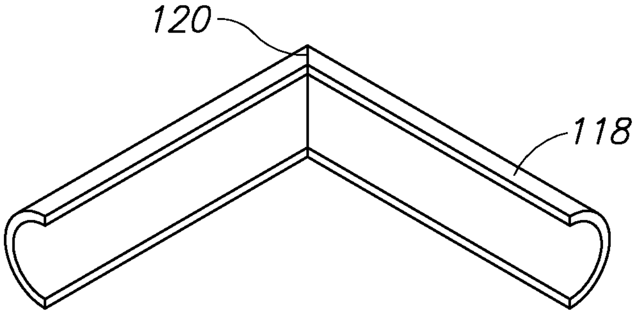
FIG. 5C is a diagram illustrating a third example of the corner brace.

A diagram illustrating a third example of the corner brace is shown in FIG. 5C. In this embodiment, the corner brace comprises an approximate half hollow cylindrical shaped material 118 having a mitered or otherwise formed inside corner 120. The corner brace may be constructed from any suitable material such closed cell foam, solid plastic, etc.

Figure 5D:
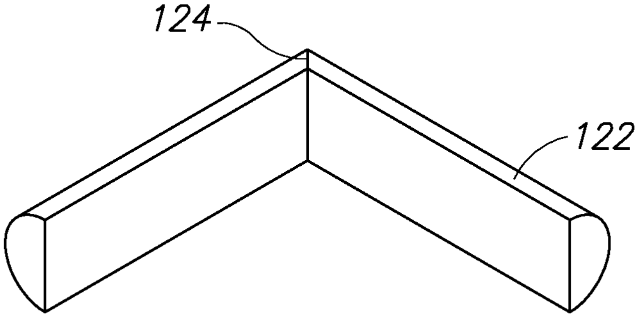
FIG. 5D is a diagram illustrating a fourth example of the corner brace.

A diagram illustrating a fourth example of the corner brace is shown in FIG. 5D. In this embodiment, the corner brace comprises an approximate half solid cylindrical shaped material 122 having a mitered or otherwise formed inside corner 124. The corner brace may be constructed from any suitable material such closed cell foam, solid plastic, etc.

Figure 6A:
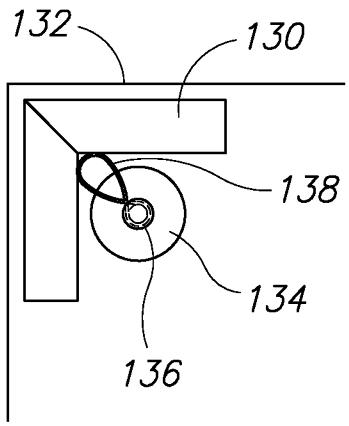
FIG. 6A is a diagram illustrating a first example of the spring mechanism.

Several options for the construction of the spring mechanism will now be described. A diagram illustrating a first example of the spring mechanism is shown in FIG. 6A. In one embodiment, the spring 138, comprises a substantially rectangular plastic material configured to form a figure '8' shape having two loops. The thickness of the spring is in the range of approximately 0.002 inch to approximately 0.010 inch, with a range of approximately 0.003 inch to 0.007 inch preferred. The spring may be formed by bending or thermoforming the plastic material such that the post 136 may be inserted through one of the loops. In some embodiments, one of the loops can be attached to the corner brace 130.

In another embodiment, the spring 138 is a fashioned as an elliptical or tear drop shaped figure '8' loop from any suitable flexible material, e.g., plastic, metal, etc. One of the two loops wraps around the post 136 (held in position by the suction cup 134 when mounted). Note that this portion of the spring is shown in dashed lines indicating it lies under the cap and may not be visible if the cap is not made of a transparent material. Pushing against the post 136, the other loop is operative to apply an outward spring force to push the corner brace 130 and the bullnose corner 132 into the corner of the window frame or sash (not shown). While the figure '8' shape shown in FIG. 6A shows both loops closed, it will be appreciated by those skilled in the art that one or both of the loops may be open while maintaining the spring functionality and post wrapping functionality. It is also noted that a nut is not required in both of the above embodiments in contrast to the embodiments of FIGS. 6B to 6F.

Figure 6B:
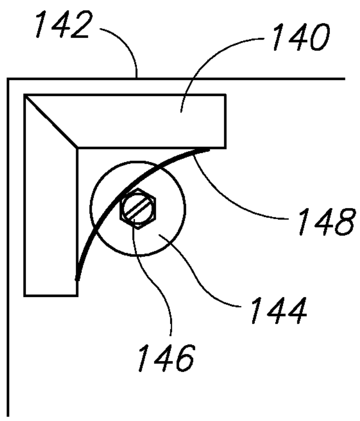
FIG. 6B is a diagram illustrating a second example of the spring mechanism.

A diagram illustrating a second example of the spring mechanism is shown in FIG. 6B. In this embodiment, the spring 148 is fashioned as a flat or curved band from any suitable flexible material, e.g., plastic, metal, etc. It is compressed and placed between the post 146 (held in position by the suction cup 144) and corner brace 140 and operative to apply an outward spring force to push the brace 140 and the bullnose corner 142 into the corner of the window frame (not shown).

Figure 6C:
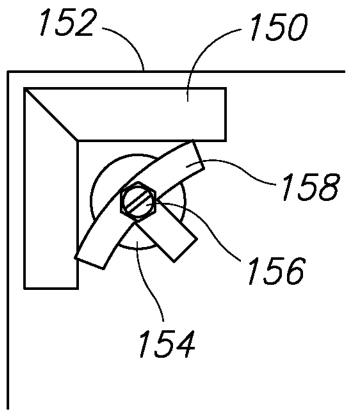
FIG. 6C is a diagram illustrating a third example of the spring mechanism.

A diagram illustrating a third example of the spring mechanism is shown in FIG. 6C. In this embodiment, the spring 158 is fashioned as a 'T' shaped flat or curved band from any suitable material, e.g., plastic, metal, foam (such as closed cell foam), etc. It is compressed and placed between the post 156 (held in position by the suction cup 154) and corner brace 150 and operative to apply an outward spring force to push the brace 150 and the bullnose corner 152 into the corner of the window frame (not shown).

Figure 6D:
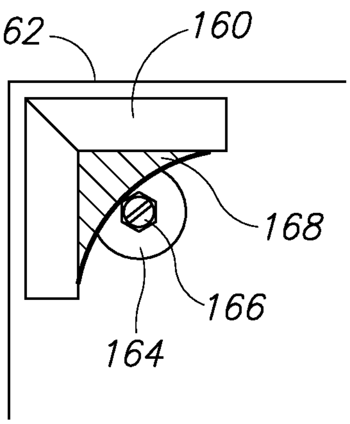
FIG. 6D is a diagram illustrating a fourth example of the spring mechanism.

A diagram illustrating a fourth example of the spring mechanism is shown in FIG. 6D. In this embodiment, the spring 168 is fashioned as a trapezoidal or triangular shaped piece from any suitable compressible material, e.g., foam, etc. It is compressed and placed between the post 166 (held in position by the suction cup 164) and corner brace 160 and operative to apply an outward spring force to push the brace 160 and the bullnose corner 162 into the corner of the window frame (not shown).

Figure 6E:
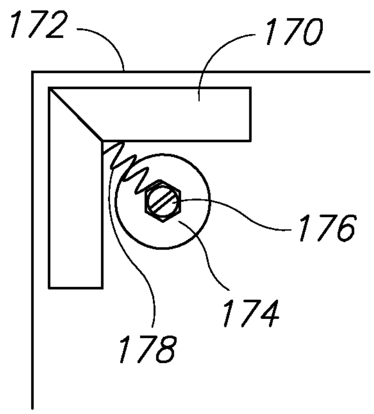
FIG. 6E is a diagram illustrating a fifth example of the spring mechanism.

A diagram illustrating a fifth example of the spring mechanism is shown in FIG. 6E. In this embodiment, a conventional spring 178, such as a helical spring, constructed from any suitable material, e.g., plastic, metal, etc. It is compressed and placed between the post 176 (held in position by the suction cup 174) and corner brace 170 and operative to apply an outward spring force to push the brace 170 and the bullnose corner 172 into the corner of the window frame (not shown).

Figure 6F:
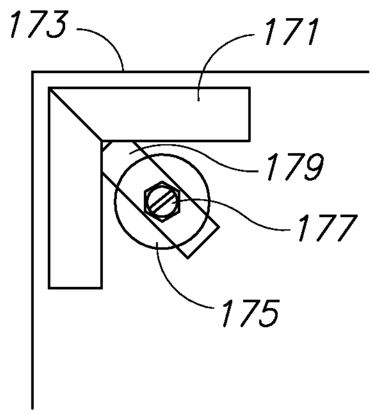
FIG. 6F is a diagram illustrating a sixth example of the spring mechanism.

A diagram illustrating a sixth example of the spring mechanism is shown in FIG. 6F. In this embodiment, the spring 179 is fashioned as a "C", "U" or tear drop shape from any suitable flexible material strip, e.g., plastic, metal, etc., with a hole near each end of the strip. When formed in a "C", "U" or tear drop shape with the two holes aligned, the post and/or suction cup neck are inserted through the two holes. When mounted, the spring is compressed between post 177 (held in position by suction cup 175) and corner brace 171 and operative to apply an outward spring force to push the brace 171 and the bullnose edge seal corner 173 into the corner of the window frame or sash. As shown, a triangular portion of the strip 179 may optionally be omitted along each edge near the portion of the arc that contacts the corner brace to aid in keeping spring 179 positioned at the corner.

Several options for the construction of the corner sealing mechanism will now be described. Note that in each option, a solid corner brace is used as an example. It is appreciated that each sealing mechanism option may be modified to accommodate any of the corner brace options shown in FIGS. 5A, 5B, 5C and 5D.

Figure 7A:
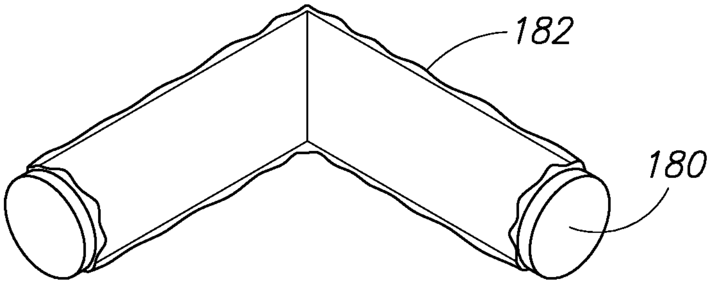
FIG. 7A is a diagram illustrating a first example of the corner sealing mechanism.

A diagram illustrating a first example of the corner sealing mechanism is shown in FIG. 7A. This first example corner sealing mechanism comprises a substantially solid corner brace 180 coated either wholly or partially with a suitable material 182. The corner brace 180 arm cross section may take any appropriate shape such as cylindrical, rectangular, square, elliptical, etc. so long as its combination with other sealing materials inhibits air flow into or out of the substantially enclosed space. It may comprise a solid plastic or a compressible foam material (open or closed cell) having sufficient rigidity and impermeability in combination with material 182 to provide the necessary strength, shape and sealing to the corners of the supplemental window. The coating or layer 182 may comprise a material that has sealing properties such as an oil, grease, gel, etc. In addition, it may comprise a material that is sufficiently tacky to hold the corner brace in its proper position. Such a material may comprise, gel, releasable adhesive, glue, etc. In addition, the coating may comprise a material having both sealing and tacky properties.

Figure 7B:
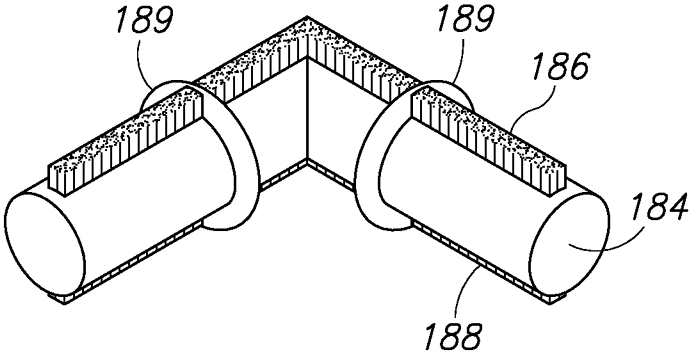
FIG. 7B is a diagram illustrating a second example of the corner sealing mechanism.

A diagram illustrating a second example of the corner sealing mechanism is shown in FIG. 7B. This second example corner sealing mechanism comprises a substantially impermeable corner brace 184 having one or more strips 186, 188 (two shown in this example) of a suitable material. The corner brace may take any appropriate shape such as cylindrical, rectangular, square, elliptical, etc. It may comprise a solid plastic or a compressible foam material (open or closed cell) having sufficient rigidity to provide the necessary strength to the corners of the supplemental window. The strips of material are preferably located on the top (sheet side) and bottom (pane side) portions of the corner brace 184 such that one of the strips contacts the sheet and the other strip contacts the pane when mounted. The strips 186, 188 may comprise a material that have sealing properties such as an oil, grease, gel, O-ring cord, etc. or air transport inhibition properties such as foam or pile. In addition, it may comprise a material that is sufficiently tacky to hold the corner brace in its proper position. Such a material may comprise, gel, releasable adhesive, glue, etc. In addition or alternatively, the strips may comprise a material having both sealing and tacky properties. Additional sealing is also be provided by O-ring seals 189, comprising pile, foam or a suitable elastomer such as silicone, placed on the arms of the corner brace 184.

Figure 7C:
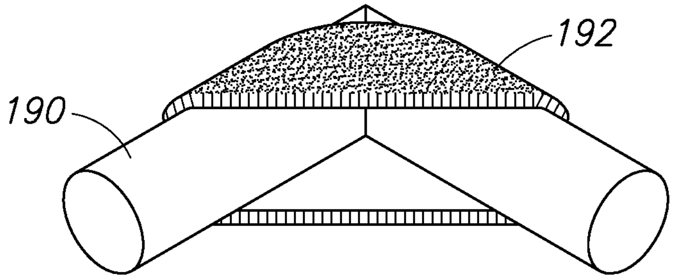
FIG. 7C is a diagram illustrating a third example of the corner sealing mechanism.

A diagram illustrating a third example of the corner sealing mechanism is shown in FIG. 7C. This third example corner sealing mechanism comprises a substantially impermeable corner brace 190 having one or more sealing bands 192 (one shown in this example) wrapped around the arms of the corner brace. The band 192 comprises a suitable material to provide sealing and/or tackiness/grip. The corner brace may take any appropriate shape such as cylindrical, rectangular, square, elliptical, etc. It may comprise a solid plastic or a compressible foam material (open or closed cell) having sufficient rigidity to provide the necessary strength, shape and sealing to the corners of the supplemental window. The band 192 may comprise a material that has air flow inhibition properties such as pile, foam or an elastomer such as silicone, and sealing properties such as an oil, grease, gel, etc. In addition, it may comprise a material that is sufficiently tacky to hold the corner brace in its proper position. Such a material may comprise, gel, releasable adhesive, glue, etc. In addition, the band may comprise a material having both sealing and tacky properties. Band 192 preferably extends over the brace midline at the brace corner so as to inhibit air movement between the enclosed space and the air outside the enclosed space when the supplemental window is mounted.

Figure 7D:
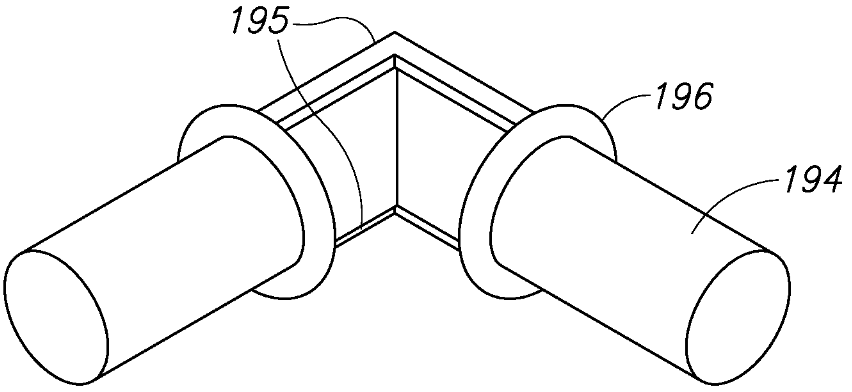
FIG. 7D is a diagram illustrating a fourth example of the corner sealing mechanism.

A diagram illustrating a fourth example of the corner sealing mechanism is shown in FIG. 7D. This fourth example corner sealing mechanism comprises a substantially impermeable corner brace 194 having one or more O-rings 196 and strips 195 on each arm of corner brace 194 each made of a suitable material. The corner brace may take any appropriate chase such as cylindrical, rectangular, square, elliptical, etc. It may comprise a solid plastic or a compressible foam material (open or closed cell) having sufficient rigidity to provide the necessary strength to the comers of the supplemental window. The O-rings may be constructed from elastomer, plastic, pile, foam or any other suitable material as long as it provides sufficient sealing properties. The strips of material 195 are preferably located on the top (sheet side) and bottom (pane side) portions of the corner brace 194. The strips 195 may comprise any material having appropriate sealing properties such as elastomer (such as silicone), plastic, pile, foam, felt etc. In addition, it may comprise a material that is sufficiently tacky to hold the corner brace in its proper position. Such a material may comprise, gel, releasable adhesive, glue, etc.

Figure 7E:
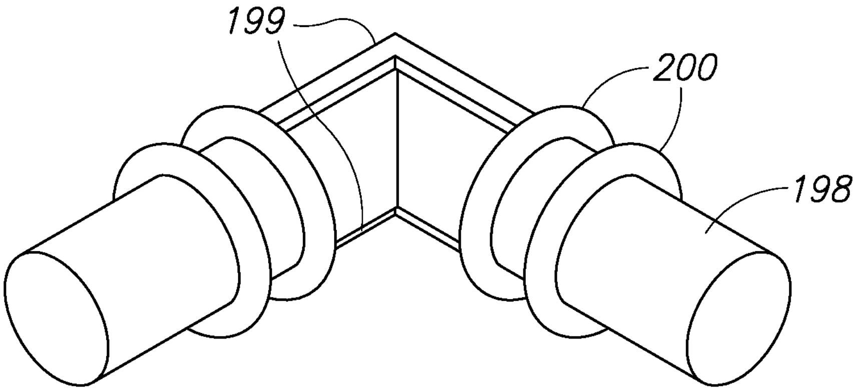
FIG. 7E is a diagram illustrating a fifth example of the corner sealing mechanism.

A diagram illustrating a fifth example of the corner sealing mechanism is shown in FIG. 7E. This fifth example corner sealing mechanism comprises a substantially impermeable corner brace 198 having two or more O-rings 200 on each arm of the corner brace and strips 199 each made of a suitable material as described supra. The corner brace may take any appropriate shape such as cylindrical, rectangular, square, elliptical, etc. It may comprise a compressible foam material (open or closed cell) having sufficient rigidity to provide the necessary strength to the comers of the supplemental window. The double O-rings 200 on each arm of the corner brace provide additional sealing abilities and may be constructed from elastomer (such as silicone), plastic, pile, or any other suitable material as long as it provides sufficient sealing properties. The strips of material 199 are preferably located on the top (sheet side) and bottom (pane side) portions of the corner brace 198. The strips 199 may comprise any material having appropriate sealing properties such as elastomer, plastic, pile, foam, felt, etc. In addition, it may comprise a material that is sufficiently tacky to hold the corner brace in its proper position. Such a material may comprise, gel, releasable adhesive, glue, etc.

Figure 7F:
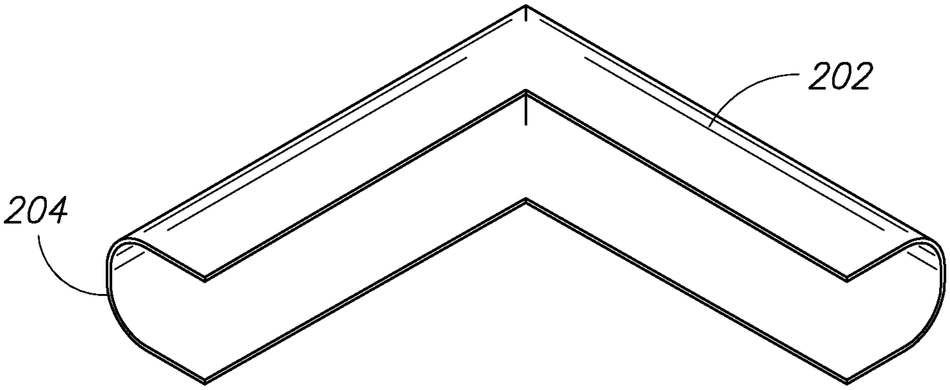
FIG. 7F is a diagram illustrating a sixth example of the corner sealing mechanism.

A diagram illustrating a sixth example of the corner sealing mechanism is shown in FIG. 7F. This sixth example corner sealing mechanism comprises a corner brace 202 having a ‘U’ shaped approximate half hollow cylindrical shaped material 204 having a mitered or otherwise formed inside corner. The corner brace may be constructed via, thermoforming or injection molding for example, from any suitable material such as rigid plastic, flexible plastic, etc. For example, for flexible corner braces, polyethylene terephthalate having a thickness in the range of approximately 3 to 20 mil may be used.

Several options for the attachment mechanism for embodiments where the attachment mechanism pierces the sheet material will now be described. Note that the holes in the sheet may be made using any suitable means such as a hole punch or laser or ultrasonic cutting. In addition, the supplemental window may comprise attachment means anywhere along its perimeter and not just in the comers, e.g., along the sides, etc. In addition to the embodiments described infra, commercially available products such as the Suction Cup with Push Tack, available from Popco, Inc., Minnetonka, Minneapolis, may be used. When using such a tack and suction cup configuration, the neck or nub portion of the suction cup may function as the post with the sheet held between the cap of the tack and the end of the neck/nub.

Figure 8A:
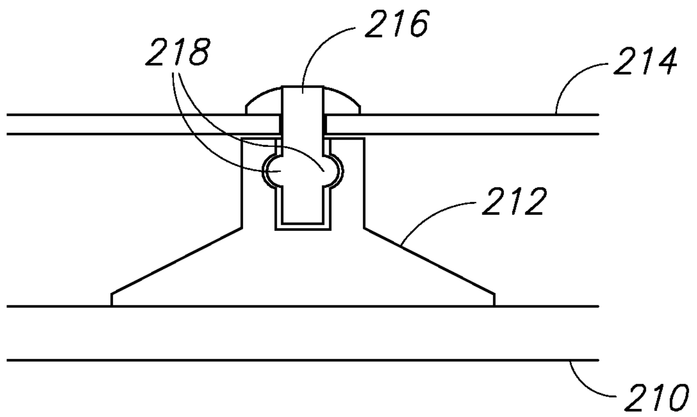
FIG. 8A is a diagram illustrating a first example of the attachment mechanism that pierces the sheet material.

A diagram illustrating a first example of the attachment mechanism that penetrates or pierces the sheet material is shown in FIG. 8A. In this first attachment mechanism example the suction cup 212 is fastened to the sheet material 214 via a cap 216 having dimples, a ring, tab or barbs 218 that fit into a corresponding recess in the neck or nub of the suction cup 212. The cap 216 pierces the sheet and is operative to snap into neck or nub portion of the suction cup. The suction cup is attached to the window pane 210 when the supplemental window is installed. Note that the length of the cap 216 can vary according to the dimensions of the suction cup used and the desired optimum distance between the sheet and the pane. The combination of the compressed suction cup and its post (when in an installed position) determine the distance between sheet and pane.

Figure 8B:
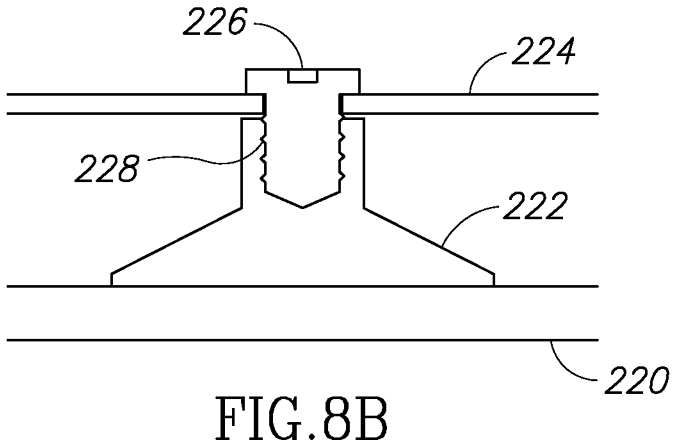
FIG. 8B is a diagram illustrating a second example of the attachment mechanism that pierces the sheet material.

FIG. 8B is a diagram illustrating a second example of the attachment mechanism that penetrates or pierces the sheet material is shown in FIG. 8B. In this second attachment mechanism example the suction cup 222 is fastened to the sheet material 224 via a screw 226 having threads 228 that mate into a corresponding threaded receptacle in the neck or nub of the suction cup 222. Alternatively, the threads of screw 226 may cut into the material within a recess of the suction cup neck or nub. The screw 226 pierces the sheet and is operative to screw into top portion of the suction cup. The suction cup is attached to the window pane 220 when the supplemental window is installed. Note that the length of the screw 226 can vary according to the dimensions of the suction cup used and the desired distance between the sheet and the pane. The combination of the screw (when in an installed position) and the compressed suction cup determine the distance between sheet and pane.

Figure 8C:
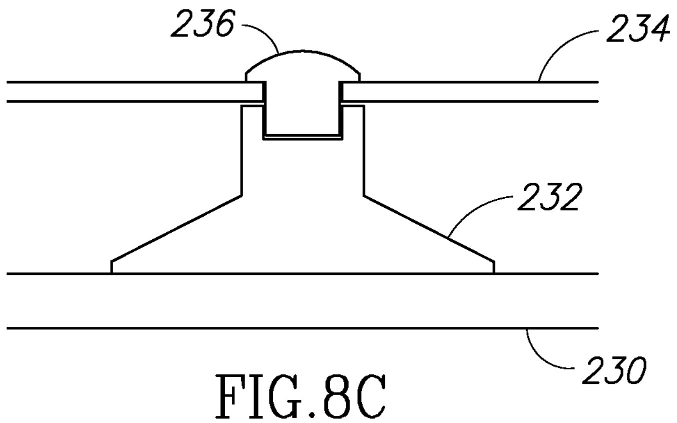
FIG. 8C is a diagram illustrating a third example of the attachment mechanism that pierces the sheet material.

A diagram illustrating a third example of the attachment mechanism that penetrates or pierces the sheet material is shown in FIG. 8C. In this third attachment mechanism example the suction cup 232 is fastened to the sheet material 234 via a rivet or cap 236 having that is friction fit and held in place when inserted into a corresponding recess in the neck or nub of the suction cup 230. The cap 236 pierces the sheet and is operative to fit into top portion of the suction cup. Alternatively or in addition, a barb or tab (not shown) may be provided on the cap 236 that fits into corresponding recess on the suction cup to guide and/or secure the placement of the cap. The suction cup is attached to the window pane 230 when the supplemental window is installed. Note that the length of the cap 236 can vary according to the dimensions of the suction cup used and the desired distance between the sheet and the pane. The combination of the cap (when in an installed position) and the compressed suction cup determine the distance between sheet and pane.

Figure 9A:
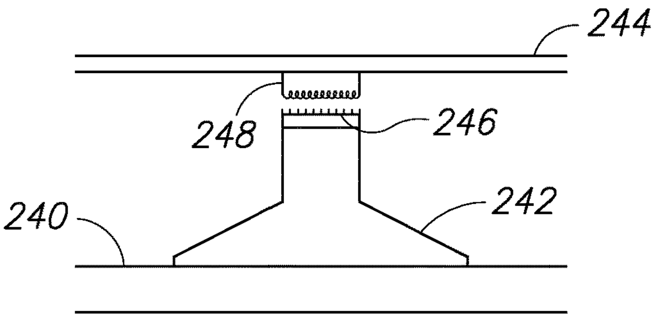
FIG. 9A is a diagram illustrating a first example of the attachment mechanism that does not pierce the sheet material.

Several options for the attachment mechanism for embodiments where the attachment mechanism does not pierce the sheet material will now be described. A diagram illustrating a first example of the attachment mechanism that does not pierce the sheet material is shown in FIG. 9A. In this first example, the suction cup 242 is fastened to the sheet 244 using a hook and loop fastener, such as Velcro. One side 248 of the Velcro (hook or loop) is attached to the sheet using adhesive, tape, glue, etc. while the other side 246 is attached to the top of the suction cup (e.g., a post portion). In this manner, the attachment mechanism is operative to both attach to the window pane 240 but also determine the distance between the sheet and pane.

Figure 9B:
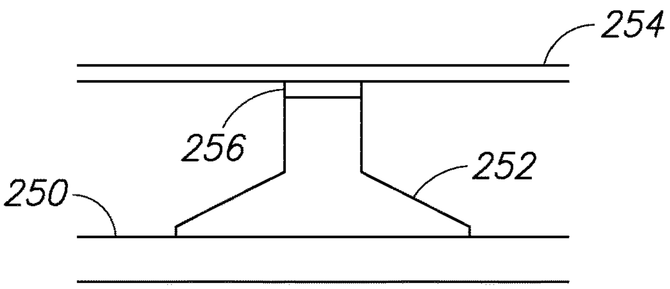
FIG. 9B is a diagram illustrating a second example of the attachment mechanism that does not pierce the sheet material.

A diagram illustrating a second example of the attachment mechanism that does not pierce the sheet material is shown in FIG. 9B. In this second example, the suction cup 252 is fastened to the sheet 254 using adhesive, glue, tape or other adhesive based bonding technique. In this manner, the attachment mechanism is operative to both attach to the window pane 250 but also determine the distance between the sheet and pane.

Figure 9C:
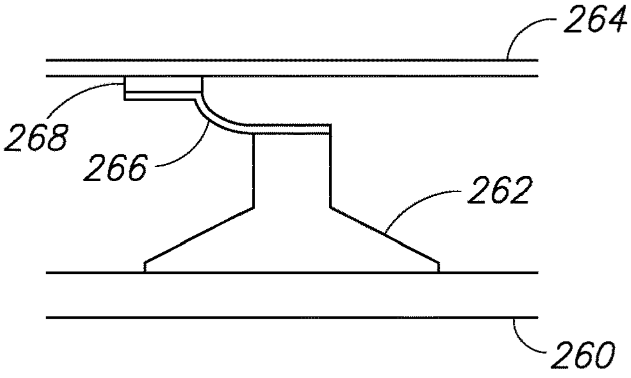
FIG. 9C is a diagram illustrating a third example of the attachment mechanism that does not pierce the sheet material.

A diagram illustrating a third example of the attachment mechanism that does not pierce the sheet material is shown in FIG. 9C. In this third example, the suction cup 262 is fastened to the sheet 264 using a commercially available dry adhesive material 268 such as EverSTIK, Geckskin™, etc. or other dry adhesive such as described in U.S. Pat. Nos. 8,206,631; 8,398,909; and U.S. Publications Nos. 2012/0319320; 2012/0328822; and 2013/0251937 and described at www.nanogriptech.com. Depending on the material used, an arm 266 may be required to attach the suction cup 262 to the material 268. In this manner, the attachment mechanism is operative to both attach to the window pane 260 but also determine the distance between the sheet and pane.

In an alternative embodiment, supplemental window's spacing arrangement (e.g., suction cup) may be attached using a releasable, dry surface-adhesive device including, for example, an adhesive pad that may have a tether component attached, the adhesive pad including a planar backing layer having high in-plane stiffness and a planar layer of elastic material having an adhesive surface on at least one side for adhering to the pane, wherein the elastic material is impregnated onto the backing layer on at least the side opposing the adhesive surface, as described in WO 2012/078249, WO 2014/152485, WO 2014/123936 and WO 2014/144136, all of which are incorporated herein by reference in their entirety.

When using a releasable, surface-adhesive device, the elastic material preferably comprises a siloxane-based, such as polydimethylsiloxane, urethane-based, or acrylate-based elastomer. Such attachment by adhesive, vacuum or releasable, surface-adhesive device may be made to the interior or exterior surface of the pane. When using suction cups, attachment of the suction cup to the window pane may include use of an additional material between the suction cup and the pane. For example, water, saltwater, saliva, or other water based solution, such as liquid soap or dishwashing soap or solution may be used. Preferred materials include vegetable or cooking oil such as canola, sunflower or corn oil, petroleum jelly, or a grease, such as a petroleum or silicone grease based grease, e.g., polydimethylsiloxane.

Figure 9D:
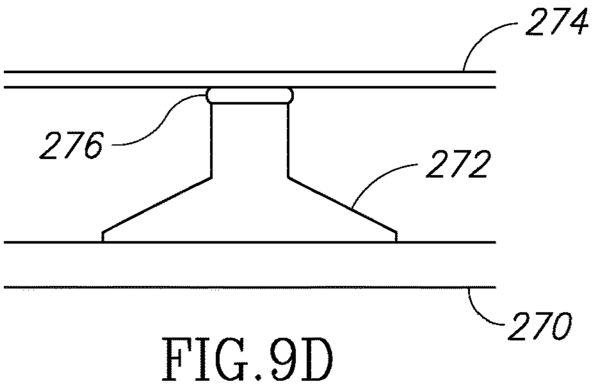
FIG. 9D is a diagram illustrating a fourth example of the attachment mechanism that does not pierce the sheet material.

A diagram illustrating a fourth example of the attachment mechanism that does not pierce the sheet material is shown in FIG. 9D. In this fourth example, the suction cup 272 is fastened to the sheet 274 using any suitable well-known welding technique. In this manner, the attachment mechanism welded 276 to the sheet is operative to both attach to the window pane 270 but also determine the distance between the sheet and pane.

Figure 10A:
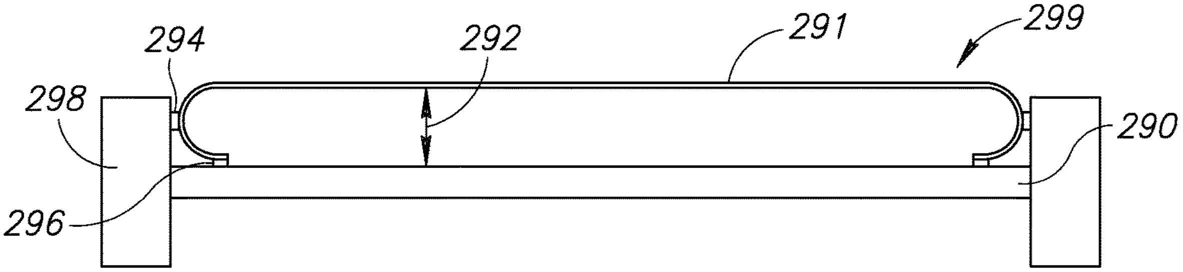
FIG. 10A is a diagram illustrating a side sectional view of an example frameless supplemental window.

A diagram illustrating a side sectional view of an example frameless supplemental window is shown in FIG. 10A. In this example embodiment, the supplemental window 299 does not have corner braces. It is similar to the frameless and corner braceless embodiment shown in FIG. 4C described supra.

The sheet material 291 can be separate from but bonded to the bullnose edge seal or they may be constructed from the same material as a single entity. In this case, they comprise the same material and may be the same thickness. The bullnose edge can be formed by thermoforming, i.e. wrapping the edges around a mold or form and heat treating the material such that the material retains an approximate 'U' or arc shape after the heat source is removed.

Alternatively, the edge may be stretched, and optionally cut, such that the edge portion of the single entity is thinner than the sheet portion. Further, it will be appreciated by those skilled in the art that the edging seal may be curved in the opposite direction shown so that such edging seal may contact the inward facing surface or the interior facing surface of the frame or sash. In such cases, dry adhesive materials described supra, for example, may be used to seal the edging seal to the frame or sash while using spacing attachment means such as those described in FIGS. 8A, 8B, 8C and 9A, 9B, 9C, 9D to provide (1) attachment to and (2) the desired spacing from the pane to the sheet.

In the embodiment shown in FIG. 10A, the comers of the bullnose edge are mitered and bonded using any suitable means, such as gluing, taping, heat welding, ultrasonic welding, laser welding, stapling, etc. Regardless of the actual mechanism or method used to form or join the mitered comers, it is important that the bond be substantially air tight so as to prevent leaks of air into or out of the trapped air layer 292.

The bottom portion (the portion near window pane 290) of the bullnose edge comprises a strip 296 of sealing material substantially along the entire perimeter formed by this portion of the bullnose edge. This sealing material may comprise any suitable material such as oil, grease, gel, dry adhesive or nanosuction adhesive material, foam, elastomer, etc. Preferably, the properties of the sealing material are sufficient to provide functions of both (1) sealing the enclosed air layer; and (2) affixing (i.e. attaching) the supplemental window to the window pane 290. These functions may be achieved by a single strip 296 of material placed at the bottom (near the pane 290) of the bullnose edge or a single strip 294 of material placed at the bullnose edge contacting window frame or sash 298.

Alternatively, the above functions can be achieved utilizing two separate strips of materials: (1) a first strip 296 on the bottom of the bullnose edge for sealing the enclosed air layer; and (2) a second strip 294 on the side of the bullnose edge for attaching the supplemental window to the window frame or sash 298. Alternatively, the functions of the strips in this embodiment may be reversed with the strip on the side of the bullnose providing sealing and the strip on the bottom of the bullnose edge providing adhesion to the window pane. In the embodiment of FIG. 10A, the bullnose edge seal along edges or at comers such as in FIG. 11A, described infra, may provide the desired optimum sheet to pane spacing.

Figure 10B:
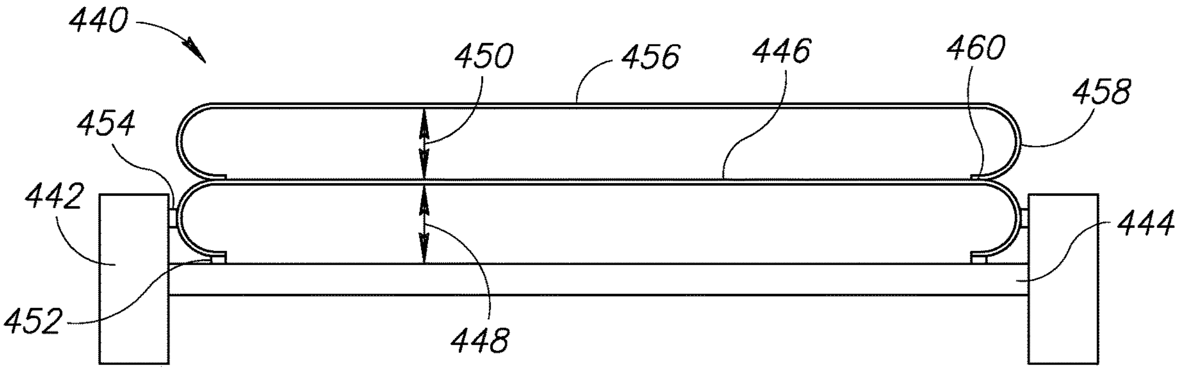
FIG. 10B is a diagram illustrating a side sectional view of an example frameless supplemental window incorporating two enclosed air layers.

A diagram illustrating a side sectional view of an example frameless supplemental window incorporating two enclosed air layers is shown in FIG. 10B. In this multi-sheet embodiment, generally referenced 440, a second sheet 456 is added over the first sheet 446. The dimensions of the second substantially enclosed space 450 provided in this embodiment are approximately the same as the dimensions provided by the first substantially enclosed space 448 between the first sheet 446 and the window pane 444 described supra. These dimensions are those that set the distance between the two sheets and the sheet and the pane to be optimal for maximizing the thermal insulating properties of the supplemental window. The first sheet 446 is attached to the pane 444 using techniques described in detail supra. For example, strip 452 may function to either seal or attach the supplemental window to the pane or may perform the functions of both sealing and attaching. Similarly, strip 454 may function to either seal or attach the supplemental window to the pane or may perform both functions of sealing and attaching.

The spacing between the first and second sheets may be achieved, for example, using a post through both sheets (not shown) with nuts or other retaining means on both sides of the first sheet, a seal, such as a bullnose seal (which may include a corner seal closure, not shown, such as shown in FIG. 11A infra) sized and having the necessary stiffness to provide the desired spacing and attached to both sheets for edges and/or a brace at the corner of each level. For panes having edge dimensions of greater than about 15 inches, it is beneficial to provide one or more additional spacing posts or braces along the edges of the enclosed spaces of this embodiment. Alternatively, as in the embodiment of FIG. 10A, the bullnose 458 may substantially determine the spacing between the first and second sheets.

The second cavity 450, between the first and second sheets, may be permanently formed by mitering and welding edging 460 as described supra and welding, adhering or otherwise bonding the edging 458 to both sheets. Attachment to the pane 444 may be accomplished by means described supra. Optionally, a single post through both sheets in each of the corners may be provided with suction cup attachment to the pane. Alternatively, the second cavity may be releasably formed using releasable adhesive 460 as described supra between the second seal 458 and the first sheet 446 or a portion of the first seal 459 that is approximately parallel to and nearest first sheet 446. Other means for attaching the second sheet to the first sheet include a first bolt (not shown) with a tap or other attachment mechanism for a second bolt or bolts, threaded rod, nut and tapped cylinder/spacer between the first and second sheets and one or more bolts.

With the seals attached inward from the edge of each sheet, rigid clip spacers may be added at several perimeter locations to maintain sheet-to-sheet spacing in multi-sheet embodiments. The comers may be mitered and welded or closed using adhesive to entirely enclose the second cavity 450 when attached to a first sheet.

Several options for the bullnose corner will now be described. A diagram illustrating a perspective view of a first example bullnose corner is shown in FIG. 11A. In this first example, the bullnose edge 300 is either attached to sheet 304 perimeter region or formed as an extension of the sheet 304 perimeter region. The corner portion of the bullnose is cut such that when the bullnose is shaped, a miter 302 is formed that is bonded using any suitable means, such as glue, adhesive, welding, tape etc. In this case, the bonding of the miter forms a substantially air tight seal and may be constructed to provide the optimum sheet to pane spacing to maximize the thermal insulation properties of the supplemental window.

Figure 11B:
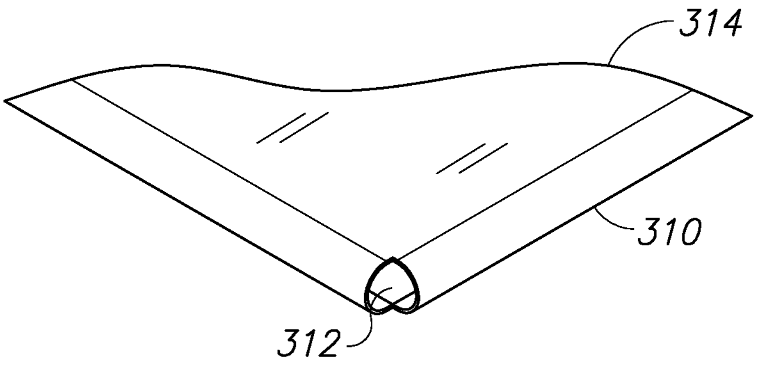
FIG. 11B is a diagram illustrating a perspective view of a second example bullnose corner.

A diagram illustrating a perspective view of a second example bullnose corner is shown in FIG. 11B. In this second example, the bullnose edge 310 is either attached to or formed from an extension of the sheet 314 perimeter region. The corner portion of the bullnose is cut such that when the bullnose is shaped, an approximately 90 degree junction 312 is formed by the bottom portions of the edge material near the pane.

Alternatively, the bottom corners of the edge material may be cut so they do not form a junction (not shown). The opening formed in the corner is sealed by placing a corner brace with suitable sealing into the corner.

Figure 11C:
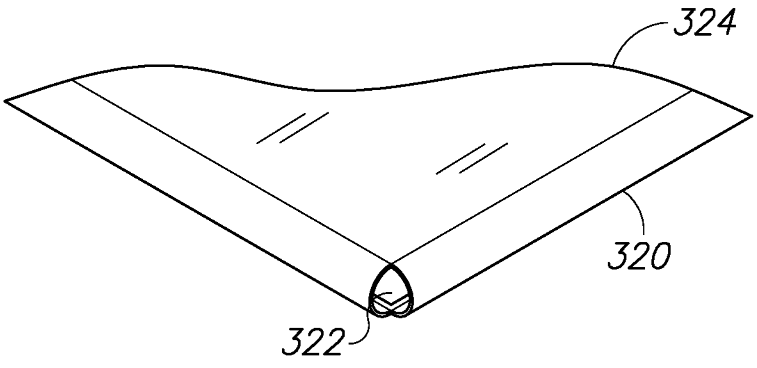
FIG. 11C is a diagram illustrating a perspective view of a third example bullnose corner.
Figure 11D:
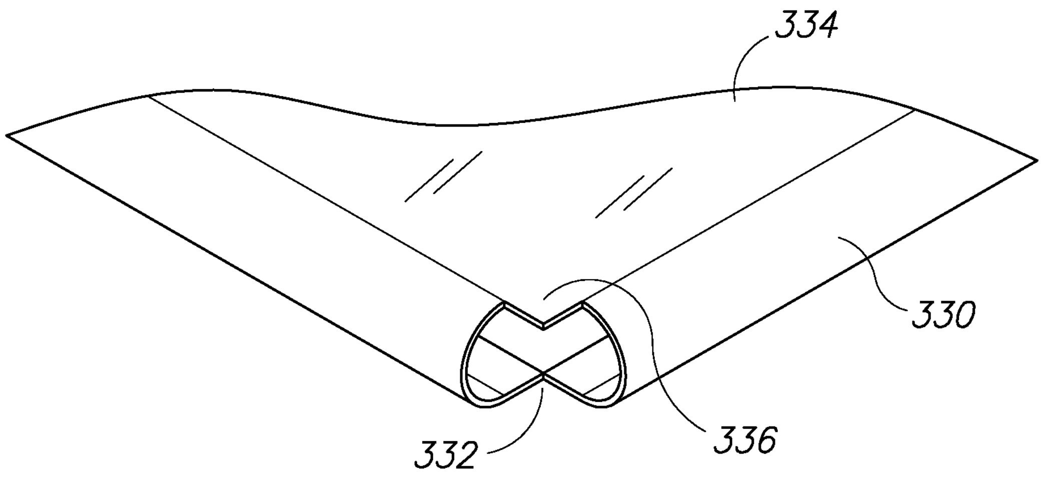
FIG. 11D is a diagram illustrating a perspective view of a fourth example bullnose corner.

A diagram illustrating a perspective view of a third example bullnose corner is shown in FIG. 11C. In this third example, the bullnose edge 320 is either attached to or formed from an extension of the sheet 324 perimeter region. The corner portion of the bullnose is cut such that when the bullnose is shaped, an approximately 90 degree junction 322 is formed whereby the bottom portions of the bullnose material are allowed to overlap onto each other. The opening formed in the corner is sealed by placing a corner brace with suitable sealing into the corner. A diagram illustrating a perspective view of a fourth example bullnose corner is shown in FIG. 11D. In this fourth example, the bullnose edge 330 is either attached to or formed from an extension of the sheet 334 perimeter region. The corner portion of the bullnose is cut such that when the bullnose is shaped, an approximately 90 degree junction 332 is formed whereby a squared off portion 336 of the corner the sheet material extends outward of junction 332. Note that the alternative configurations to an approximately 90 degree junction described supra may also be used in this sheet corner outward extension embodiment. The extended sheet material provides a portion of the corner closure when used in conjunction with corner braces shown in FIGS. 7A, 7B, 7C, 7D and 7E. Alternatively, a similar extending material portion may be formed by appropriate cutting of the top portion (the portion near the sheet) of the bullnose edges shown in FIGS. 11B and 11C. The opening formed in the corner is sealed by placing a corner brace with suitable sealing into the corner.

Figure 11E:
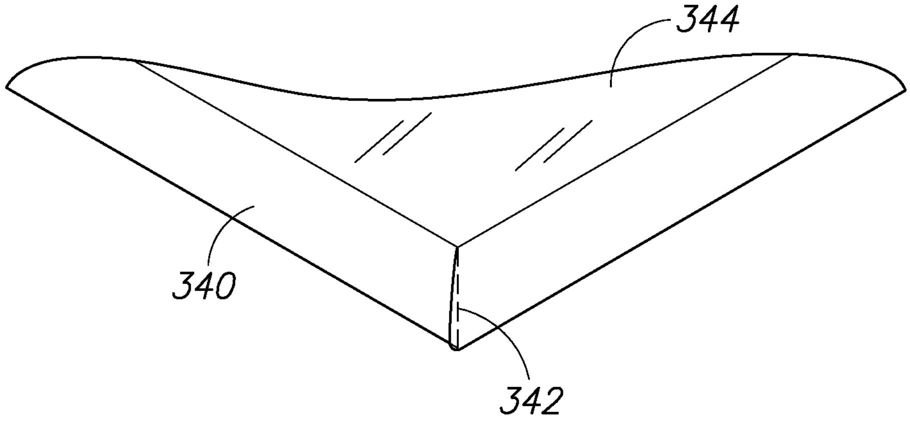
FIG. 11E is a diagram illustrating a perspective view of a fifth example bullnose corner.

A diagram illustrating a perspective view of a fifth example bullnose corner is shown in FIG. 11E. In this fifth example, the bullnose edge 340 is either attached to or formed from an extension of the sheet 344 perimeter region. The corner portion of the bullnose is cut such that when the bullnose is shaped, an overlapping miter 342 is formed with grease applied to aid in sealing. The mitered edges of the bullnose, however, are not bonded to each other, but rather simply about each other. Any air leakage is sealed utilizing a corner brace with suitable sealing placed into the corner.

Figure 12A:
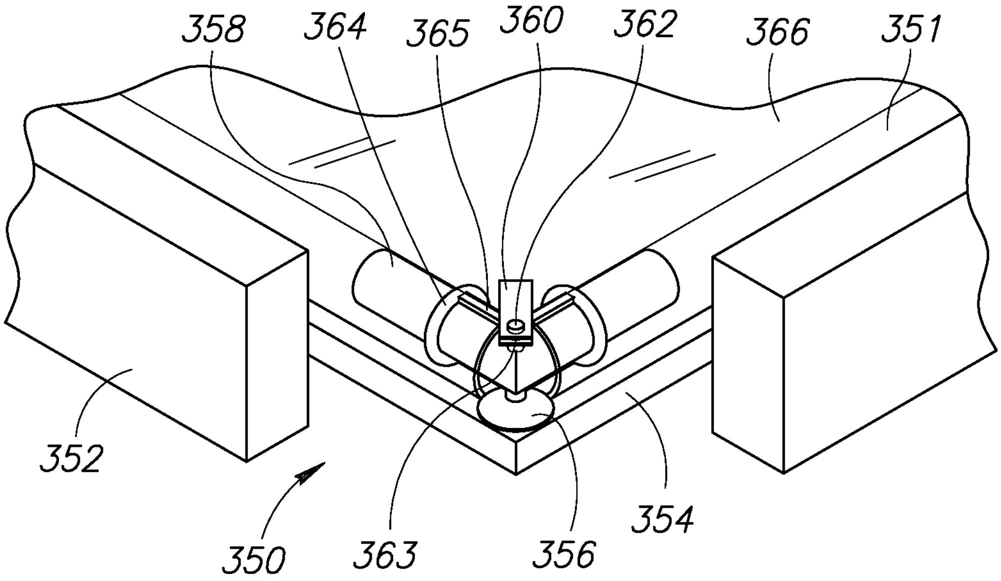
FIG. 12A is a diagram illustrating a perspective view of another embodiment of the frameless supplemental window.

A diagram illustrating a perspective view of another embodiment of the frameless supplemental window is shown in FIG. 12A. The window corner, generally referenced 350, comprises a window frame or sash 352 (shown cutaway for clarity), window pane 354, corner brace 358, seal 364 comprising O-rings, O-ring cord, pile, foam, etc., sheet material 366, post 362, suction cup 356 and one or more constraints 360. This embodiment consists of a sheet 366 and bullnose edge seal 351 that is open at each corner. The corner is sealed with the corner brace 358 having a pile or O-ring cord strip 364 on both the pane and sheet sides of the corner brace. In addition, each arm of the brace has a seal comprising a ring of pile or elastomer 364. Through the corner of the corner brace is a post 362 that is held in place using a suction cup 356 or other means described supra that attaches to the pane 354. At the sheet end of the post is a first constraint 360 that functions to press against the sheet preventing the sheet from separating from the pane (thus defining the pane sheet separation) and seals. Optionally, a second constraint 363 may be placed on the post so as to sandwich the sheet thus forming a slot and also defining the pane to sheet separation distance.

Figure 12B:
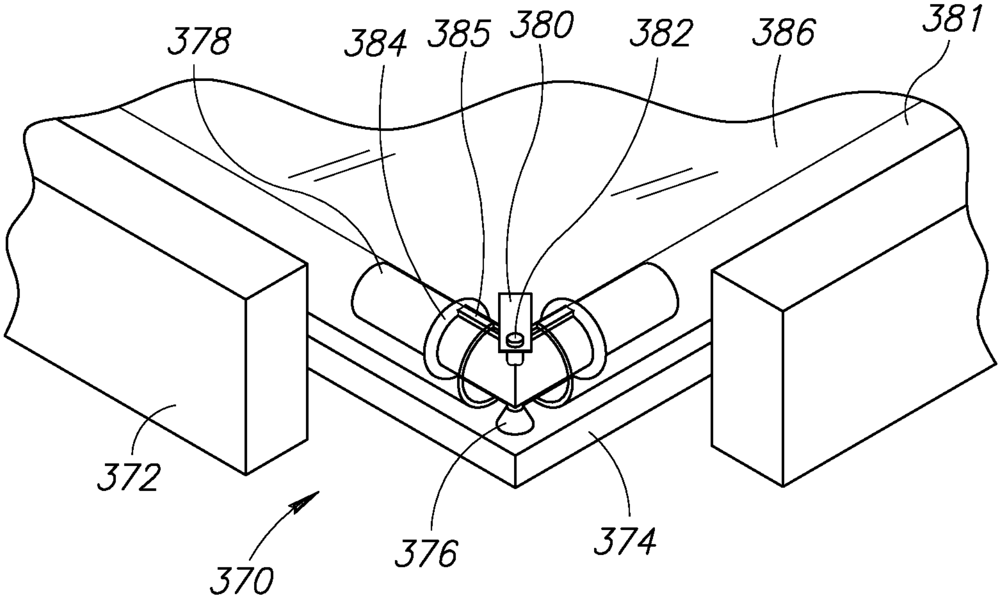
FIG. 12B is a diagram illustrating a perspective view of an additional embodiment of the frameless supplemental window.

A diagram illustrating a perspective view of an additional embodiment of the frameless supplemental window is shown in FIG. 12B. The window corner, generally referenced 370, comprises a window frame 372 (shown cutaway for clarity), window pane 374, corner brace 378, seal 384 comprising O-rings, pile, etc., sheet material 386, post 382, attachment means 376 and one or more constraints 380. This embodiment consists of a sheet 386 and bullnose edge seal 381 that is open at each corner. The corner is sealed with the corner brace 378 having a pile or elastomer cord strip 384 on both the pane and sheet sides of the corner brace. In addition, each arm of the brace has a ring of pile or elastomer 384. Through the corner of the corner brace is a post 382 that is held in place against the pane using glue, double sided tape, adhesive, dry adhesive materials, including nanosuction material such as EverSTIK material, Geckskin™, nanoGriptech materials as described at www.nanogriptech.com and manufactured by nanoGriptech, Inc., Pittsburgh, Pennsylvania, USA, etc. At the sheet end of the post is a first constraint 380 that functions to press against the sheet preventing the sheet from separating from the pane. Optionally, a second constraint (not shown) may be placed on the post so as to sandwich the sheet thus forming a slot and also defining the pane to sheet separation distance.

Figure 12C:
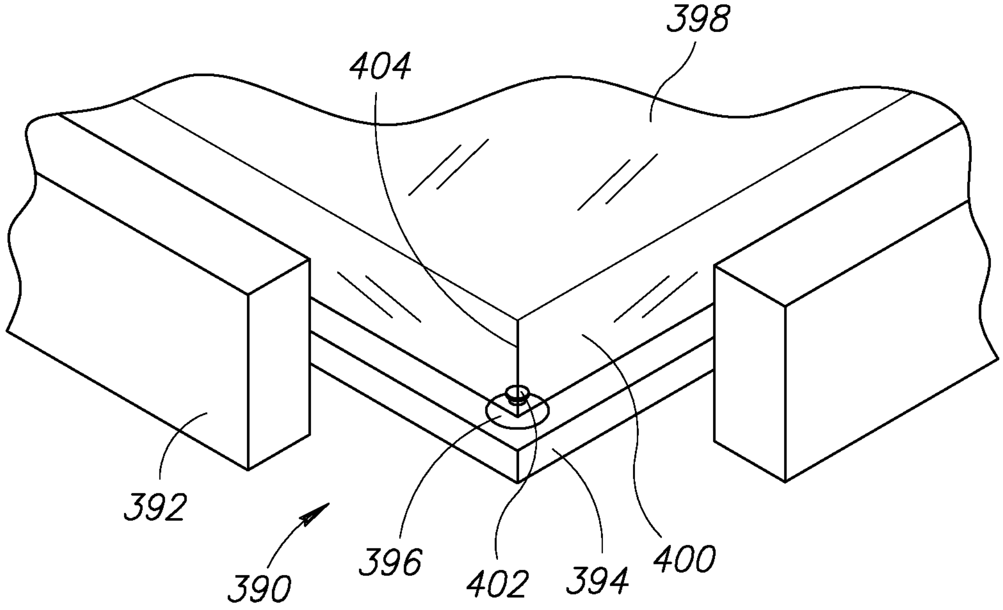
FIG. 12C is a diagram illustrating a perspective view of another embodiment of the frameless supplemental window.

A diagram illustrating a perspective view of another embodiment of the frameless supplemental window is shown in FIG. 12C. The window corner, generally referenced 390, comprises a window frame or sash 392 (the corner portion shown cutaway for clarity), window pane 394, sheet material 398, bullnose edge seal 400 and attachment means 396. This embodiment consists of a sheet and bullnose edge seal as well as an attachment means comprising a suction cup, fastened through a hole in the mitered corner portion of the bottom of the bullnose (i.e. nearest the pane), with a protruding cap (e.g., mushroom shaped, flat, etc.).

The bullnose 400 may comprise a single continuous strip or two or more strips. At the corner, the bullnose edge is preferably mitered and may comprise a single continuous piece of material or may comprise more than one piece of material for the perimeter. To complete the substantial enclosure, ends and mitered portions of the compressible bullnose edge material may be overlapped, abutted or joined, preferably using adhesive, welding or heat sealing. Note that when the edge is comprised of one piece, the ends of the piece may be joined at a corner, in which case the ends of the piece are mitered, or the ends of the piece may be joined along a perimeter edge, in which case the ends of the piece may be cut so as to abut or slightly overlap to enable joining by methods described supra.

Attachment to the pane is achieved utilizing any of the attachment means described supra on the pane side surface of the bullnose. As a non-limiting example, shown in FIG. 12C is a suction cup 396 with a cap 402 with the suction cup on the pane side of the bullnose edge seal near the window pane. The cap is held in a hole in the bullnose with the cap on the opposite side of the hole from the compressible portion of the suction cup.

Optionally, a washer comprising foam or an elastomer may be used between the cap and bullnose edge seal 400. In addition, a portion of compressed circumference of the suction cup may reside inward from the bullnose edge seal to pane contact region. In such cases, a foam sheet such as open cell foam, pile or other suitable sealing material may be placed between the sealing portion of the suction cup and the bullnose edging to ensure inhibition of air movement into or out of the enclosed space when the suction cup is compressed.

Optionally, a post may be attached to the suction cup (not shown). The length of the post may be such that when it is attached to the suction cup, it nearly touches the sheet. The post may be depressed by the end user by pressing on the sheet immediately adjacent to the end of the post during mounting to provide a force on the suction cup which leads to compression of the suction cup and its attachment to the pane.

In another embodiment, the top of the suction cup or an extension from the suction cup comprises magnetic material or a ring magnet (preferably constrained by a post through its center) that may be repelled by a magnet held by the end user external to the space to be enclosed, such that pressure is applied to the top of the suction cup which leads to its attachment to the pane. Similarly, when strips of dry adhesive material described supra are used for attachment, such strips may comprise magnetic material to enable additional pressure to be applied to the attachment regions during mounting by a magnet held by the end user.

Each corner of the bullnose edge is mitered 404 and sealed on both the sheet side and the pane side. The bullnose may optionally be thermoformed to form an arc. Sealing of the miters may be accomplished using any suitable technique, such as but not limited to, adhesive, adhesive tape or preferably welded. Similarly, when using a single continuous strip, which may be notched (at locations that substantially match the corner to corner dimensions of the sheet material) to form miters, the ends of the strip may be joined using adhesive, adhesive tape, welded or any other suitable bonding technique. Further, when using a suction cup, the region between the suction cup top surface and the pane side of the bullnose edge may be filled with a foam sheet, for example open or closed cell foam, pile or other suitable sealing material to aid in maintaining the enclosure integrity.

Figure 13A:
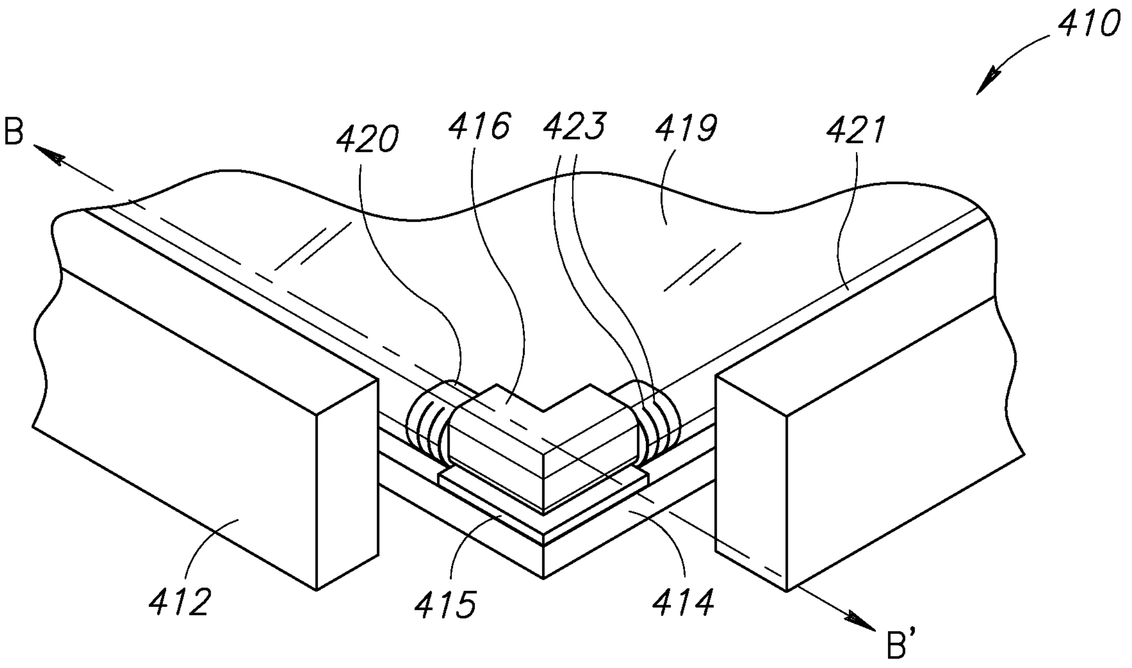
FIG. 13A is a diagram illustrating a perspective view of an additional embodiment of the frameless supplemental window.
Figure 13B:
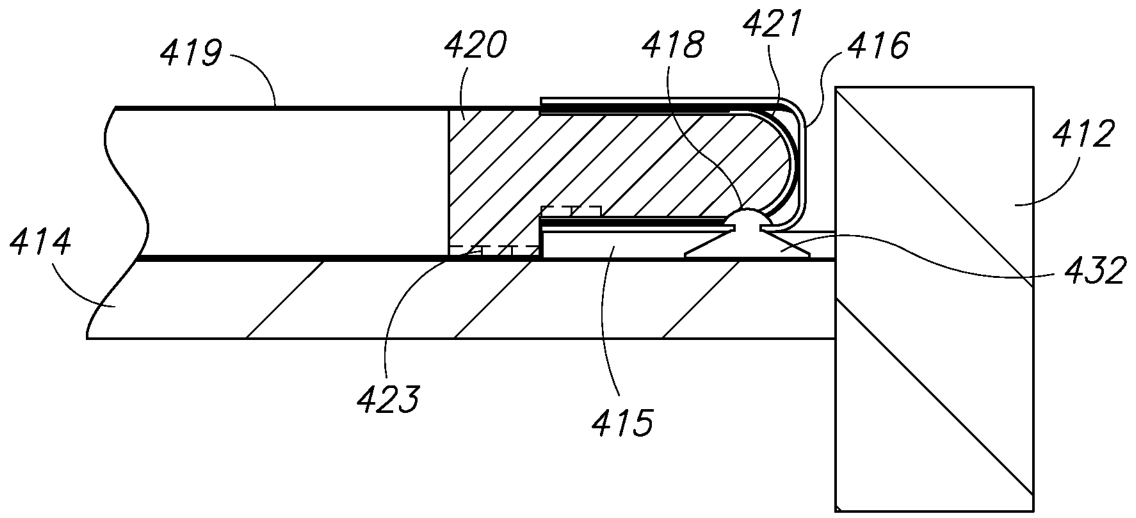
FIG. 13B is a diagram illustrating a side sectional view B-B' of the example window of FIG. 13A.
Figure 13C:
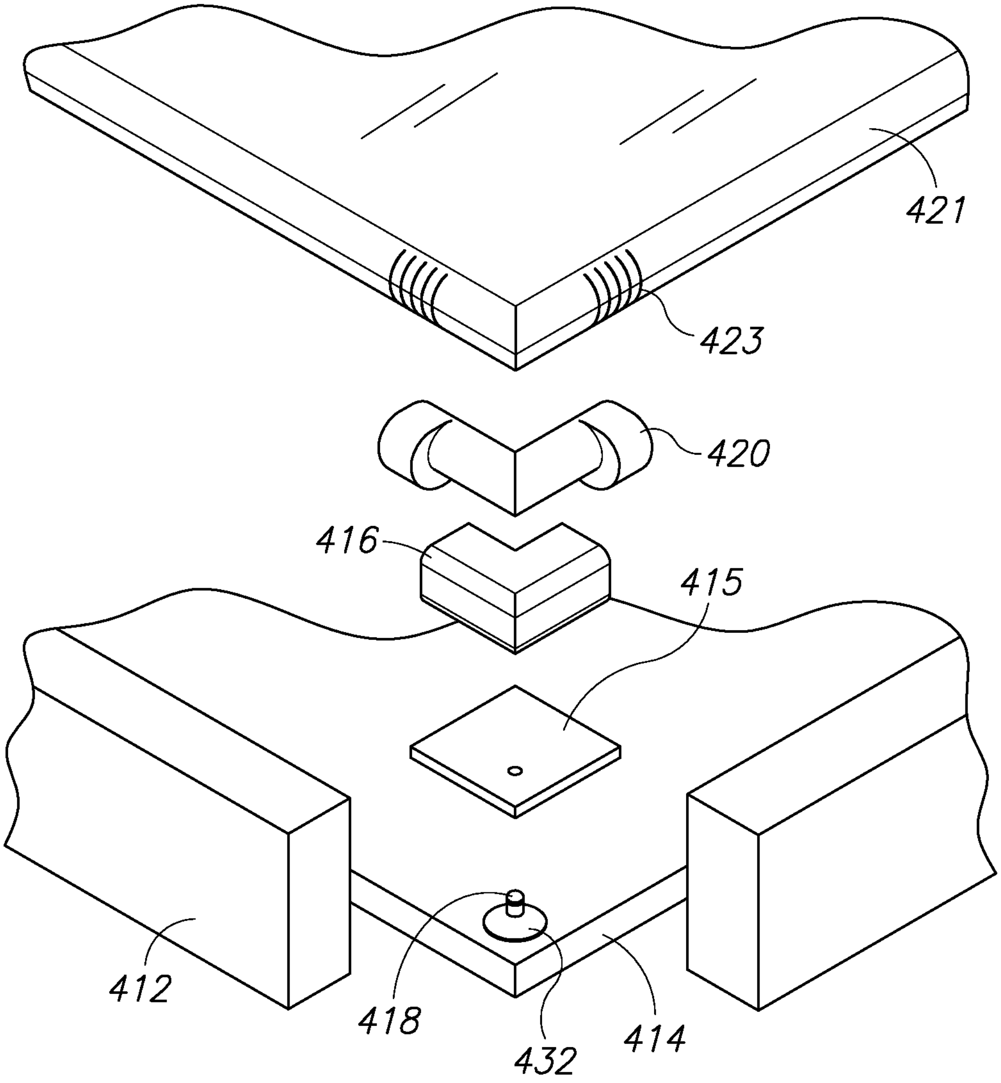
FIG. 13C is a diagram illustrating an exploded view of the example window of FIG. 13A.

A diagram illustrating a perspective view of an additional embodiment of the frameless supplemental window is shown in FIG. 13A. A diagram illustrating a side sectional view B-B' of the example window of FIG. 13A is shown in FIG. 13B. A diagram illustrating an exploded view of the example window of FIG. 13A is shown in FIG. 13C. The window corner, generally referenced 410, comprises a window frame or sash 412 (shown cutaway for clarity), window pane 414, constraint 416, sheet 419, insert 420, optional sheet portion 415, mushroom cap 418, suction cup 432 and bullnose edge seal 421 having one or more slits 423.

This embodiment consists of a sheet and bullnose edge seal held at each corner using a support mechanism consisting of a constraint 416 and foam insert 420 with the constraint attached to the window pane 414 via one of the suitable pane attachment mechanisms described supra, for example, such as suction cup 432. In one example embodiment, the pane attachment means comprises a suction cup 432 connected to the base of the constraint 416 through a hole that engages the mushroom cap 418 of the suction cup 432. The constraint 416 is positioned so as to constrain the separation between the pane 414 and the sheet 419 and thus determine the distance between them. Preferably, the bullnose edge corner fits into the corner support mechanism, (i.e. the constraint 416) and is optionally friction fit in the support using a foam insert 420. Preferably, the bullnose edge seal includes multiple slits 423 to each side of the edge of the support so that the step from the constraint 416 to the pane 414 may be substantially closed. Such closure is aided by use of an insert 420 in the bullnose edge seal in this location. Insert 420 may be sized and shaped to conform to the step from constraint 416 to pane 414. As such, insert 420 may be constructed from a solid rigid material or a conformable foam material. The gap between the suction cup and bottom of the constraint may optionally be filled with a sheet 415 such as foam, pile or other suitable sealing material. Similarly, slits such as those just described and as described in U.S. application Ser. No. 14/315,503 cited supra may be used in the edging seal in the region where the edging seal crosses any protruding muntins that may be present on the window pane.

Those skilled in the art will recognize that adhesive may be used on the outward pane side surface of constraint 416 instead of using suction cup 432 for attachment, sheet 415 may be omitted leaving a slot between constraint 416 and window pane 414 and that other elements as shown in FIGS. 21A through 21F may be used in this embodiment.

Figure 14:
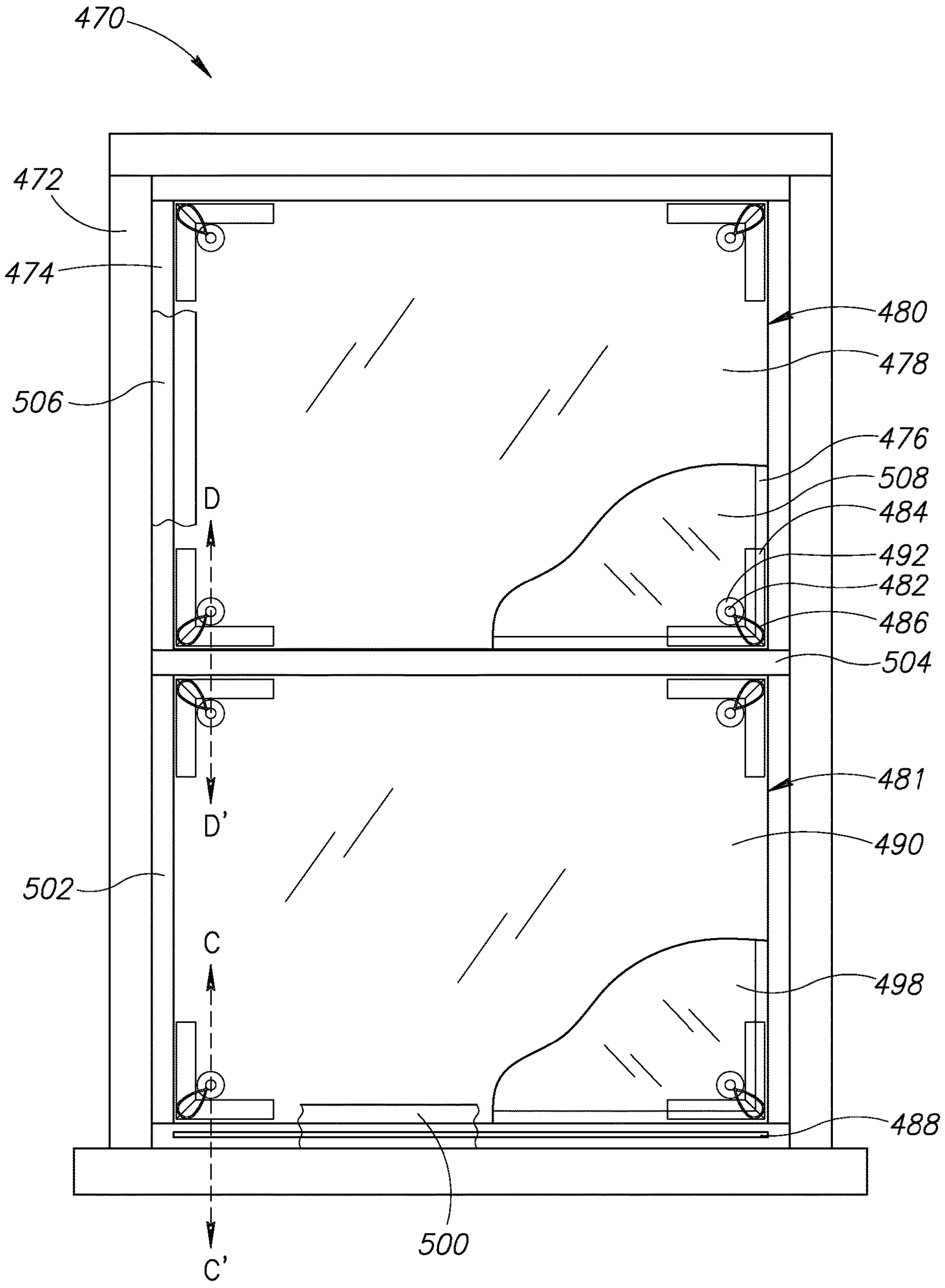
FIG. 14 is a diagram illustrating a front view of a first example frameless supplemental window incorporating infiltration blockers.

The air infiltration blocker of the present invention is useful in inhibiting or minimizing airflow that may enter around one or more window elements into an interior space. A diagram illustrating a front view of a first example frameless supplemental window incorporating infiltration blockers is shown in FIG. 14. The window, generally referenced 470, comprises an existing window frame 472 and a vertical sliding window (for example purposes single or double hung) including a lower sash 502 that is movable and an upper sash 474 that may or may not be movable. The upper and lower sash 474, 502 hold the window panes 478, 490, upper and lower frameless supplemental windows 480, 481, which include infiltration blockers 506, 500, respectively. Lower sash 502 also includes a horizontal handle 488 to aid in opening the window.

The upper and lower window sashes each have a frameless supplemental window with infiltration blockers installed on both upper window pane 478 and lower window pane 490, respectively. The sheet material 498 and 508 of the lower and upper supplemental windows, respectively, is partially shown for illustration purposes and normally covers nearly all or all of the window pane. The upper window sash has infiltration blocker 506 shown cutaway for clarity purposes only. Similarly, the lower window sash has infiltration blocker 500 shown cutaway for clarity purposes as well. Both infiltration blockers 506, 500 are installed on the three non-checkrail sides of the upper and lower sash, respectively. Note that at the top of the lower sash, there is an infiltration blocker (not shown for clarity) that extends upward and to the exterior to cover the sealing interface at the check rail 504. Each supplemental window 480, 481 comprises sheet material 508, 498, respectively. Supplemental windows 480, 481 also include edges or seals 476 corner braces 484, posts 482 with attachment mechanisms 492 (e.g., suction cup), and springs 486. It is noted that seal materials (e.g., pile, O-ring, gel, dry adhesive material, foam, etc.) as described supra may be used. Note that the springs 486 are shown comprising the spring shown in FIG. 6A, they may comprise the springs as shown in FIGS. 6B-6F described supra.

Normally, on the top sash of FIG. 14, infiltration blockers are installed on the vertical sides and the horizontal top of the sash and optionally overlap each other. For clarity, only a section 506 of the infiltration blocker on the left sash is shown. Note that the infiltration blockers normally extend to the corners of the window. At the top comers of the upper sash of FIG. 14, the vertical and horizontal portions of the infiltration blocker normally contact each other and the infiltration blocker closer to the sash may contact the sash. In addition, the horizontal infiltration blockers may be sized to contact the jamb at each side of the sash and the vertically oriented infiltration blockers may be sized to contact the header of the window frame. Additionally, foam or pile (not shown) may be used at the comers of the sashes between the infiltration blockers and the sash or stile to further inhibit air movement toward the interior.

Normally, on the bottom sash of the window shown in FIG. 14, infiltration blockers are installed in which each piece of plastic comprises an arc such that the film contacts the nearest parallel jamb or the sill. For clarity they are omitted from FIG. 14 but shown in FIG. 15, described infra. In the particular embodiments shown, with reference to FIG. 15, the horizontal infiltration blocker at the bottom of the bottom sash forms an arc that is concave to the exterior of the film while the infiltration blockers are concave to interior of the film as shown in FIG. 16, described infra. Alternative embodiments may reverse the concavity of these arcs, so long as the end of each arc contacts the respective inward facing surface of the window frame (i.e. the jambs and the sill). Another embodiment shown in FIGS. 17 and 18, described infra, the infiltration blocker lies substantially parallel to the window pane with a small bend near its point of contact with the jamb. Such a configuration with little or no projection of the infiltration blocker toward the interior is desirable to allow opening of the lower sash without the need to dismount supplemental window parts on the upper sash.

Figure 15:
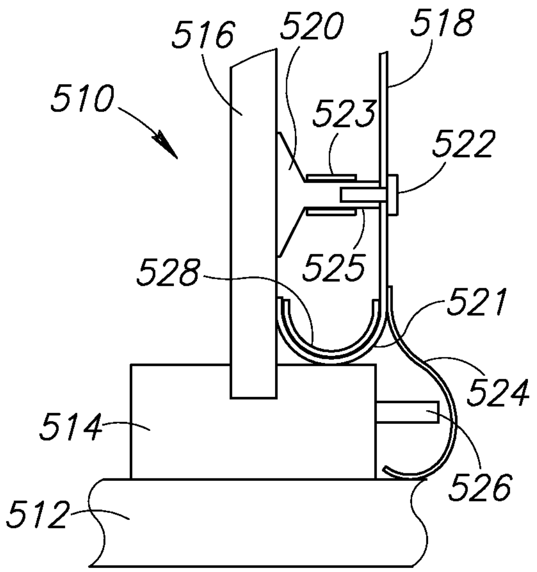
FIG. 15 is a diagram illustrating a side sectional view C-C' of the example window of FIG. 14 incorporating a first example infiltration blocker.
Figure 16:
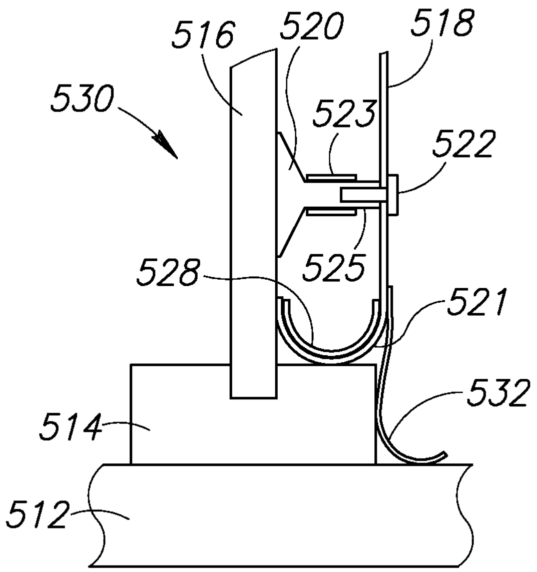
FIG. 16 is a diagram illustrating a side sectional view C-C' of the example window of FIG. 14 incorporating a second example infiltration blocker.

A diagram illustrating a side sectional view C-C' of the example window of FIG. 14 incorporating a first example infiltration blocker is shown in FIG. 15. This sectional view, generally referenced 510, comprises sill 512, the bottom rail 514 of the lower sash, window pane 516, sheet 518, spring 523, attachment mechanism 520 (e.g., suction cup), post 525 (shown in this example as that portion of the attachment mechanism extending from the suction cup, often referred to as the neck or nub, to the underside of the sheet), cap 522, corner brace 528, bullnose or edge seal 521, horizontal handle 526 and infiltration blocker 524. The installation of the supplemental window onto the window pane creates a substantially enclosed or trapped space (e.g., air) between the plastic sheet and window pane. Infiltration blocker 524 is attached to sheet 518 and extends over rail 514 and handle 516 and is compressed by contact with sill 512. The infiltration blocker is shown having an arc that provides additional space to the interior side rail 514 which is preferable in cases where the rail has a handle 526 attached to aid opening and closing the lower sash. Note that the springs 523 are shown comprising the spring shown in FIG. 6A, they may comprise the springs as shown in FIGS. 6B-6F described supra.

A diagram illustrating a side sectional view C-C' of the example window of FIG. 14 incorporating a second example infiltration blocker is shown in FIG. 16. In this sectional view, generally referenced 530, the bottom rail 514 is shown without a handle as in FIG. 15. The remainder of the components shown are similar to that of FIG. 15 with the exception that the infiltration blocker 532 is shown with an arc that bends toward, and may optionally contact, rail 514. Alternatively, the arc of infiltration blocker 532 may bend away from rail 514. When considering the installation of the infiltration blocker 532 on the vertical sides of the window, either of the above configurations for the arc allows the lower sash to be raised (and the upper sash to be lowered) while the infiltration blocker remains in sliding contact with the corresponding frame or jamb.

Figure 17:
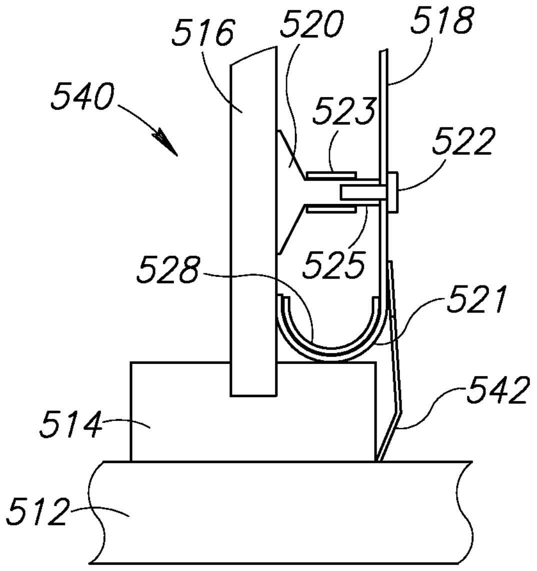
FIG. 17 is a diagram illustrating a side sectional view C-C' of the example window of FIG. 14 incorporating a third example infiltration blocker.

A diagram illustrating a side sectional view C-C' of the example window of FIG. 14 incorporating a third example infiltration blocker is shown in FIG. 17. In this sectional view, generally referenced 540, the bottom rail 514 is shown without a handle as in FIG. 15. The remainder of the components shown are similar to that of FIG. 15 with the exception that the end of the infiltration blocker 542 bends toward rail 514 with little or no bowing. When mounted to the upper sash, this lack of bowing toward the sliding path of the lower sash allows the lower sash to freely move past the infiltration blocker to open the window. In one embodiment, infiltration blocker 542 is sufficiently thin and flexible so that when installed on the upper sash it fits between the jamb or frame and stile or header and top rail of the upper sash. Similarly, infiltration blocker 542, when installed on the upper sash, may fit between the jamb or frame and stile of the lower sash, allowing the lower sash to be opened and closed without dismounting of the upper sash supplemental window or infiltration blocker. Alternatively, the end of infiltration blocker 542 may bend away from rail 514. In addition, as described infra, the check rail member separation may also be sufficient to allow infiltration blocker 542 to fit between the check rail members.

Figure 18:
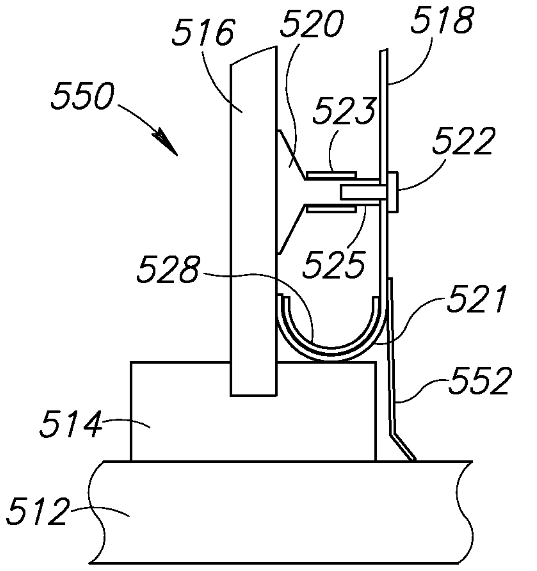
FIG. 18 is a diagram illustrating a side sectional view C-C' of the example window of FIG. 14 incorporating a fourth example infiltration blocker.

A diagram illustrating a side sectional view C-C' of the example window of FIG. 14 incorporating a fourth example infiltration blocker is shown in FIG. 18. In this sectional view, generally referenced 550, the bottom rail 514 is shown without a handle as in FIG. 15. The remainder of the components shown are similar to that of FIG. 15 with the exception that the end of the infiltration blocker 552 is shown bending away from the lower rail. Alternatively, the infiltration blocker may bend toward the lower rail or comprise an arc shape similar to those described supra.

Figure 19:
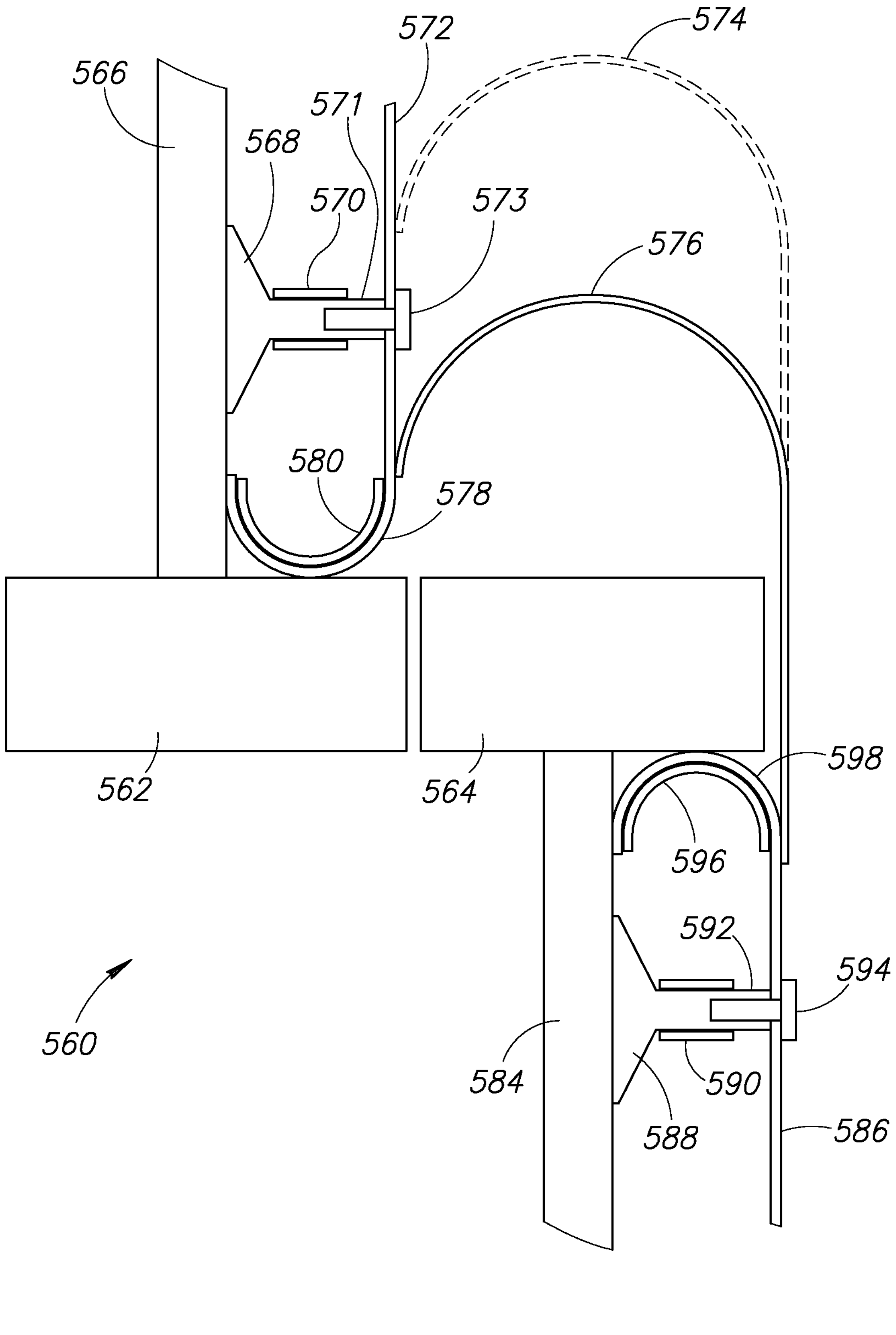
FIG. 19 is a diagram illustrating a side sectional view D-D' of the example window of FIG. 14.

A diagram illustrating a side sectional view D-D' along the check rail of the example window of FIG. 14 is shown in FIG. 19. An infiltration blocker covers the interface between the upper and lower sashes. In this case, the infiltration blocker is shown attached to the supplemental window unit attached to the lower sash pane thus allowing for operability of the lower sash. Additionally, foam or pile (not shown) may be used at the comers of the sashes between the infiltration blockers and the sash or stile to further inhibit air movement toward the interior.

The sectional view looking along the checkrail, generally referenced 560, comprises a lower sash and an upper sash. The lower sash comprises a top rail 564, window pane 584, sheet 586, post 592, spring 590, attachment mechanism 588 (e.g., suction cups), cap 594, corner brace 596 and bullnose or edge seal 598, creating substantially enclosed or trapped space (e.g., air) between the plastic sheet and window pane. The upper sash comprises a bottom rail 562, window pane 566, sheet 572, post 571, spring 570, attachment mechanism 568 (e.g., suction cups), cap 573, corner brace 580 and bullnose or edge seal 578, creating substantially enclosed or trapped space (e.g., air) between the plastic sheet 572 and window pane 566 and infiltration blocker 576. Note that the springs 590 may comprise the springs as shown in FIG. 6A describes supra.

The infiltration blocker 576 is attached to sheet 586 of the supplemental window attached to the lower sash and extends over the check rail members 564 and 562 contacting bullnose or edge seal 578 of the supplemental window attached to the upper sash. Alternatively, the infiltration blocker may be extended as shown in dashed lines 574 to contact sheet 572 above the post 571 and cap 573 of the supplemental window attached to the upper sash. In either case, the infiltration blocker functions to close the space immediately above the check rail which may be a source of air leakage between the upper and lower sashes.

Figure 20:
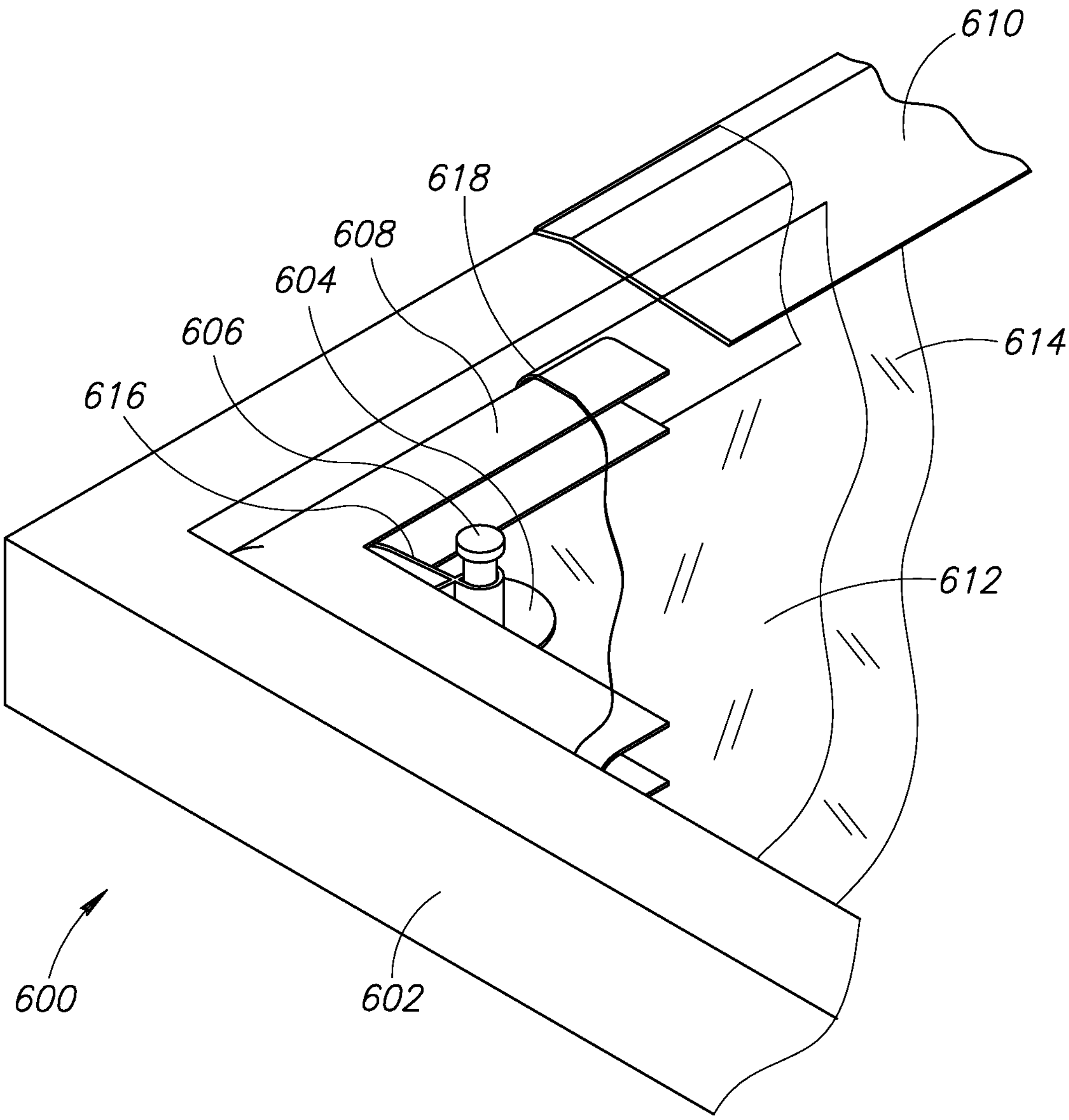
FIG. 20 is a diagram illustrating a perspective view of a corner portion of the example frameless supplemental window of FIG. 14 with infiltration blockers.

A diagram illustrating a perspective view of a corner portion of the example frameless supplemental window of FIG. 14 with infiltration blockers is shown in FIG. 20. The perspective view, generally referenced 600, of a corner portion of the window comprises sash 602, corner brace 608, sheet 612, window pane 614, attachment mechanism (e.g., suction cup, etc.) 604, cap 606, spring 616 and infiltration blocker 610 (shown partially for clarity purposes). When installed, the attachment mechanism functions to attach the supplemental window to the window pane. The spring applies a force against the corner brace so as to push the corner brace as well as the bullnose seal edge 618 into the corner of the window sash 602. Infiltration blocker 610 is attached to the sheet 612 and functions to prevent or minimize air leakage around one or more window elements, e.g., sash 602 and adjacent jamb, sill or header (not shown), into the interior air space. Note that the springs 616 may comprise the springs as shown in FIG. 6A describes supra.

A diagram illustrating a perspective view of a corner portion of an example supplemental window incorporating a reverse bullnose seal is shown in FIGS. 21A and 21B. In these perspective views, generally referenced 620, an alternative to the bullnose seal depicted in previous Figures is shown. In this embodiment, the bullnose edge seal is reversed such that rather than having a convex outward shape, the bullnose seal has a concave outward shape 624. The bullnose edge seal 624 is shown attached to the edge of the sheet 626 and sealed against the window pane 622. A corner support 628 attached to the pane side of the sheet (1) provides pressure against the mitered corners of the reverse bullnose seal, (2) aids in forming a tight corner seal against the pane and sash or frame, as well as (3) aiding in sealing against air leakage around the reverse bullnose by being shaped to substantially following the contours of the inward sides of the reverse bullnose when mounted on a window.

The corner support 628 is configured to have a 'U' shape whereby the top of the corner support 628 is attached to the sheet and then forms an arc and contoured tip to form a relatively tight fit with the inward sides of the reverse bullnose seal 624. A spring 623, such as shown in FIG. 6A, functions to push against the post and the corner support 628. Cap 621, post 627 and attachment mechanism (e.g., suction cup) 625 are also shown for attaching the supplemental window to the pane. In this embodiment, the optimum insulating distance can be set by the edge seal itself, by use of a spacer (not shown) or use of an attachment mechanism (e.g., suction cup) as described in detail supra.

In a further embodiment, corner support 628 may be formed from a sufficiently strong or thick material, such as a material similar or the same as sheet 626, so that corner support 628 acts as a spacer. In this case, cap 621, spring 623, attachment mechanism 625, and post 627 as shown in FIGS. 21A and 21B may be omitted and an adhesive attachment mechanism may be used between window pane 622 and corner support 628. Though FIGS. 21A and 21B show corner support 628 with a 'U" shape, alternative shapes such as a 'Z' or shape may be used for corner support 628. Attachment of corner support 628 to sheet 626 may be made using adhesive which is preferably transparent.

Figure 21C:
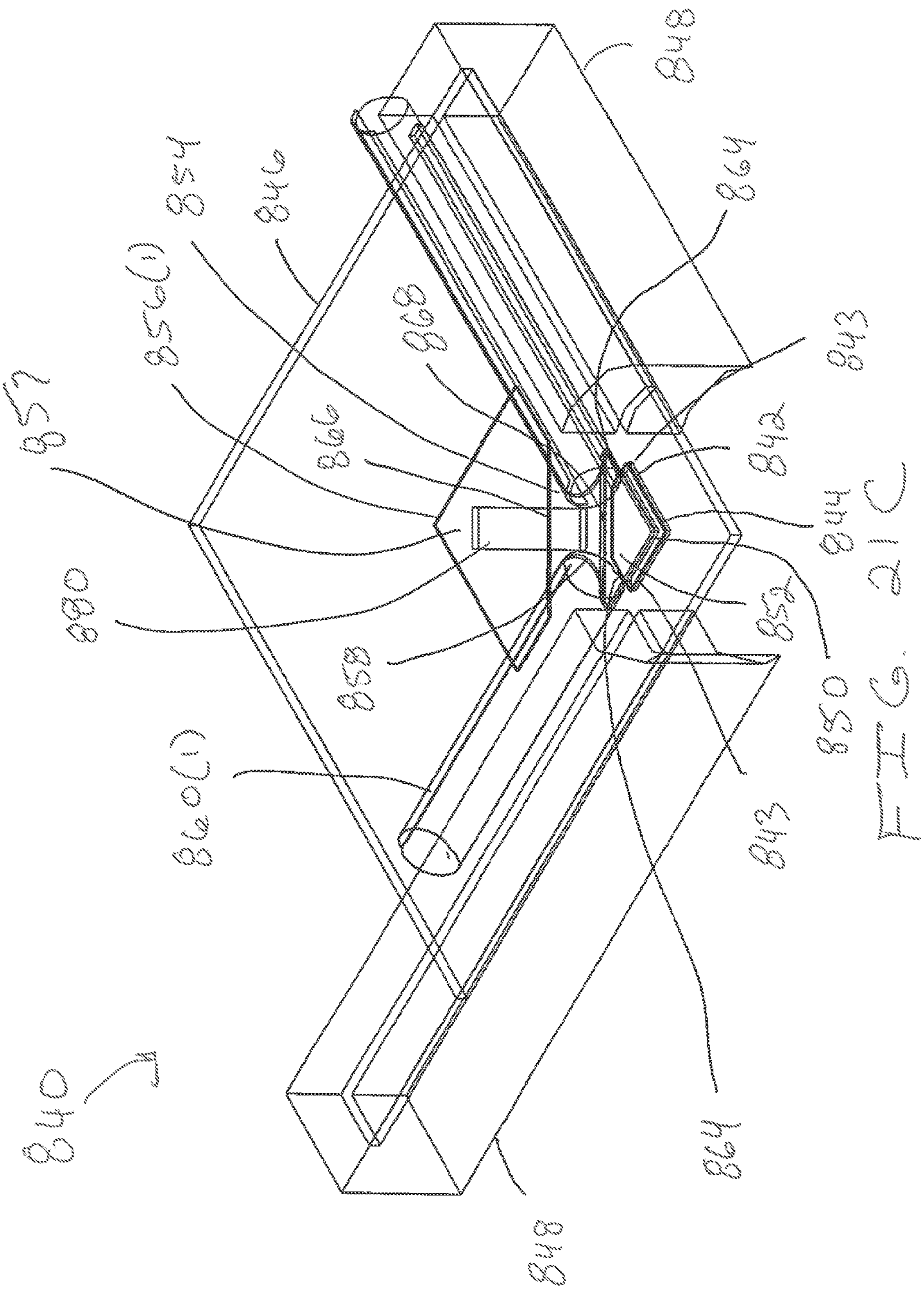
FIG. 21C is a transparent isometric view of an exemplary frameless supplemental window apparatus when installed in an existing window, with a corner of a sash/frame of the existing window cut away for clarity.
Figure 21D:
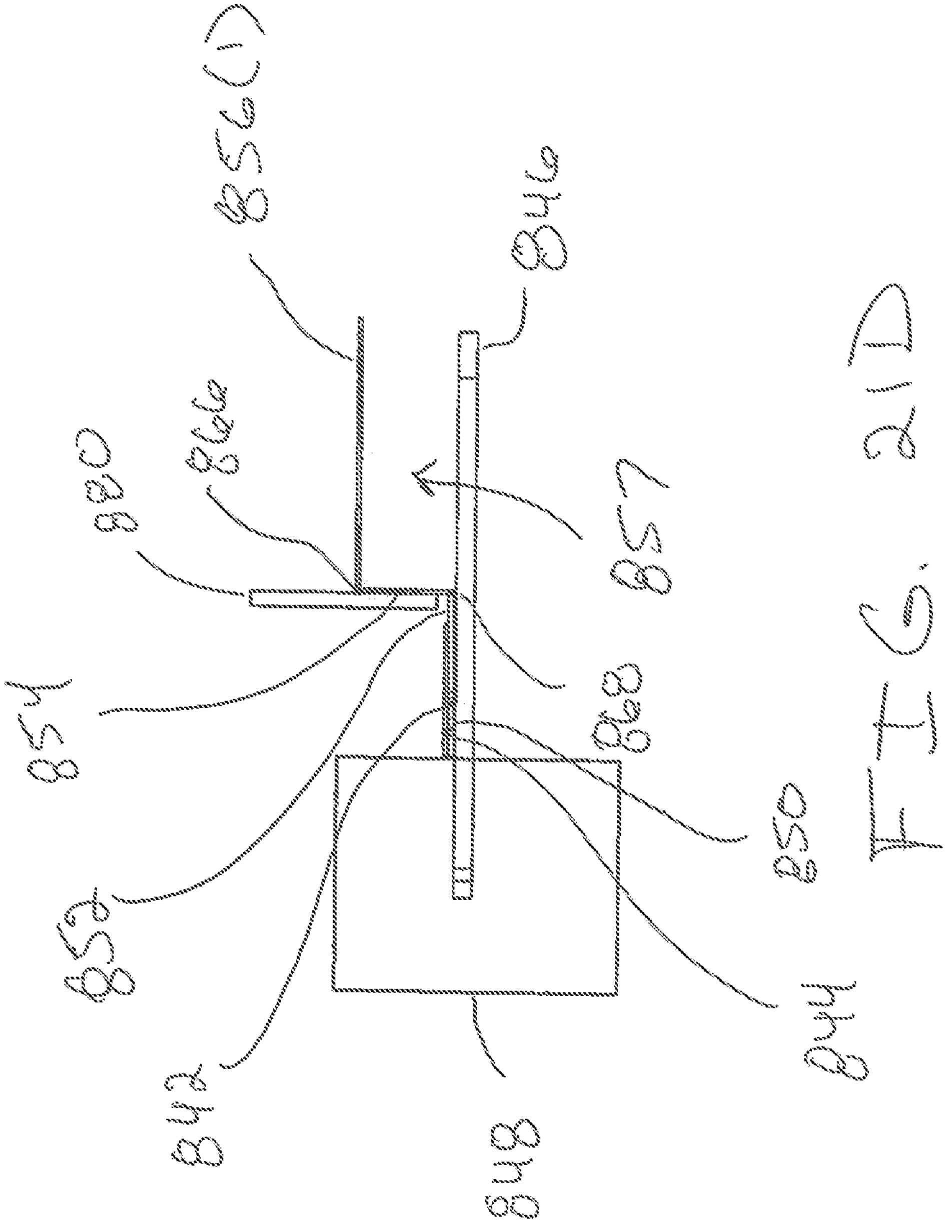
FIG. 21D is a side cross-sectional view of the exemplary frameless supplemental window apparatus when installed in an existing window shown in FIG. 21C.
Figure 21E:
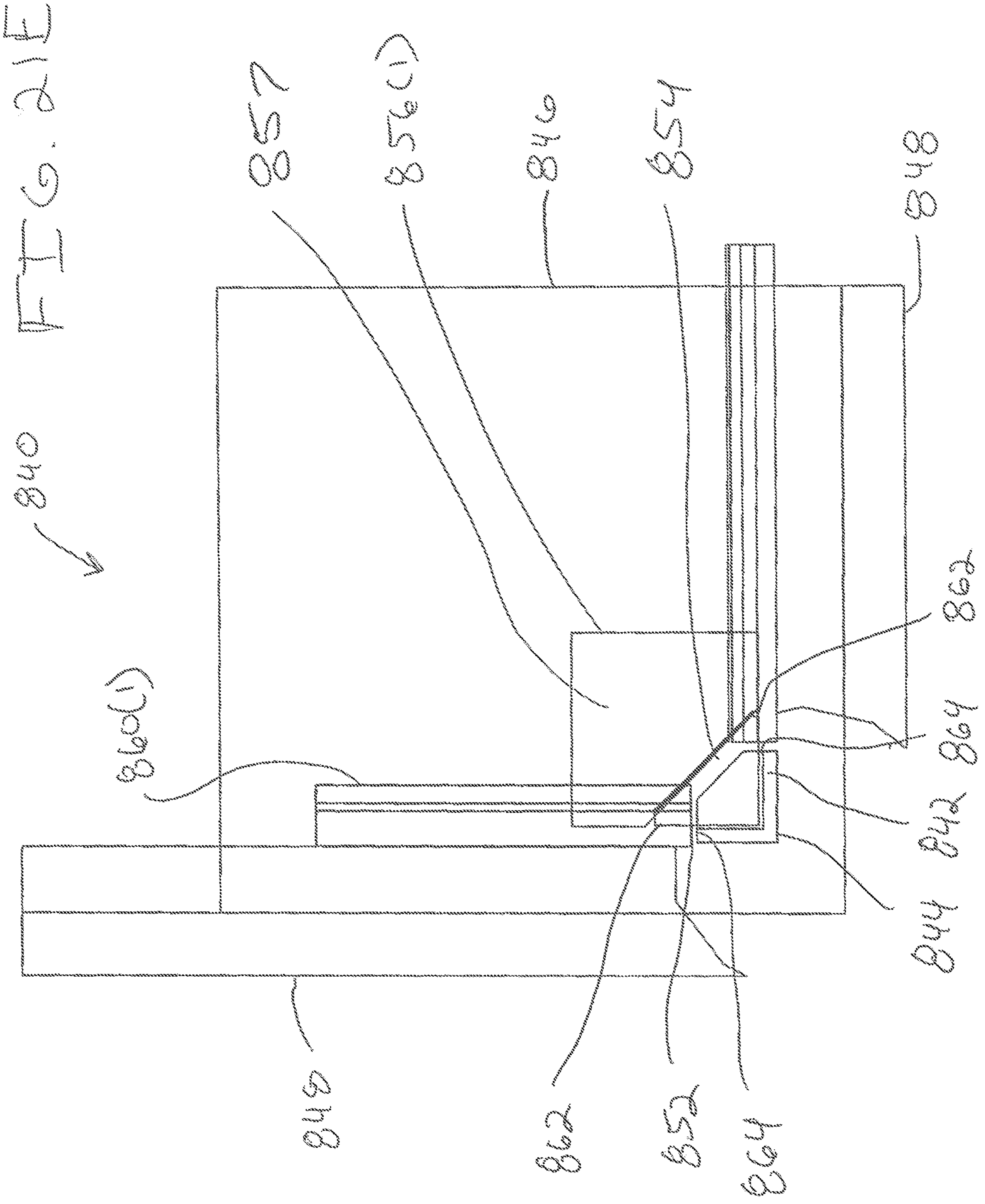
FIG. 21E illustrates a top view (omitting tab 880) of the exemplary frameless supplemental window apparatus when installed in an existing window shown in FIG. 21C.

Another example of a frameless supplemental window apparatus 840 is illustrated in FIGS. 21C-21E. The frameless supplemental window apparatus 840 incorporates and has the same structure and operation as the other disclosed examples herein except as illustrated and described below. The frameless supplemental window apparatus 840 is illustrated as installed in an existing window having a window pane 846 held by a sash or frame 848, by way of example only, although the frameless supplemental window apparatus 840 may be utilized with other types of window configurations (e.g., for prime windows with protruding muntins, whether holding, adhered to, or removable from the window pane 846, muntin interior surfaces and comers may function in the same way as sash/frame 848 as described infra). In this example, the frameless supplemental window 840 includes a constraint 842, a foot 852, a leg or spacer 854, a sheet 856(1), an edge seal 860(1), and an optional tab 880, although the frameless supplement window apparatus 840 may include additional types and/or numbers of elements in other configurations. This example of the frameless supplemental window apparatus provides a number of advantages including providing easier mounting and dismounting, improved operability of the existing window to which the frameless supplemental window apparatus is installed, and fewer parts leading to lower manufacturing costs.

Referring now more specifically to FIG. 21C, which illustrates the corner of the sash/frame 848 cut away for clarity, the constraint 842 is attached to the window pane 846 of the existing window using an adhesive 844. Although a single constraint is described, it is to be understood that a constraint may be utilized in each corner of an existing window. Strong, clear adhesive materials that are compatible with glass and plastic, such as 4905 or 4910 VHB acrylic adhesives manufactured by 3M Manufacturing, Maplewood, Minnesota, may be employed, although other suitable adhesives may be utilized for attaching the constraint 842 to the window pane 846. When such adhesives are placed at perimeter locations of the window pane 846, such as abutting the edges of the sash/frame 848 at the corners, they provide an aesthetically unobtrusive attachment of the constraint 842 to the window pane 846. In one example, the constraint 842 has edges 843 configured to be located parallel and adjacent or abutting to the sash/frame 848 at each inward facing interior surface corner of the sash/frame 848 that holds the window pane 846.

In this example, the adhesive 844 discussed above is applied along the entire length of each outward edge of the constraint 842 to form an "L" shape, but not under the entire constraint 842, although the adhesive could be applied in other manners. The application of adhesive 844 in this manner provides for a slot 850 that is formed extending under the constraint 842 to the edge where the adhesive 844 is and between at least a portion of the constraint 842 and the window pane 846. The height of the slot 850 is determined based on the thickness of the adhesive 844, when the constraint 842 is applied to the window pane 846, in the direction perpendicular to the window pane 846, although other manners for setting the height could be used, such as with a spacer of a specified height held in place by the adhesive 844 by way of example only. The slot 850 is defined by the volume between the constraint 842 and the window pane 846 where the adhesive 844 does not extend beyond the edges of the constraint 842 and is sized and configured to detachably receive at least a portion of the foot 852 of the frameless supplemental window apparatus 840 as illustrated and described below. The slot 850 has dimensions parallel to the window pane 846 that allow for movement of the foot 852 within the slot 850 to aid in accommodating measurement error and on site adjustment during installation of the frameless supplemental window apparatus 840. In this example, the constraint 842 includes triangular or truncated edges 864 to allow a portion of the foot 852 to extend beyond the truncated edges 864 when installed in the slot 850 between the constraint 842 and the window pane 846, although other configurations may be employed.

Additionally, the constraint 842 when adhered by adhesive 844 to the window pane 846 is rigid to facilitate insertion of the foot 852 into the slot 850 as discussed below, although other types and/or numbers of materials with other properties could be used. In one example, the constraint 842 is fabricated with a notch (not shown) along the non-adhered edge to allow for insertion and removal of the foot 852 from the slot 850 with less required force.

In this example, the constraint 842 is configured with a low profile, or thickness perpendicular to the window pane 846, in order to allow clearance when installed on an existing window, although the constraint 842 may have other sizes and configurations. By way of example, the total thickness of the constraint 842 and the adhesive 844 perpendicular to the window pane 846 is less than about 0.25 inch, preferably less than 0.125 inches, although other combined thicknesses of the constraint 842 and the adhesive 844 may be utilized. This thickness is typically less than the clearance required for sliding a sash when the frameless supplemental window apparatus 840 is installed on a vertical or horizontal sliding window. By keeping the combined thickness of the constraint 842 and the adhesive 844 to less than the clearance distance from the stationary window pane 846 to the sliding sash, the sliding sash may be opened and moved over the constrain 842 without obstruction by removing the frameless supplemental window apparatus 840 from the stationary window pane 846 as discussed below. In one example, when using the frameless supplemental window apparatus 840 with prime windows that slide to open (e.g., vertical sliding or horizontal sliding) having a sash lock, the constraint 842 is configured with a dimension, in the direction of the sash sliding, larger than that of the sash lock in the direction of sash sliding, to enable placement of the constraint 842 in the corner of the window pane 846, while allowing the frameless supplemental window apparatus 840 to be held in place by the constraint 842 without disruption of the sealing edge by the sash lock hardware attached to the prime window stationary window pane 846.

The foot 852 is configured to be inserted into the slot 850 formed by the attachment of the constraint 842 to the window pane 846 to provide a seal against the window pane 846. The foot 852 is sized and configured to slide into and out of the slot 850 at each corner of the window pane 846 to provide a releasable or detachable attachment of the frameless supplement window apparatus 840 to the existing window. When installed, the foot 852 is substantially parallel to and in contact with the window pane 846. In this example, the foot 852 includes tips 862 that are not covered by the constraint 842 when the foot 852 is inserted into the slot 850 as shown in FIG. 21E that interact with the edge seal 860(1) when installed as described below.

Referring again to FIG. 21C, the spacer 854 is coupled to the foot 852, by example through an adhesive, although in another example the spacer 854 and the foot 852 are formed from the same continuous sheet of material by providing a bend in the material between the spacer 854 and the foot 852. In one example, the spacer 854 and the foot 852 are formed to create a right angle, although the spacer 854 and the foot 852 may alternatively form a continuous arc as illustrated for the corner support 628 shown in FIGS. 21A and 21B. Referring again to FIG. 21C, in this example, the spacer 854 includes a formed edge 858 that is, by way of example, cut to enable conformity with the edge seal 860(1) as shown in FIG. 21C, although the spacer 854 may have other configurations to conform to other types of edge seals. Although formed edge 858 is described as being cut, the formed edge 858 may be manipulated in other manners, including cutting, to establish the necessary conformity with the edge seal 860(1). Optionally, in one example the formed edge 858 of the leg spacer 854 and the conforming portion of the edge seal 860(1) are welded or adhered together or sealed with grease at or along the arc of contact of these parts.

Other examples utilizing a spacer, such as the spacer 854 formed from the sheet 856 by way of example only, are also contemplated in the present technology. In one example, a corner brace such as shown in FIGS. 5A, 5B, and 7A through 7E may be used with the spacer 854 and an edge seal such as shown in FIGS. 3, 4A, 4B, 4C, 10A, 10B, and 11A through 11E. In such configurations, the corner brace may be mechanically or adhesively attached to the spacer 854 such that the spacer edges contact the corner brace while the corner brace exerts an outward force against the edge seal. In one example, the spacer 854 is formed from the same continuous material as the sheet 856 and, as described below, may be used with the edge seal 860(1) also formed from the same continuous material as the sheet 856(1).

The sheet 856(1) is coupled to the spacer 854, such that the sheet 856(1) extends parallel to the window pane 846 when the frameless supplemental window 840 is installed. In this example, the sheet 856(1) is substantially planar throughout, although in other examples a sheet 856(2) may contain edges that are bent away from the window pane 846 to form a flap 870 (FIGS. 21G and 21H), or a sheet 856(3) may contain edges that are bent toward the window pane 846 to form a flap 872 (FIGS. 211 and 21J), when the frameless supplemental window apparatus 840 is mounted, as discussed below. The sheets 856(2) and 856(3) are otherwise similar in structure and operation to the sheet 856(1). The sheet 856(1) has vertical and horizontal dimensions substantially similar to the vertical and horizontal dimensions of the window pane 846 on which it is to be mounted. The dimensions of the window pane 846 are defined by the inward interior surfaces of the window element (in this case the sash/frame 848) that holds the windowpane 846.

In one example, the sheet 856(1), the foot 852, and the spacer 854 are formed from a single, continuous, unitary piece of material by utilizing corner cuts to form the shape of the foot 852, the spacer 854, and the sheet 856(1), although the sheet 856(1), the foot 852, and the spacer 854 may alternatively be formed from different pieces of material and adhesively attached or welded to one another. For example, the foot 852 and the spacer 854 may be fabricated from a single piece of material with a small additional section to allow for attachment (e.g., welding or adhesive) of a surface parallel to the sheet 856. Suitable examples of materials for these parts are discussed herein supra. In the example illustrated in FIGS. 21C-21E, the foot 852 and the spacer 854 have been formed by cutting and forming or bending near the corner of the sheet 856(1). In this way, the sheet 856(1), the spacer 854, and the foot 852 are fabricated from a single, continuous, unitary piece of material. Forming the parts from a single piece of material, without requiring additional assembly and attachment, advantageously provides a frameless supplemental window apparatus with fewer parts and less manufacturing requirements, thus leading to anticipated lower costs. As shown, the bent portions at or near a first intersection 866 between the sheet 856(1) and the spacer 854 and a second intersection 868 between the spacer 854 and the foot 852, as shown in FIG. 21D, act as cantilever springs that allow further bending when pressure is applied by the end user during attaching and detaching of the frameless supplemental window apparatus 840. In addition, when such pressure is applied, flexing of the sheet 856(1) may also occur during mounting and dismounting of the frameless supplemental window apparatus 840.

In this example, the sheet 856(1), when installed, provides a gap 857, such as a volume of gas, between the sheet 856(1) and the window pane 846, as shown in FIG. 21D. The thickness or spacing of the gap 857 is determined by the combination of the height of the foot 852 above the window pane 846 and the height of the spacer 854 in the direction perpendicular to the window pane 846. Thus, the spacing, and thus the volume, of the gap 857 is substantially independent of the thickness of the adhesive 844 used to attach the constraint 842 to the window pane 846. In an alternative example, the foot 852 may be supplied with the adhesive 844 on its outward edges or substantially covering its surface facing the window pane 846 to enable direct attachment of the foot 852 to the window pane 846. In this case, the constraint 842 may be omitted and the thickness of the gap 857 is defined by the thickness of the adhesive 844, the thickness of the foot 852, and the height of the spacer. Whether using the constraint 842 as described above or directly adhering the foot 852 to the window pane 846, the attachment mechanism, adhesive 844, is configured to be predominantly located outward from the spacer 854. Such a configuration, in which the foot 852, the spacer 854, the attachment mechanism 844, and the edge seal 860(1) are substantially aligned at or near the perimeter region of the window pane 846, is beneficial for minimizing refractive index differences, optical distortions, or reflections off surfaces not parallel to the window pane 846 in the non-perimeter region of the window pane 846 and enables easy mounting and dismounting.

Referring again to FIG. 21C, the edge seal 860(1) is constrained inward along interior surfaces of the sash/frame 848 to provide sealing between the edges of the frameless supplement window apparatus 840 and the sash/frame 848. Optionally, the edge seal 860(1) may also comprise sealing material as shown in FIG. 10A such that sealing is provided to the sash/frame 848 along the length of the edge seal 860(1).

Figure 21F:
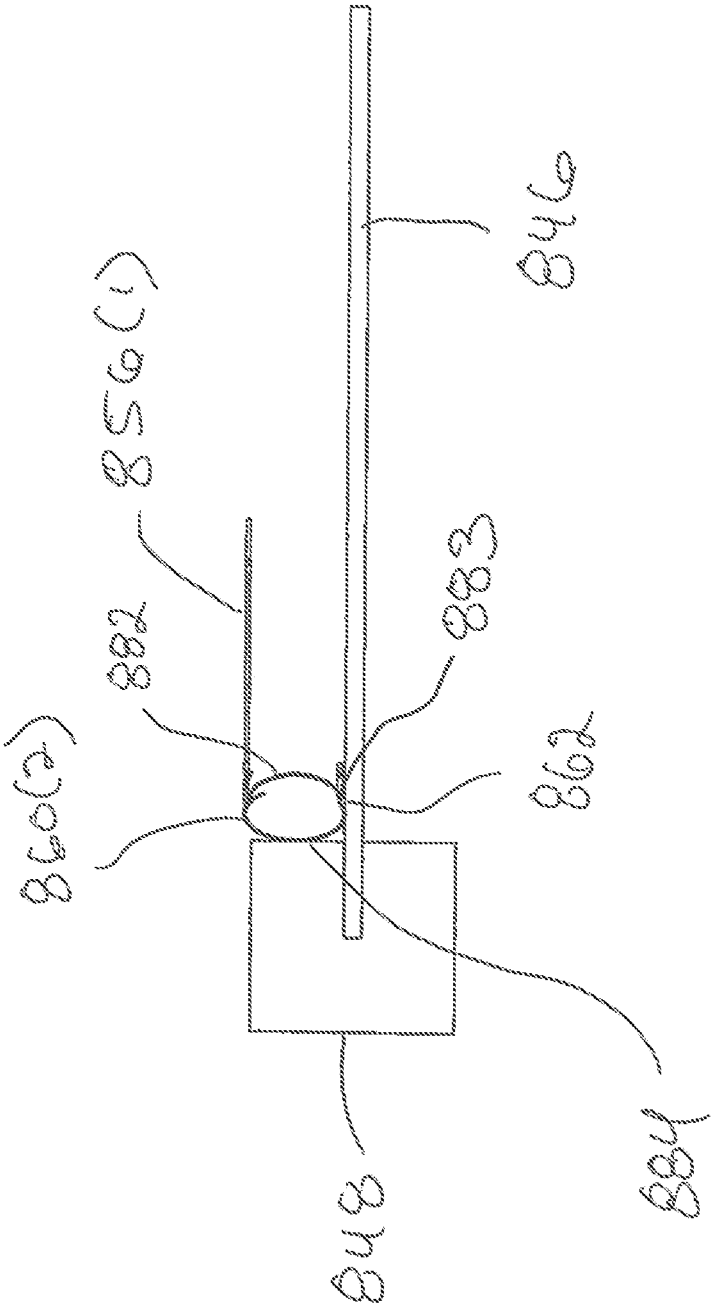
FIG. 21F is a side cross-sectional view of an exemplary configuration of an edge seal for use with the frameless supplemental window apparatus when installed in an existing window shown in FIG. 21C.

In one example, as illustrated in FIG. 21F, another example of an edge seal 860(2) has a cross-sectional shape approximating a “3”. The edge seal 860(2) is the same in structure and operation as the edge seal 860(1) except as described below and may incorporate features described with respect to edge seal 860(1). In this example, one end of the cross-section of the edge seal 860(2) attaches to or is formed from the sheet 856, one arc 882 of the cross-section conforms to the formed edge 858 of the leg spacer, the middle portion 883 of the “3” in the cross-section aligns with a step formed by the foot tip 862 at the surface of the window pane 846, and the other arc 884 of the cross-section rolls so as to form a self-touching spiral when constrained by the window pane 846, the sash/frame 848, the sheet 856(1), and/or the first end or arc 882 of the edge seal 860. When a “3” cross-section is employed for the edge seal 860(2), as shown in FIG. 21F, the portion of the edge seal 860(2) attached to the sheet 856(1) and conforming to the formed edge 858 of the spacer 854 may have a larger thickness than the remaining portion of the cross-section of the edge seal 860(2), by way of example. This provides more robustness and rigidity to the frameless supplemental window apparatus 840 while enabling compression and compliance of the outward arc of the edge seal 860(2) with the window pane 846, the sash/frame 848, and either the sheet 856(1) or the thicker portion of the edge seal 860(2) as the spiral is formed. The edge seal 860(2) having more than one cross-sectional thickness may be fabricated from more than one piece of material using adhesive or welding, or from a single piece that is formed with the different thicknesses. Optionally, further sealing of the middle portion 883 of the “3” cross-section of the edge seal 860(2) near the tips 862 of the foot 852 may be provided by the application of grease, such as silicone grease.

Figure 21G:
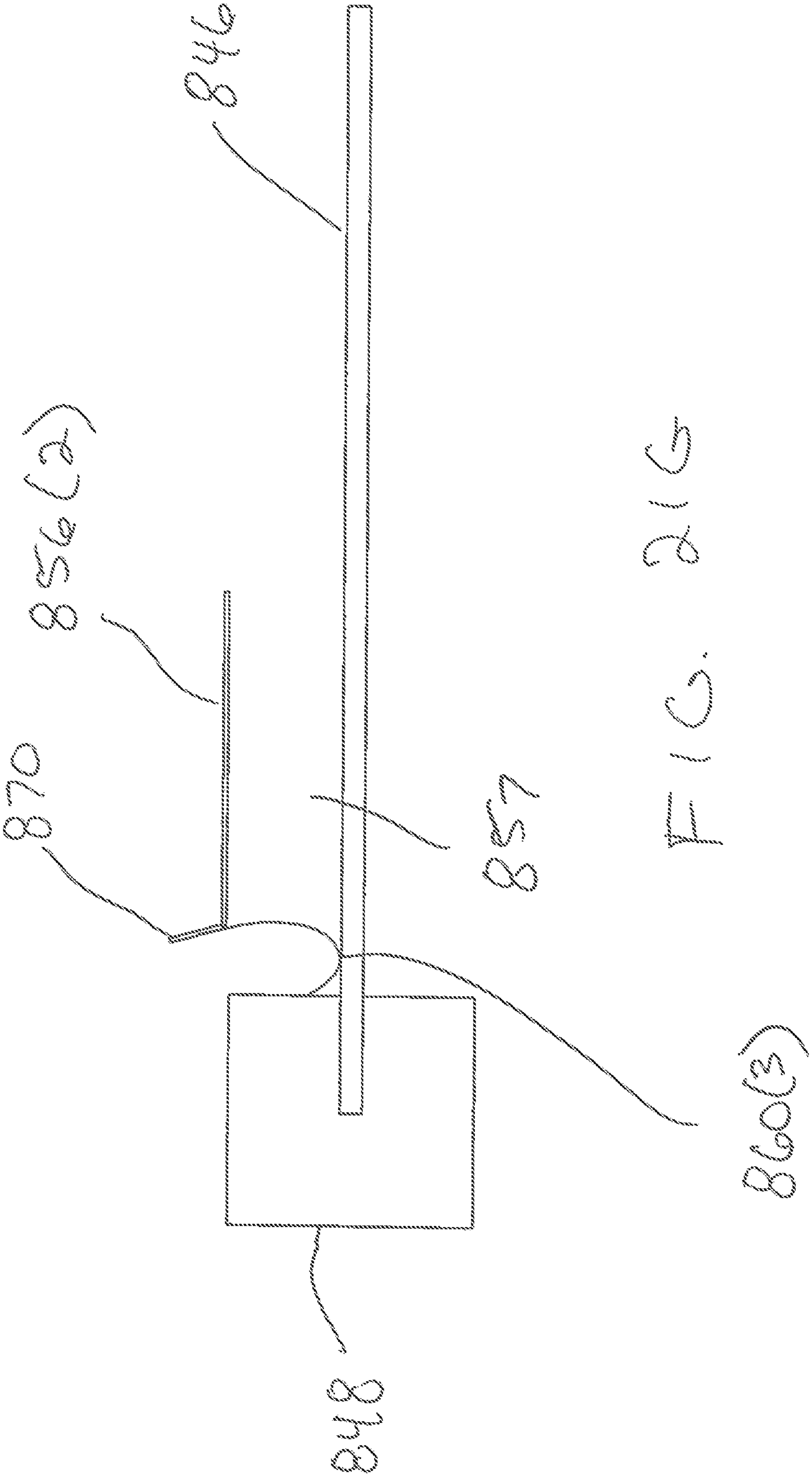
FIG. 21G is a side cross-sectional view of an exemplary configuration of an edge seal when interacting with a tab extending away from the window pane when the frameless supplemental window apparatus is installed.
Figure 21H:
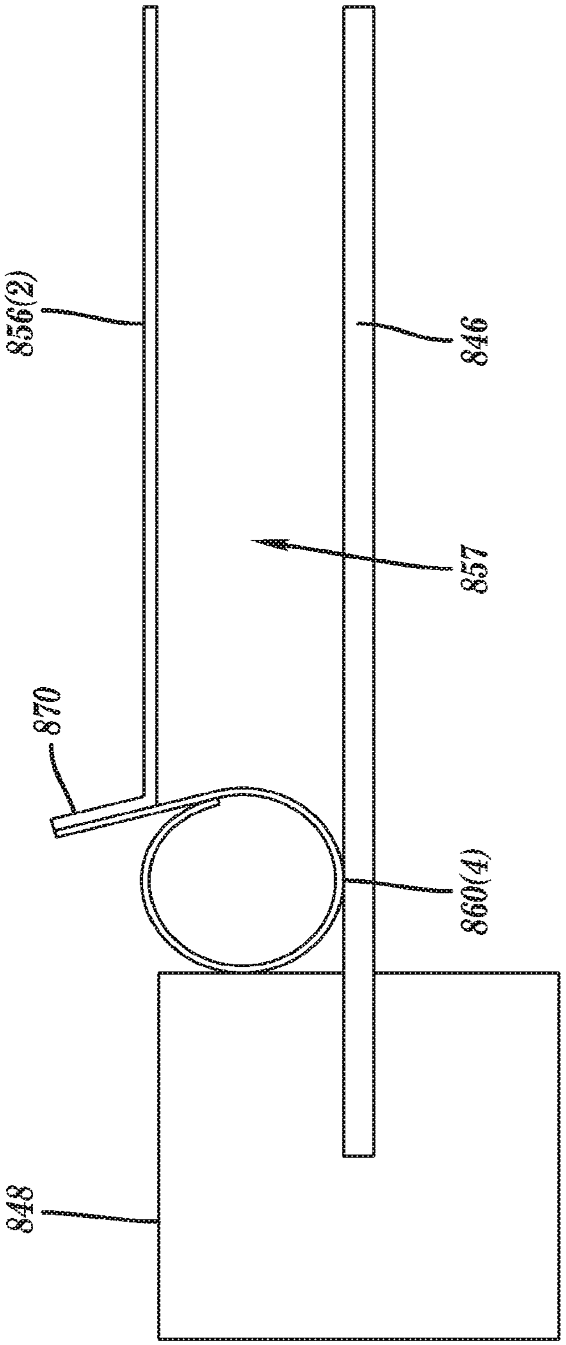
FIG. 21H is a side cross-sectional view of another exemplary configuration of an edge seal when interacting with a tab extending away from the window pane when the frameless supplemental window apparatus is installed.

Referring again to FIG. 21C, in one example, the edge seal 860(1) includes a slit positioned along its cross-section therein so that the slit is aligned against the side of one of the tips 862 of the foot 852 when installed, eliminating the need for multiple slits when the edge seal 860(1) has a cross section such as shown in FIG. 21H. Cutting, slitting or notching of the edge seal 860(1) may be done in a self-aligned manner with foot 852 since the edge seal 860(1) does not need to overlay the constraint 842. Such cutting, slitting, or notching may be done in the edge seal 860(1) comprising a single continuous piece of material or comprising more than one piece of material around the perimeter of the frameless supplemental window apparatus 840. When the edge seal 860(1) comprises a single continuous piece of material, cuts or notches may be provided at both the edge that couples to the sheet 856(1) and the edge of the edge seal portion that is mechanically isolated from the foot 852, the spacer 854, and other edge seal portions that may be adjusted or constrained by the sash/frame 848 and/or the window pane 846. The cuts or notches provided in the single continuous edge seal 860(1) allow formation of a corner formed by bending each side of the cut or notch away from the other side of the cut or notch. The formed edge seal corners and the ends of the single continuous piece are preferably located outward from each spacer 854 over an outwardly extended foot 852 and/or constraint 842. Multiple closely spaced slits may be made in the edge seal 860 at each location that the edge seal 860(1) will overlay protruding muntins that may be present on the prime window to which the frameless supplemental window apparatus 840 is attached. Such closely space slits allow the edge seal 860(1) to conform to the protruding muntin shape while enabling the neighboring continuous regions of the edge seal 860(1) to maintain contact with the window pane 846.

Figure 21I:
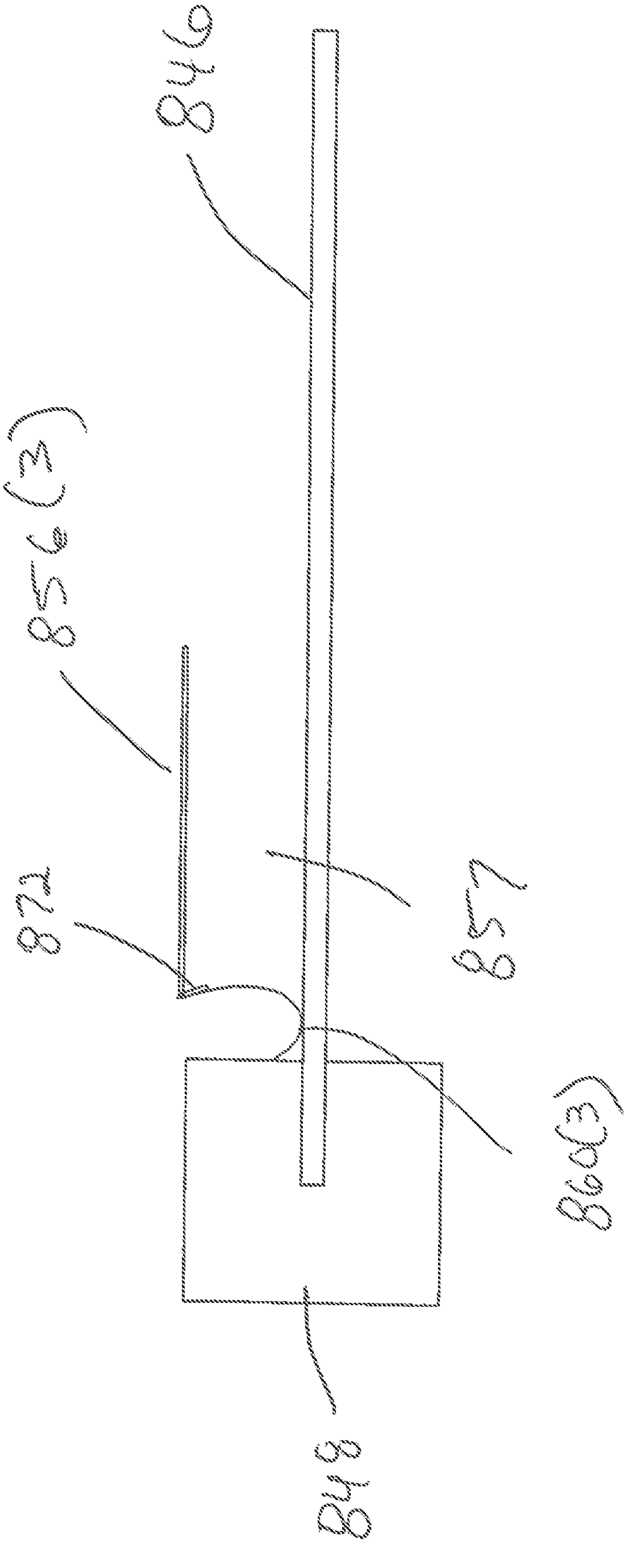
FIG. 21I is a side cross-sectional view of an exemplary configuration of an edge seal when interacting with a tab extending toward the window pane when the frameless supplemental window apparatus is installed.
Figure 21J:
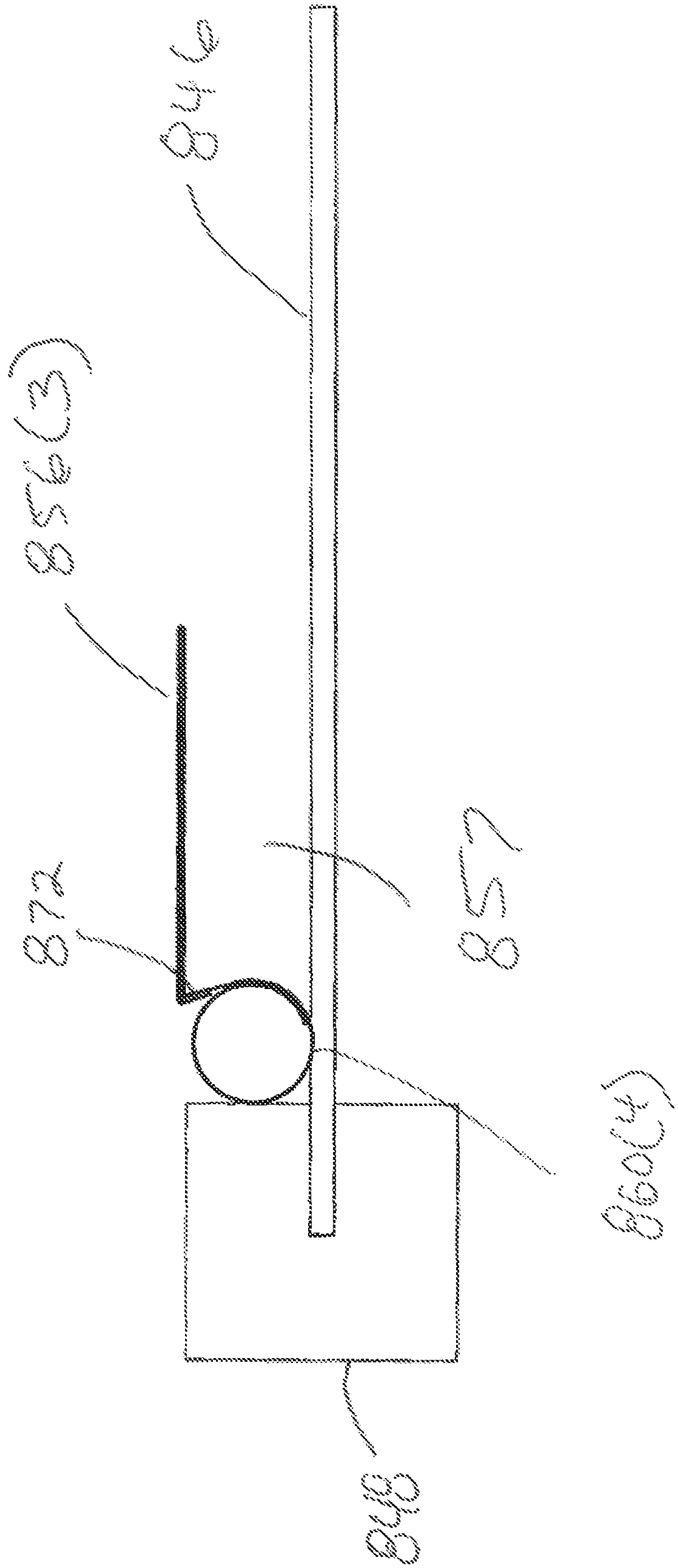
FIG. 21J is a side cross-sectional view of another exemplary configuration of an edge seal when interacting with a tab extending toward the window pane when the frameless supplemental window apparatus is installed.
Figure 21K:
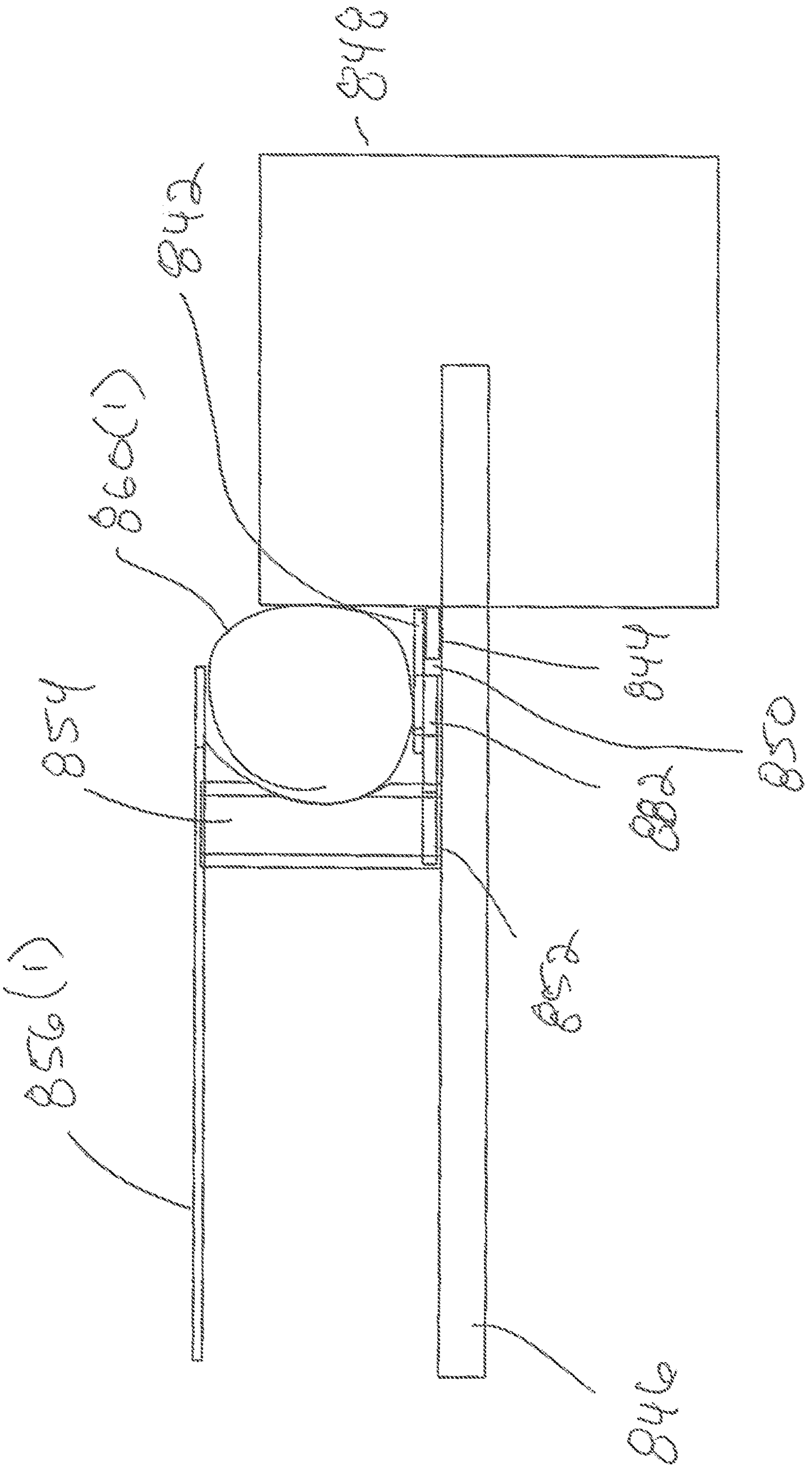
FIG. 21K is a side cross-sectional view of another exemplary configuration of an edge seal interacting with a sealing material when the frameless supplemental window apparatus is installed.

Referring now to FIG. 21K, in one example the edge seal 860(1) overlays the constraint 842. In this example, an additional sealing material 882 similar to that shown in FIG. 10A is provided to close the gap that forms between the edge seal 860(1) and the window pane 846 between the tips 862 of the foot 852 along the edge between adjacent comers. Examples of materials described supra for sealing materials may be used advantageously with outward concave edge seals so that the end user may easily exert pressure on the sealing material 882/window pane 846 contact area. Alternatively, a thin plastic film may be provided on the sealing material 882. Such plastic film inhibits sticking of the sealing material 882 in undesired locations on the window pane 846 during mounting, while providing a smooth surface to contact the window pane 846. In an alternative example, the thin plastic film may be welded directly to the edge seal 860(1). In these examples, the thickness of the sealing material 882 or the combined thickness of the sealing material 882 and the plastic film is chosen to be the same or slightly thicker than the combined thickness of the constraint 842 and the adhesive 844. This example may also benefit from the use of coating or layer materials (described supra) on the edge seal 860(1), a corner closure, the spacer 854, and/or the constraint 842.

In examples where perimeter edges of the sheet are bent, such as exemplary sheets 856(2) and 856(3) as shown in FIGS. 21G-21J, the edge seal is bonded (using adhesive or welding) to the bent portion of the edges of the sheet 856(2) or 856(3). The sheet edges are bent to allow the edge seal to conform to the formed edge 858 of the spacer 854 or other corner closure. FIGS. 21G and 21H illustrate flaps 870 formed by bending the edges of the sheet 856(2) away from the window pane 846 along each perimeter edge of the sheet 856(2) to which an edge seal is attached, such as the edge seal 860(3) without spiral formation (FIG. 21G) and the edge seal 860(4) with (FIG. 21H) spiral formation, respectively. FIGS. 21I and 21J illustrate flaps 872 formed by bending the edges of the sheet 856(3) toward from the window pane 846 along each perimeter edge of the sheet 856 to which an edge seal is attached, such as the edge seal 860(3) without spiral formation without (FIG. 21I) and the edge seal 860(4) with (FIG. 21J) spiral formation, respectively. The bend angle of flaps 870 or 872 to the sheet 856 is preferably such that the edge seal 860(3) or 860(4), when attached to the outward facing surface of the flap 870/872, conforms to the shape of the formed edge 858 of the leg spacer 854 or other corner closure having an outward force on the edge seal 860(3) or 860(4). In the case of sheet edges bent toward the side to which the window pane 846 resides when mounted to form the flap 872 as illustrated in FIGS. 21I and 21J, the formed edge 858 of the leg spacer 854 may be modified to accept the flap 872 in a friction fit manner, with the edge seal 860(3) or 860(4) attached to the outward surface of the flap 872.

When such bent sheet edges/flaps 870 or 872 are used, advantages gained include added sheet rigidity and additional surfaces for the end user to grip the frameless supplemental window apparatus 840 during mounting or dismounting. The flaps 870 and 872 also allow for substantially aligning seal materials with the profile of the formed edge 858 of the spacer 854 or other corner closure when the edge seal 860(3) or 860(4) is attached to the flaps 870/872 of the sheet 856. Further, the seal material may be directed by the flaps 870/872 of the sheet 856 enabling the spacer 854 to apply an outward force on the edge seal 860(3) or 860(4). As described supra, gap closure between any of the disclosed edge seals and the spacer 854 corner closure may be accomplished using for example grease, foam, pile, etc.

As illustrated in FIGS. 21G and 21H, a perimeter edge of the sheet 856(2) is bent such that when attached to the window pane, the flap 870 is directed away from the window pane 846 and the edge seal 860(3) or 860(4) is attached to the flap 870. The flap 870 may be continuous along each sheet edge or, optionally, may for example be cut, slit, or notched in one or more locations to aid bending of the sheet 856(2) during mounting or dismounting of the frameless supplemental window apparatus 840. Attachment of the edge seal 860(3) or 860(4) to the flap 870 may be made along perimeter edge length with an adhesive or by welding. The cross-sectional edge seal 860(3) shape may form a "J" as shown in FIG. 21G or, by making the edge seal from a wider strip of plastic the edge seal 860(4) may roll back on itself as illustrated in FIG. 21H. When rolled back on itself, the edge seal 860(4) may form a tube and/or coiled spring that can advantageously have its diameter adjusted parallel to the window pane 846 constrained by the location of the mounted position of the spacer 854 and the sash/frame 848, forming an additional air space within the coiled spring. These advantages are obtained due to the congruent nature of the frameless supplemental window apparatus 840 and the area of the window pane 846 in the opening formed by the interior inward surfaces of the opening of the sash/frame 848.

Alternatively, as illustrated in FIGS. 21I and 21J, the flap 872 may be directed toward the window pane 846 when the frameless supplemental window apparatus 840 is mounted. While FIG. 21I is shown with the edge seal 860(3) attached to the outward facing surface of the flap 872, the edge seal 860(4) may alternatively be attached to the inward facing surface of the flap 872 as shown in FIG. 21J. In this example, the formed edge 858 of the spacer 854 near the sheet 856(3) (as shown in FIG. 21C) (furthest from the window pane 846 when mounted) may be notched to accommodate and/or friction fit the flap 872 or the edge of the spacer 854 may be slit so that the flap 872 is held by the spacer 854 near its shaped edge.

Referring again to FIG. 21C, the optional tab 880 may be provided as an attachment to the spacer 854, by way of example only by an adhesive, although optional tab 880 may be formed from the same continuous material as the spacer 854. The optional tab 880 may be used by the end user to hold the frameless supplemental window apparatus 840 and to obtain additional leverage for insertion and/or removal of the frameless supplemental window apparatus 840. The optional tab 880 further provides support for holding the frameless supplemental window apparatus 840 when dismounted from a stationary window pane 846 of a sliding window, when opening the sliding window is desired. In addition, optional tab 880 may be configured for attachment of an infiltration blocking apparatus.

An exemplary operation of the frameless supplemental window apparatus 840 when employing the constraint 842 will now be described with reference to FIGS. 21C-21K.

In a first step, in order to apply the frameless supplemental window apparatus 840 to an existing window having a sash/frame 848 holding a window pane 846, the constraint 842 is attached to the window pane 846 of the existing window using an adhesive 844. The constraint 842 advantageously allows for easy mounting and removal of the frameless supplemental window apparatus 840 as described below. The adhesive 844 is placed along and/or abutting the edges of the sash/frame 848 at the comers of the window pane 846. The adhesive 844 is applied along the entire length of each outward edge of the constraint 842 to form an "L" shape. The application of adhesive 844 in this manner provides for a slot 850 formed between at least a portion of the constraint 842 and the window pane 846. The edges of the constraint 842 are then aligned parallel and adjacent or abutting to the sash/frame 848 at each inward facing corner of the sash/frame 848. The adhesive 844 holds the constraint 842 to the window pane 846 adjacent and parallel to each edge of the sash/frame 848 edge at the corner in which the constraint 842. In this example, the constraint 842 is applied to each of the four corners of the window pane 846 of the existing window, resulting in the use of four constraints 842 for the rectangular window pane 846.

Next, the foot 852 of the frameless supplemental window apparatus 840 is inserted into the slot 850 created by the constraint 842 as shown in FIG. 21C. The insertion of the foot 852 into the slot 850 provides a substantial corner closure for the frameless supplemental window apparatus 840 at the surface of the window pane 846. Although a single foot 852 is described and illustrated, it is to be understood that a foot is inserted into a constraint located at each corner of the window pane 846 of the existing window. The constraint 842 when adhered by adhesive 844 to the window pane 846 is rigid to facilitate insertion of the foot 852 into the slot 850 as discussed below and to maintain contact of the foot 852 with the surface of the window pane 846. The slot 850 has dimensions parallel to the window pane 846 that allow for movement of the foot 852 within the slot 850 to adjust the positioning to aid in accommodating measurement error and on site adjustment during installation of the frameless supplemental window apparatus 840. In this example, a portion of the foot 852 extends beyond the truncated edges 864 when installed in the slot 850 below the constraint 842 to expose the tips 862 of the foot 852.

Insertion of the foot 852 into the slot 850 is aided by the first intersection 866 between the sheet 856(1) and the spacer 854 and the second intersection 868 between the spacer 854 and the foot 852, as shown in FIG. 21D, which act as cantilever springs that allow further bending when pressure is applied by the end user during insertion for the feet 852 into the slot 850 of the constraint 842. The sheet 856(1) may also flex when this pressure is applied by the end user. The optional tab 880 as shown in FIG. 21C may also be utilized by the user to assist in the necessary bending to insert the foot 852 into the constraint 842 in all four corners of the existing window. The first intersection 866 and the second intersection 868 acting as cantilever springs, as well as the optional tab 880, also facilitate removal of the frameless supplemental window apparatus 840. Removal may be accomplished by applying inward pressure on the spacer 854 causing flexing at the intersections 866 and 868 between the spacer 854 and the sheet 856(1) and the foot 852, respectively, as well as flexing of the sheet 856(1) itself. Such inward pressure may be applied directly by the end user, for example using one's fingertips, or may be applied through optional tip 880. In one example, the constraint 842 is fabricated with a notch (not shown) along the non-adhered edge to allow for insertion and removal of the foot 852 from the slot 850 with less force required.

Once the frameless supplemental window apparatus 840 is installed by inserting the foot 852 into the slot 850, the sheet 856(1) extends parallel to the window pane 846 to provide a gap 857, such as a volume of gas, between the sheet 856(1) and the window pane 846, as shown in FIG. 21D. When using the constraint 842, the thickness or spacing of the gap 857 is determined by the combination of the height of the foot 852 perpendicular to the window pane 846 and the height of the spacer 854 in the direction perpendicular to the window pane 846 and may be adjusted based on the intended application to provide an optimal thickness for the air gap 857. When the constraint 842 is omitted and the foot 852 is adhesively attached to the window pane 846, the thickness of the gap 857 is determined by the foot 852, the spacer 854, and the adhesive 844 that is applied between the foot 852 and the surface of the window pane 846.

Next, each edge seal 860(1) constrained along each edge of the frame/sash 848 may be adjusted. The edge seal 860(1) is located around the edges of sash/frame 848 and may provide sealing between the edges of the frameless supplement window apparatus 840 and the sash/frame 848 in addition to or instead of sealing to the window pane 846. In this example, the portion of the edge seal 860(1) furthest from the coupling to the sheet 856 is advantageously mechanically isolated from each adjacent edge seal 860(1), each spacer 854 and each foot 852. The edge of the edge seal 860(1) furthest from the attachment point to the sheet 856(1) is unconstrained so that, upon mounting, the position of this edge of the edge seal 860(1) may be adjusted in position and shape when constrained by the frame/sash 848 that holds the window pane 846 to which the frameless supplemental window apparatus 840 is attached. For example, this edge may rest on the surface of the sheet 856(1) furthest from the window pane 846, or it may be forced between the sheet 856(1) and the window pane 846. Importantly, these on site adjustments require minimal end user ability and take place at the perimeter of the window pane 846, resulting in minimal impact on the optical viewing area through the existing window and the aesthetics of the window on which the frameless supplemental window apparatus 840 is mounted. In addition, contact of the edge seal 860(1) with the sash/frame 848 along each edge may beneficially constrain and adjust each edge seal 860(1).

Referring now to FIGS. 21G-21H, the edge seal 860(3) or 860(4) may be bonded (using adhesive or welding) to the flaps 870/872 located at the edges of the sheet 856(2) or 856(3). The opposing end of the edge seal 860(3) or 860(4) from the attachment to flaps 870/872 may then be constrained by the sash/frame 848, as shown in FIGS. 21G and 211, or may spiral over on itself to form an additional air gap located at the edges of the sash/frame 848, as shown in FIGS. 21H and 21J. The flaps 870 and 872 allow for substantially aligning seal materials with the profile of the formed edge 858 of the spacer 854 or other corner closure when the edge seal 860(3) or 860(4) is attached to the flaps 870/872 of the sheet 856(2) or 856(3).

Figure 22:
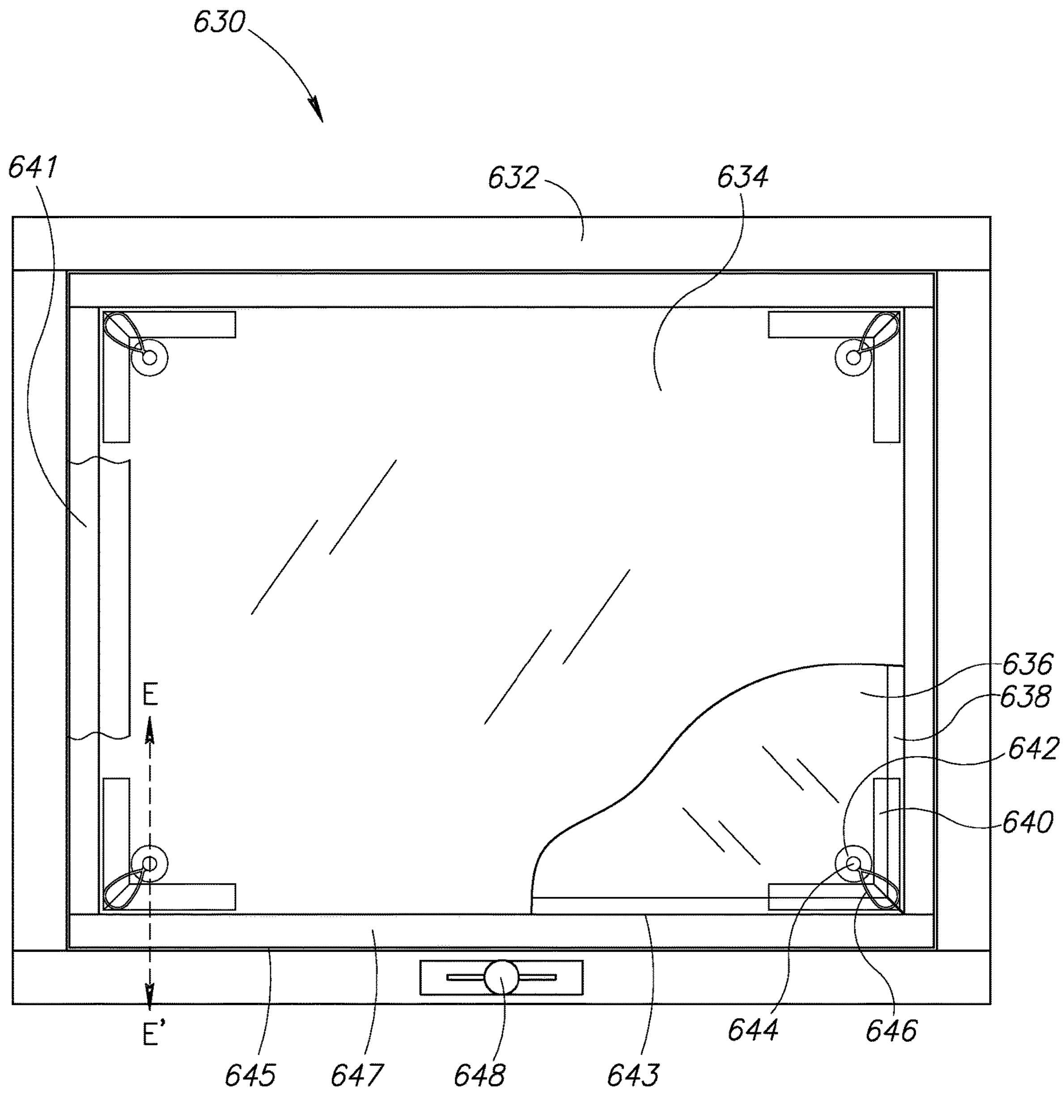
FIG. 22 is a diagram illustrating a top view of an example awning type window with a frameless supplemental installed therein.

A diagram illustrating a front view of a frameless supplemental window with infiltration blockers at each sealing interface is shown in FIG. 22. This embodiment is useful for windows that open and close by rotation at hinges, such as casement or awning windows. The infiltration blocker shown in this case is similar to that shown in FIG. 14 for the top of the top sash in the vertical sliding window. In FIG. 22, a window pane held by a sash that closes against a stop to the interior of the sash is shown. The infiltration blocker is formed such that it bends to the interior to that it contacts the stop and covers the sealing interface between the sash and the stop. Such a mechanism is useful along each sealing interface of this type of window. At the comers, where the infiltration blockers meet, the ends of infiltration blockers may be made to overlap, abut or a space may be left between the ends. In each of these cases, the corners may be closed by any means known in the art including, but not limited to, use of miter cuts, foam or pile inserts, or tape. Alternatively, the infiltration blockers shown may be modified to comprise pile, foam, felt, etc. to aid in blocking air infiltration.

Although the front view shown, generally referenced 630, is for a hinged window, such as a casement or awning window, the principles can be applied to other window types as well. The hinged window with frameless supplemental window comprises an existing window frame 632 such as found in awning windows, that is hinged along the top of the window sash. Opening and closing of the window is activated by turning a knob or crank 648. The awning window shown has a frameless supplemental window with infiltration blockers installed on the window pane 634. The sheet material 636 is partially shown for clarity purposes and normally covers nearly all or all of the window pane. The window comprises an existing window frame 632, hinged sash 647 holding the window pane 634, the frameless supplemental window 643 which includes infiltration blockers 641 along each of its four perimeter edges. For clarity, only a portion of the left infiltration blocker is shown. The supplemental window 643 comprises sheet material 636, edge seal 638, corner brace 640, post 644 with attachment mechanism 642 (e.g., suction cup), stop 645, sash 647 and spring 646. Optionally, seal materials (e.g., pile, O-ring, gel, dry adhesive material, foam, etc.) as described supra may be used. Note that the springs 646 may comprise the springs as shown in FIG. 6A describes supra.

Figure 23:
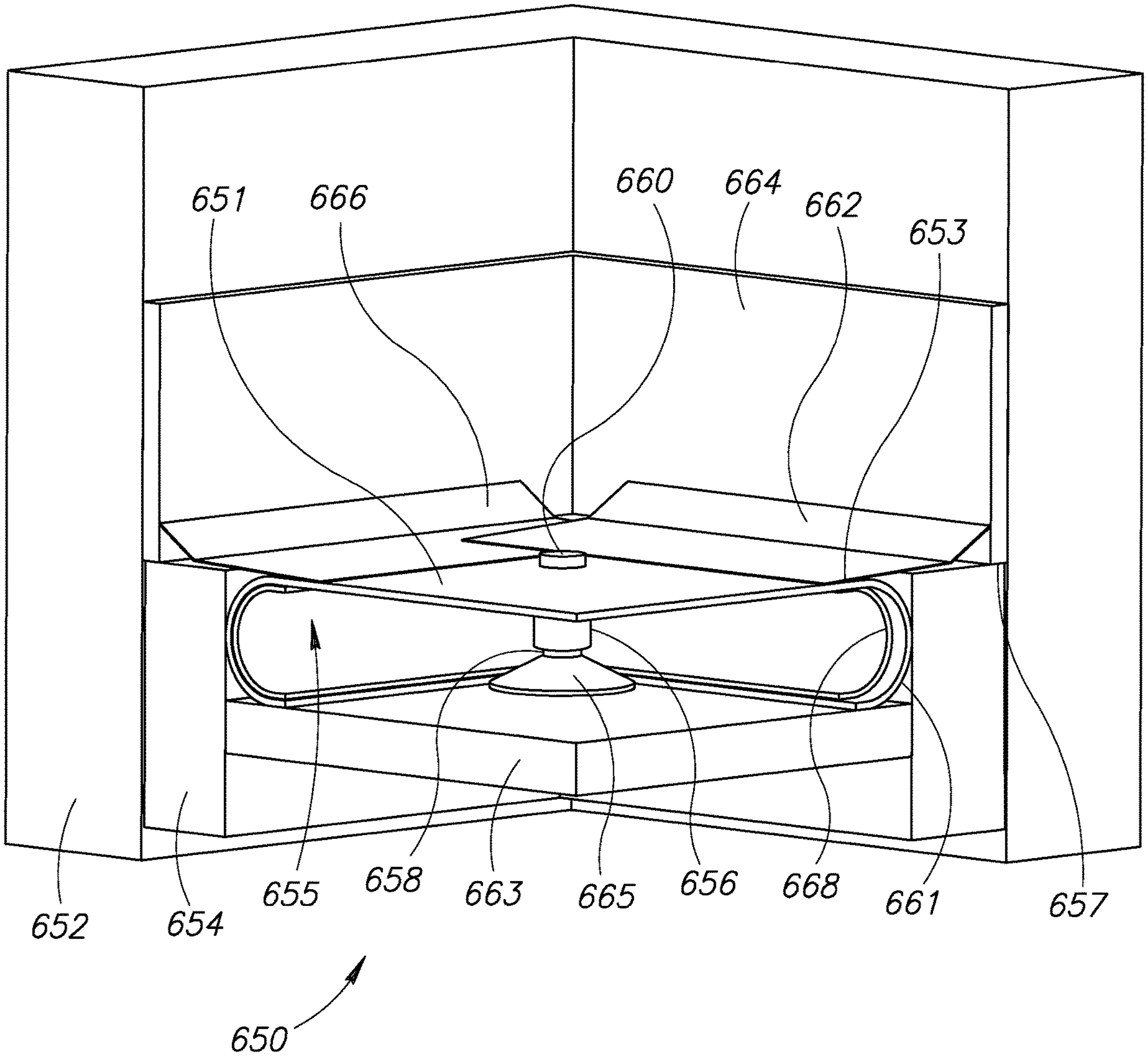
FIG. 23 is a diagram illustrating an isometric view of a corner portion of the window of FIG. 22.

A diagram illustrating an isometric view of a corner portion of the window of FIG. 22 is shown in FIG. 23. The view, generally referenced 650, shows the exterior of the window at the bottom and the interior at the top of the diagram. The isometric view comprises frame or sill 652, sash stile or rail 654, stop 664, window pane 663, sheet 651, post 658 with attachment mechanism 665 (e.g., suction cup), cap 660, spring 656, corner brace 668 and bullnose or edge seal 661. Infiltration blockers 662 and 666 are attached at the side and bottom perimeter edges, respectively, of the supplemental window 655. When the window is in the closed position as shown in FIG. 23, each infiltration blocker is forced to bend toward the interior somewhat due to contact with stop 664 and cover the sealing interface 657 between sash 654 and stop 664. When the window is opened, the bent end of each infiltration blocker that contacts stop 664 along the non-hinged sides slides across or off the surface of stop 664 while remaining attached to the supplemental window 655. When subsequently closing the window, it may be beneficial to use a thin stiff card or the like to help guide infiltration blockers inward of stop 664. The infiltration blockers are shown attached 653 to the sheet 651. In an alternative embodiment, attachment of the infiltration blockers may be made to the bullnose or edge seal 661. As described supra, the infiltration blockers may be pre-formed to have a bend, angle or arc. Note that the springs 656 may comprise the springs as shown in FIG. 6A describes supra.

Figure 24:
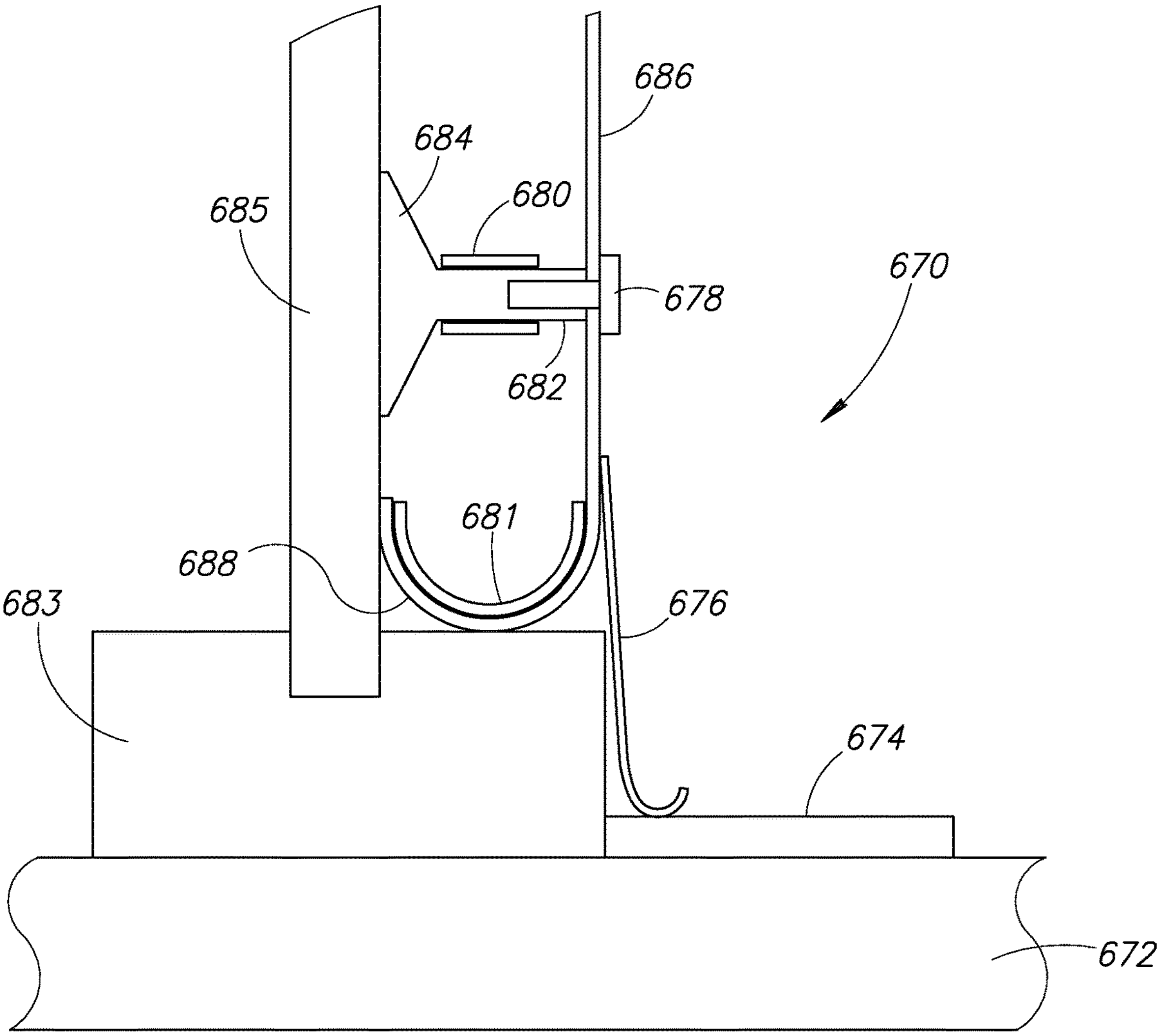
FIG. 24 is a diagram illustrating a side sectional view E-E' of the window of FIG. 22.

A diagram illustrating side sectional view E-E' of the example window of FIG. 22 is shown in FIG. 24. The side sectional view, generally referenced 670, comprises sill 672, sash 683, stop 674, window pane 685, sheet 686, post 682, attachment mechanism 684 (e.g., suction cup), cap 678, spring 680, bullnose or edge seal 688, corner brace 681 and infiltration blocker 676. The supplement window creates a substantially enclosed or trapped space (e.g., air) between the window pane 685 and sheet 686. Note that the springs 680 may comprise the springs as shown in FIG. 6A describes supra. Note also that in slice E-E' of FIG. 22, most of the spring 680 is not shown. The only portion visible is a slice of the portion 680 that wraps around the post. In addition, the infiltration blocker 676 is shown in this example embodiment attached to the sheet 686 and having a 'J' shaped tip that functions to make a mechanical seal with stop 674. Alternatively, the infiltration blocker can be configured to make a seal with the window sash 683 and the stop 674.

Figure 25:
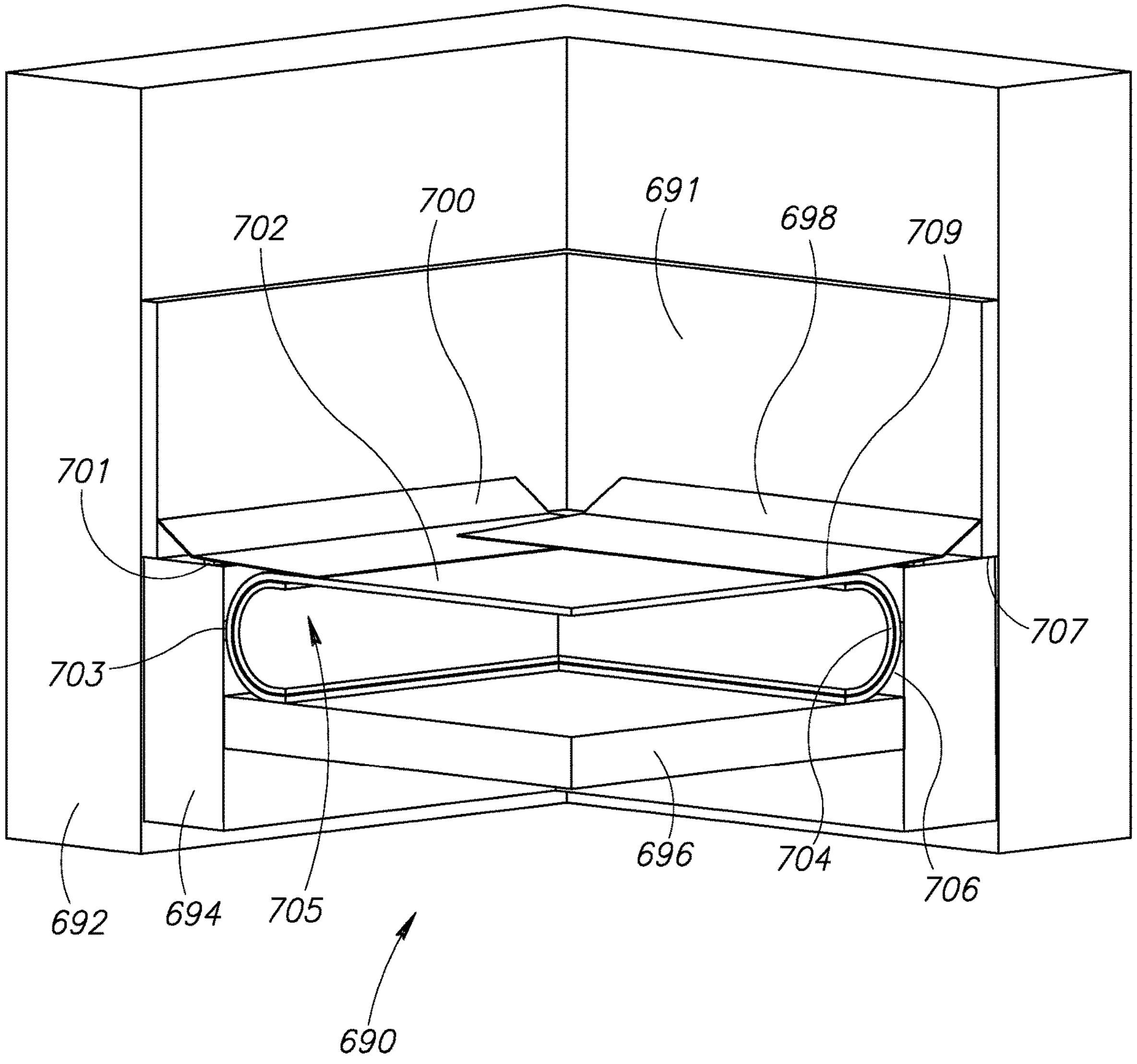
FIG. 25 is a diagram illustrating an isometric view of a corner portion of a window with a frameless supplemental window where attachment is via the infiltration blockers.

A diagram illustrating an isometric view of a lower corner portion of a window with a frameless supplemental window where attachment is via the infiltration blockers is shown in FIG. 25. The isometric view, generally referenced 690, shows the exterior of the window at the bottom and the interior at the top of the diagram. In this embodiment, the suction cup attachment mechanism is replaced with attachment via the infiltration blockers. The isometric view comprises frame, jamb or sill 692, sash stile or rail 694, stop 691, window pane 696, sheet 702, corner brace 704, optional spring (not shown) and bullnose or edge seal 706. For the embodiment shown, the infiltration blockers 698 and 700 are preferably more flexible than edge seal 706 so that the pane to sheet separation may be determined by the shape of edge seal 706. Infiltration blockers 698 and 700 are attached at the side and bottom perimeter edges, respectively, of the supplemental window 705. When the window is in the closed position as shown in FIG. 25, each infiltration blocker is forced to bend inward somewhat due to contact with stop 691 and cover the sealing interface 707 between sash 694 and stop 691. When the window is opened, the bent end of each infiltration blocker that contacts stop 691 along the non-hinged sides slides across or off the surface of stop 691 while remaining attached to the supplemental window 705. When subsequently closing the window, it may be beneficial to use a thin stiff card or the like to help guide infiltration blockers inward of stop 691. The infiltration blockers are shown attached 709 to the sheet. In an alternative embodiment, attachment of the infiltration blockers may be made to the bullnose or edge seal. As described supra, the infiltration blockers may be pre-formed to have a bend, angle or arc. Note that the springs (not shown) may comprise the springs as shown in FIG. 6A describes supra.

In one embodiment, the infiltration blocker provides the attachment of the supplemental window to the window and pane via adhesive strip 701 sandwiched between the infiltration blocker and the sash 694. Here, the infiltration blocker and adhesive 701 may function both to (1) prevent or minimize air leakage as well as (2) provide attachment to the window.

Alternatively, attachment of the supplemental window to the window and pane may be made via adhesive strip 703 sandwiched between the bullnose edge seal 706 and the sash 694. Here, the bullnose edge seal and adhesive 703 may function to trap and/or enclose a layer of air between the pane and sheet as well as provide attachment to the window.

Figure 26:
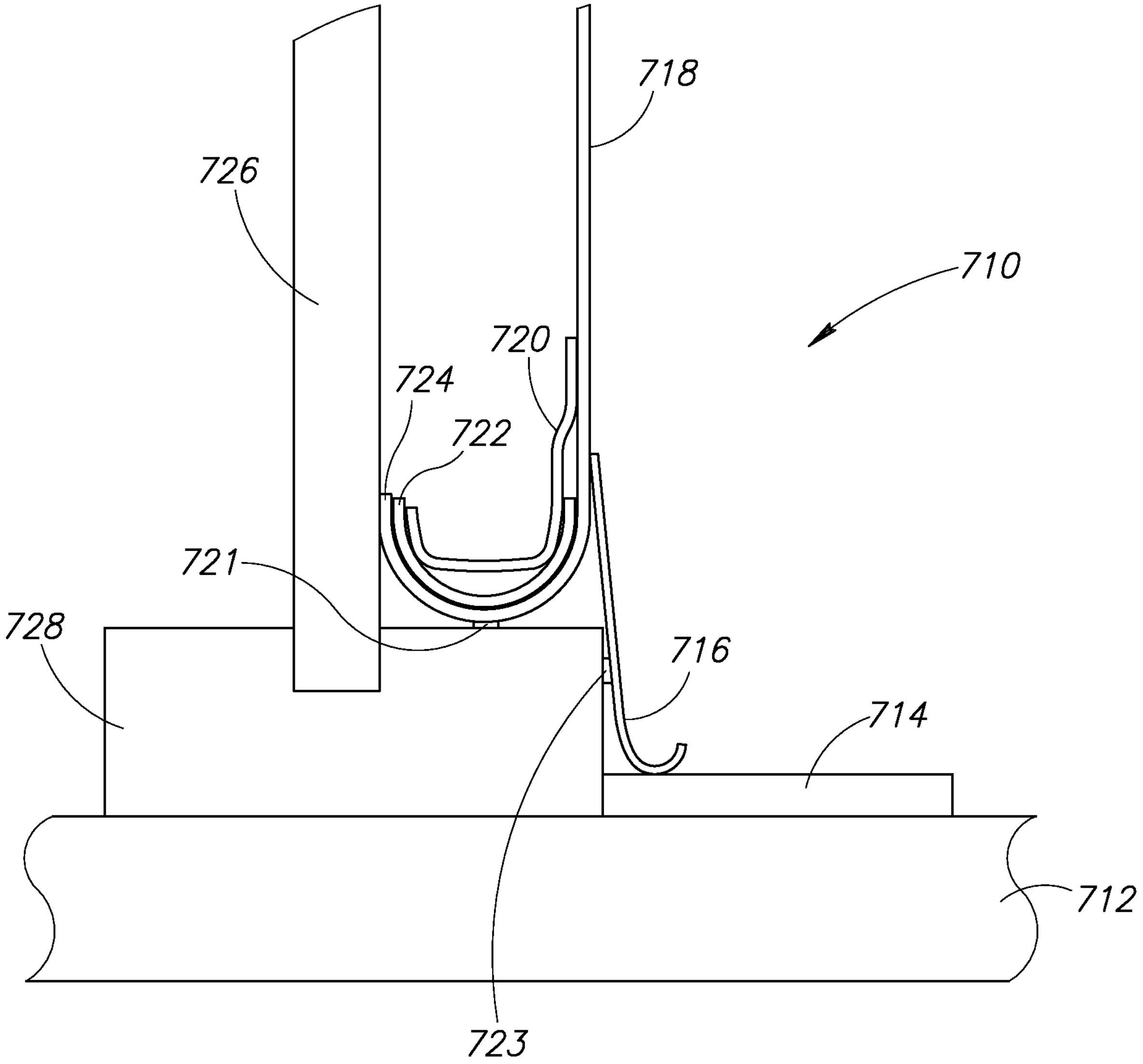
FIG. 26 is a diagram illustrating a side sectional view of the window of FIG. 25.

A diagram illustrating a side sectional view of the window of FIG. 25 is shown in FIG. 26. The side sectional view, generally referenced 710, comprises sill 712, sash 728, stop 714, window pane 726, sheet 718, bullnose or edge seal 724, corner brace 722, spring 720 and infiltration blocker 716.

The supplemental window creates a substantially enclosed or trapped space (e.g., air) between the window pane 726 and sheet 718. Note that in this embodiment the suction cup attachment mechanism is replaced with adhesive strip 721 (on the sash inward facing surface) and/or 723 (on the sash interior facing surface). Note that adhesive strip 721 and/or 723 may be used when considering a vertical or horizontal sliding window, though strip 721 may be preferred if the thickness strip 723 leads to obstruction, for example, of the opening of a vertical sliding window by sliding the lower sash upwards (or the upper sash downwards). Depending on the type of window, adhesive strip 723 may impede the opening and closing of the window while adhesive strip 721 minimizes any interference with the movement of the window. Spring 720 attached to the sheet 718 is configured to apply a force against the corner brace 722 and edge seal 724. The distance between the window pane and the sheet is set optimize the thermal insulating properties of the supplemental window. The distance may be determined by either of the edge seal, corner brace or spring by being constructed of sufficient mechanical stiffness such that the optimal distance between the pane and sheet is set and maintained. For example, the spring sets the distance when pushed toward the window pane by the end user to the point of sensing spring 720 resistance. At that point, the distance between the pane and the sheet is optimal.

The infiltration blocker 716 is shown in this example embodiment attached to the sheet 718 and having a 'T' shaped tip that functions to make a mechanical seal with stop 714. Alternatively, the infiltration blocker can be configured to make a seal with the window sash 728 and the stop 714.

Attachment to the window can be provided either via (1) adhesive strip 721 which functions to attach the edge seal 724 to the sash 728, and/or (2) adhesive strip 723 which functions to attach the infiltration blocker 716 to the sash 728.

Figure 27:
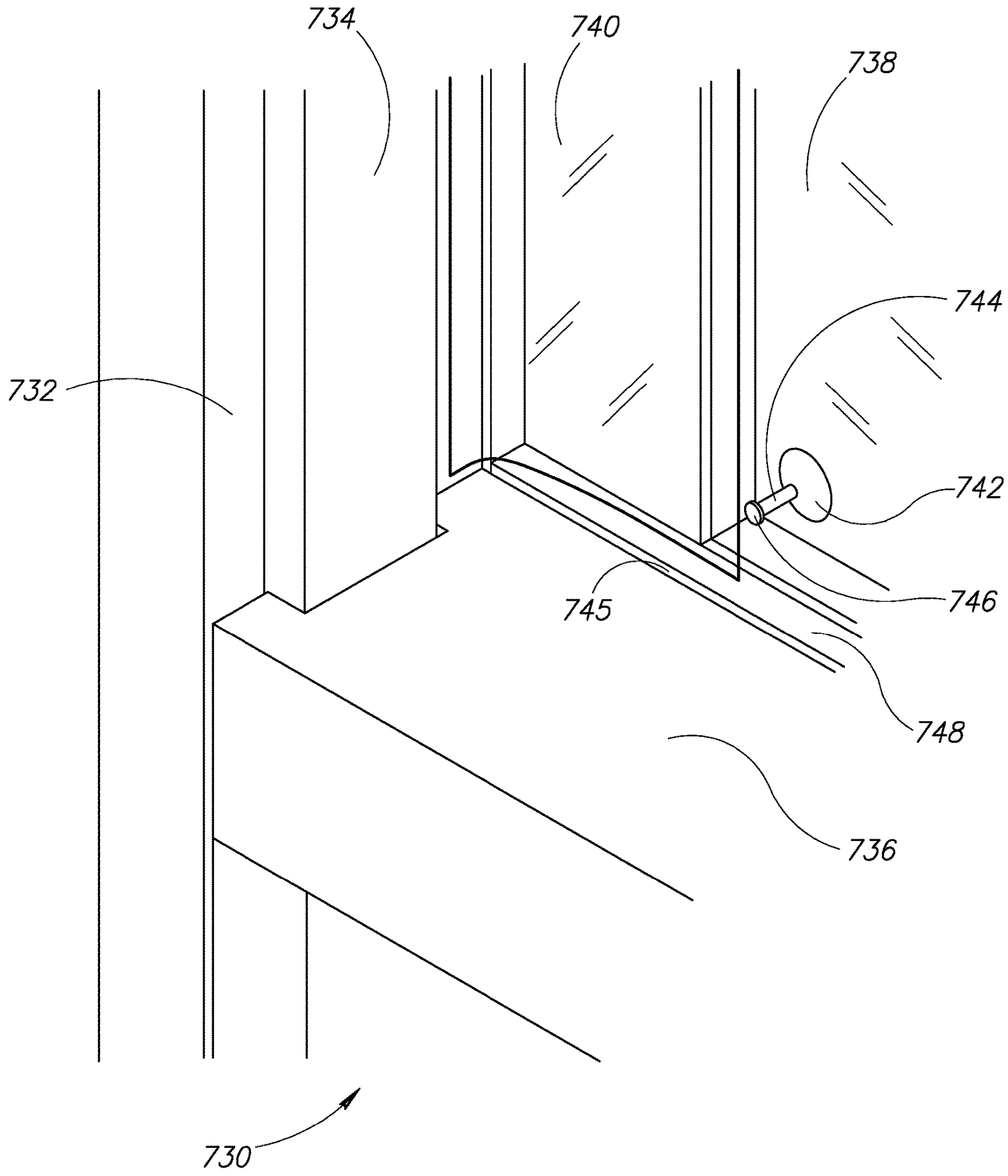
FIG. 27 is a diagram illustrating a perspective view of an example supplemental window with infiltration blocker in the area of the check rail and jamb.

A diagram illustrating a perspective view of an example supplemental window with infiltration blocker in the area of the check rail and jamb of a sliding window (e.g., double hung window) is shown in FIG. 27. In this perspective view, generally referenced 730, the infiltration blocker 740 is shown attached to the sheet 738 which is held attached to the window pane via attachment mechanism (e.g., suction cup, etc.) 742. The optimum distance between the sheet and the pane is set by the combination of the post 744 and compressed suction cup 742. The post is fastened to the sheet via cap 746. In this example, the view is of a portion of the check rail 736 and 748, respectively of the lower and upper sash, jamb or window frame 732 and track 734 of a vertical sliding window (e.g., double hung window). There is an upward facing top sash checkrail surface 748 above which that infiltration blocker 740 (shown on the left side but contemplated on both sides of the window) normally lies after installation of the supplemental window. The infiltration blocker 740 arcs or bends to fit in the space between the left edge of the lower sash and the inward facing portion of the jamb to the exterior side of the track 734 and possibly gap 745. Configuring the infiltration blocker to fit above surface 748 or the checkrail gap 745 and in the track area enables the lower sash to slide freely up as well as the upper sash to slide freely down without blocking the travel of the windows normally present without the present invention installed as well as prevent any damage to the infiltration blocker or other parts of the supplemental window when the windows are opened. It is noted that in this embodiment, the edge seal is attached to the sheet but is not shown for clarity.

In an alternative embodiment, the edge seal is omitted. In this case, the sealing function is performed by the infiltration blocker and the attaching and optimum distance setting is performed by the post and attachment mechanism.

Figure 28:
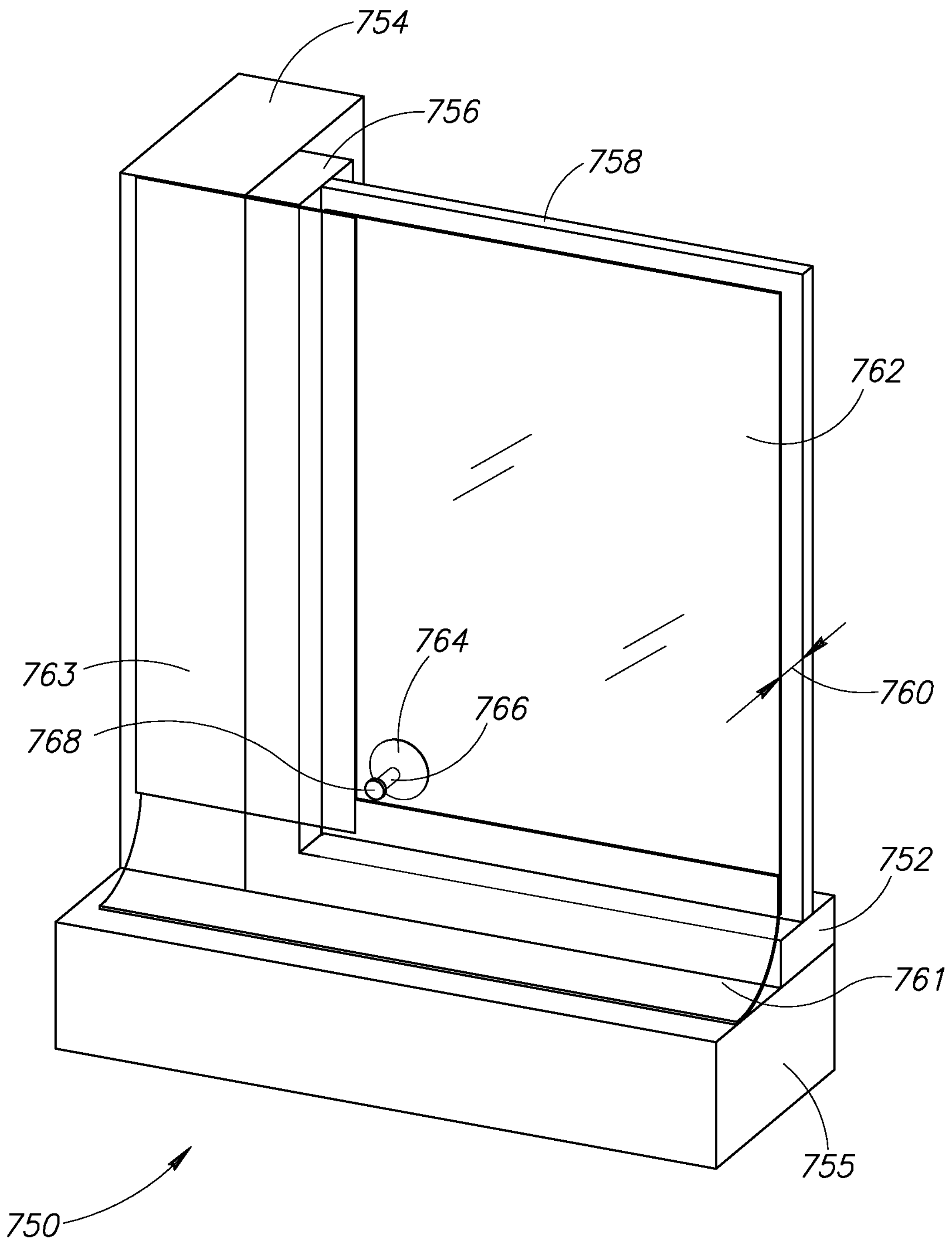
FIG. 28 is a diagram illustrating a first example frameless supplemental without a bullnose seal and incorporating infiltration blockers.

A diagram illustrating a first example frameless supplemental window without an edge seal and incorporating infiltration blockers is shown in FIG. 28. In the perspective view, generally referenced 750, the supplemental window comprises a vertical infiltration blocker 763 attached to sheet 762 and a horizontal infiltration blocker 761 attached to sheet 762. In this embodiment, there is no edge seal as in many of the embodiments described supra. Rather, the sealing function, whether mechanical, adhesive strips or other means, is provided by (1) the vertical infiltration blocker 763 which seals against the side (stile) portions of the sash 756 and (2) the horizontal infiltration blocker 761 which seals against the upper and lower (rail) portions of the sash 752. The attachment mechanism is fastened to the sheet via post 766 and cap 768. The optimum thickness for the enclosed gas layer 760 between the sheet 762 and the window pane 758 is determined by a combination of the post 766 and attachment mechanism 764. Note that in this example embodiment, infiltration blocker 761 flexes to form a smooth arc from the sheet 762 to the sill 755 and functions to prevent or minimize air leakage through one or more window elements and infiltration blocker 763 contacts jamb or frame 754 to prevent or minimize such air leakage.

Figure 29:
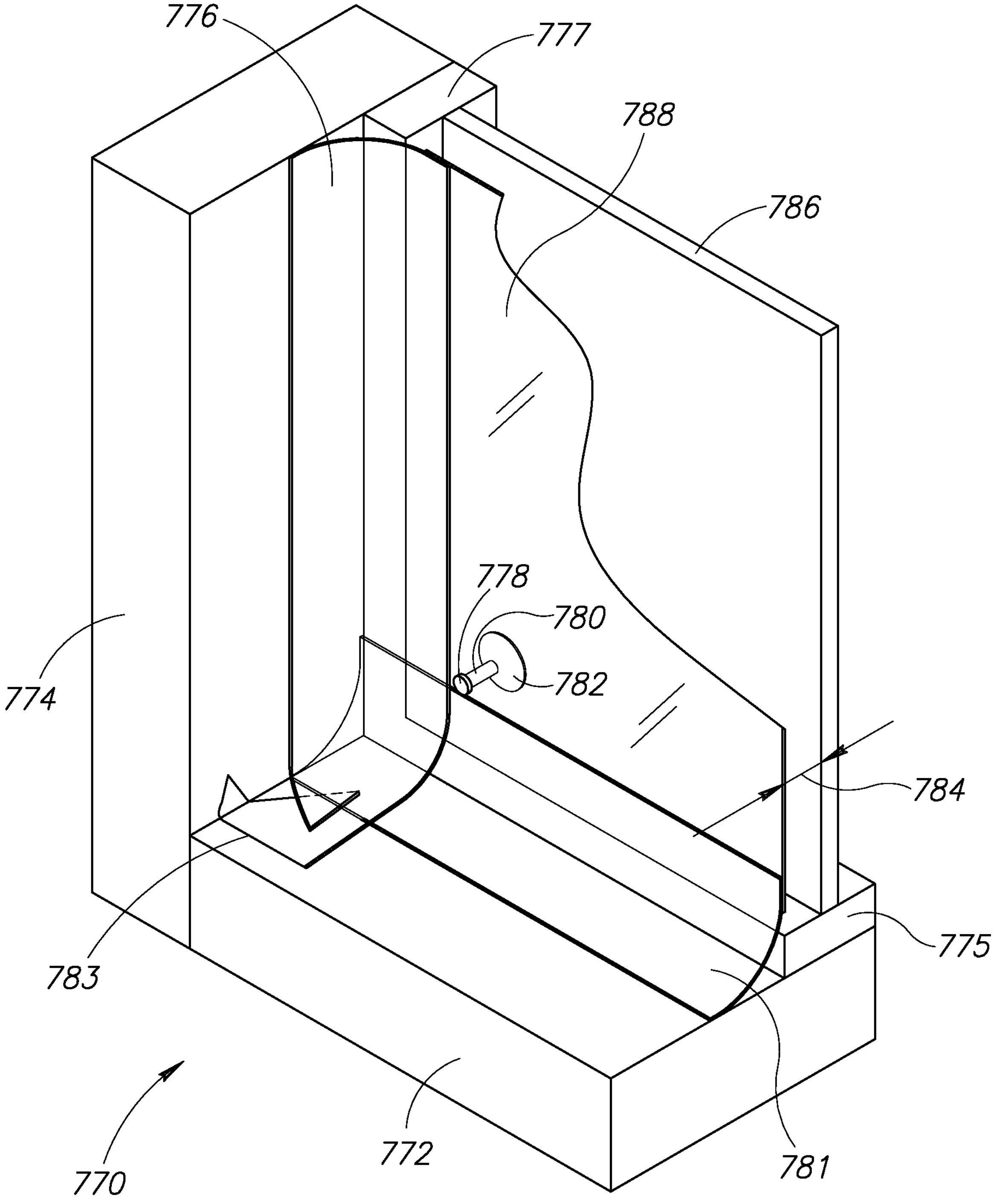
FIG. 29 is a diagram illustrating a second example frameless supplemental without a bullnose seal and incorporating infiltration blockers overlapping in corner areas.

A diagram illustrating a second example frameless supplemental window without an edge seal and incorporating infiltration blockers overlapping in corner areas is shown in FIG. 29. The perspective view, generally referenced 770, comprises sill 772, side frame or jamb 774, vertical sash (stile) 777, bottom sash rail 775, window pane 786, sheet 788, post 780, cap 778, attachment mechanism (e.g., suction cup, etc.) 782, vertical infiltration blocker 776 and horizontal infiltration blocker 781. This example embodiment lacks an edge seal for sealing. Rather, the infiltration blockers 776 and 781 function (1) to provide sealing, via mechanical, adhesive, or other means, of the enclosed or trapped layer 784 between the window pane 786 and the sheet 788, and (2) to prevent or minimize air leakage around one or more window elements. Note that in this example embodiment, infiltration blocker 776 flexes to form a smooth arc from the sheet 788 to the frame or jamb 774 while infiltration blocker 781 flexes to form a smooth arc from the sheet 788 to the sill 772. Infiltration blocker 776 is shown having been cut at its outward corner 783 to allow overlapping of each side of the cut region and enabling the infiltration blocker to easily flex in two directions. Also note that while this example embodiment lacks an edge seal for sealing to the pane for enclosing layer 784 between the pane and sheet, configuration of infiltration blockers overlapping in corners as shown in FIG. 29 may be used in embodiments that have edge seals.

Figure 30:
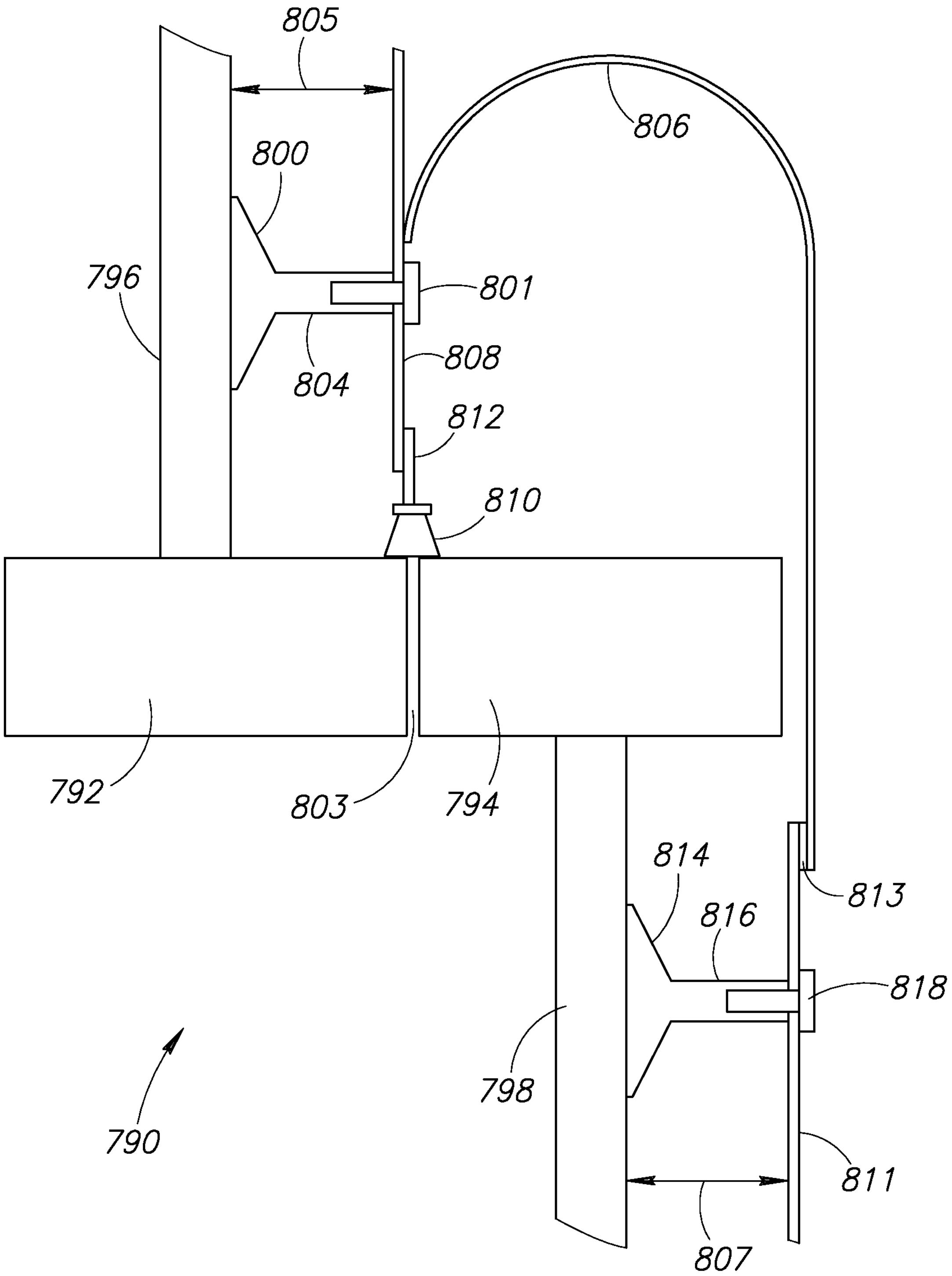
FIG. 30 is a diagram illustrating a side sectional view in the region of the check rail of a third example frameless supplemental without a bullnose seal and incorporating infiltration blockers.

A diagram illustrating a side sectional view in the region of the checkrail of a third example frameless supplemental window without an edge seal and incorporating infiltration blockers is shown in FIG. 30. Note that this embodiment is similar to that of FIG. 19 with the key difference being that the embodiment of FIG. 30 lacks an edge seal.

This sectional view, generally referenced 790, comprises a lower sash and an upper sash of a vertical sliding window. The lower sash comprises a top rail 794, window pane 798, sheet 811, post 816, cap 818, attachment mechanism 814 (e.g., suction cups) and infiltration blocker 806 that extends past the top of the sash window forming an arc and seals (e.g., mechanical, etc.) against the sheet 808 on the upper sash. The post and attachment mechanism 816, 814 sets the optimum distance between the plastic sheet 811 and window pane 798 to maximize thermal insulating properties. The upper sash comprises a bottom rail 792, window pane 796, sheet 808, post 804, attachment mechanism 800 (e.g., suction cups), cap 801 and infiltration blocking portion 810 attached to extension arm 812. The post and attachment mechanism 804, 800 sets the optimum distance between the plastic sheet 808 and window pane 796 to maximize thermal insulating properties.

The infiltration blocking portion 810 may comprise a strip of pile, foam, felt or other insulating material that is offset from the supplemental window such that it covers and preferably contacts the portions of the lower and upper sashes so as to prevent or greatly minimize air leakage through any existing gap 803 between the lower and upper sashes.

The infiltration blocker 806 is attached to sheet 811 of the supplemental window attached to the lower sash and extends over the check rail members 792 and 794 contacting sheet 808 of the upper sash. The infiltration blocker in combination with infiltration blocking portion 810 functions to enclose the close the space immediately above the check rail which may be a source of air leakage between the upper and lower sashes through gap 803 as well as prevent the transfer of gas between the enclosed air layer 807 of the supplemental window installed on the lower sash and the enclosed air layer 805 of the supplemental window installed on the upper sash.

Figure 31:
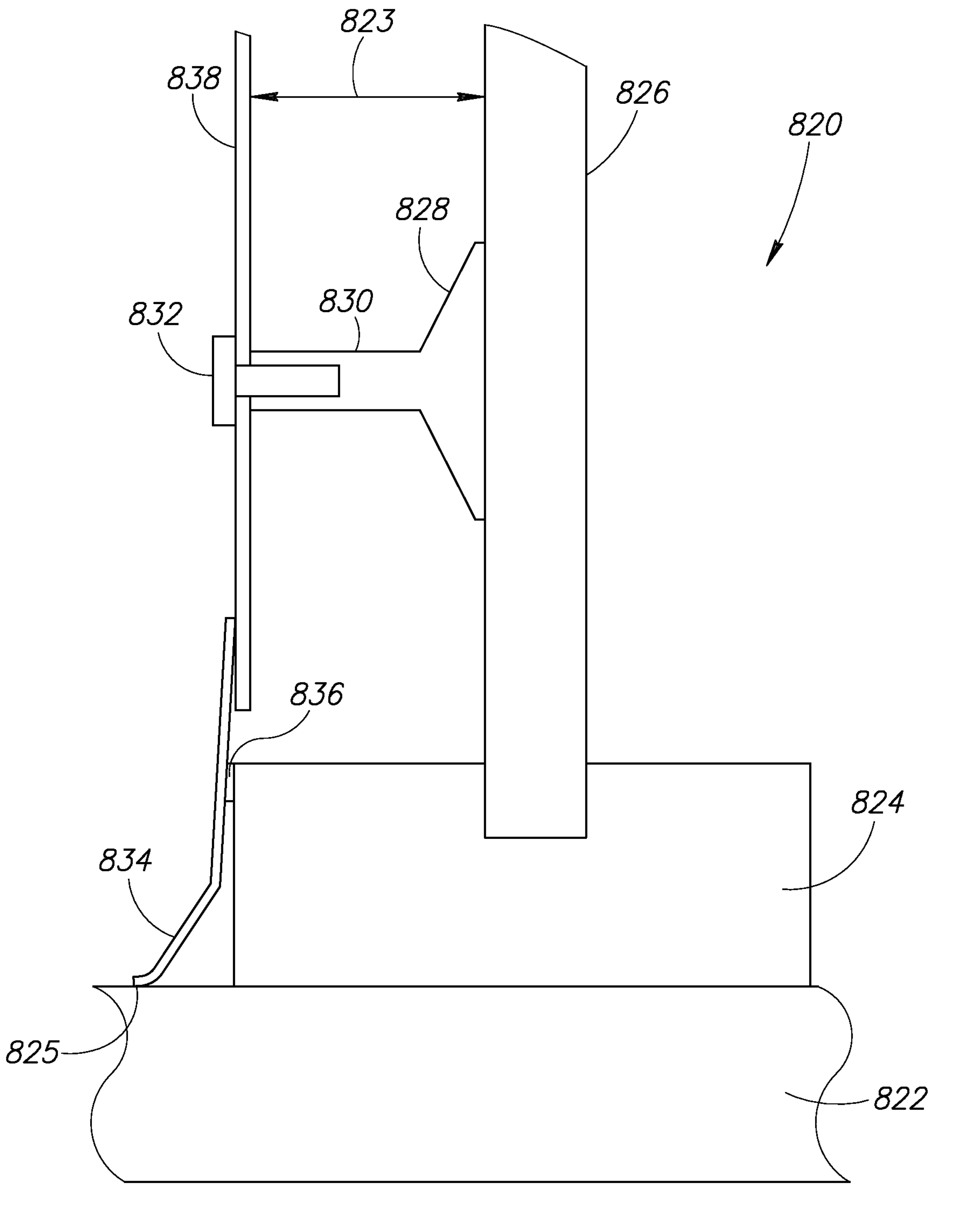
FIG. 31 is a diagram illustrating a side sectional view of a fourth example frameless supplemental without a bullnose seal and incorporating infiltration blockers.

A diagram illustrating a side sectional view of a fourth example frameless supplemental without an edge seal and incorporating infiltration blockers is shown in FIG. 31. This example embodiment, like the embodiments of FIGS. 28, 29 and 30, do not comprise an edge seal. Rather, sealing is achieved via an adhesive strip attached between the infiltration blocker and the sash rail or stile 824. The side sectional view, generally referenced 820, comprises sill or window frame or jamb 822, sash or stile 824, window pane 826, sheet 838, post 830, cap 832, attachment mechanism (e.g., suction cup, etc.) 828 and infiltration blocker 834. Lacking an edge seal, this embodiment is dependent on the seal provided by adhesive strip 836 that attaches the infiltration blocker 834 to the sash rail or stile 824. Note that the infiltration blocker 834, attached to the edge of the sheet 838, serves to seal the enclosed air layer 823 between the window pane 826 and the sheet 838. The mechanical seal 825 between the infiltration blocker and sill, window frame or jamb 822 also prevents or minimizes air leakage around one or more window elements, such as between the sash 824 and sill, jamb or frame 822.

If the sealing interface is wider than the thickness of the infiltration blocker, this enables additional methods for infiltration and exfiltration blocking at higher indoor/outdoor pressure differential by insertion of an infiltration blocker edge into the sealing interface. When the window frame has a channel, such as the jamb of a vertical sliding window, forming the edge of the infiltration blocker into a “V” or “N” shape may be beneficial. When such a shape inserted into the channel may be mechanically trapped by the sash, channel and pressure from either direction. In addition, the infiltration blocker may be formed to provide an optimal spacing over the sash/frame to provide additional insulation over the sash/frame.

Infiltration blockers illustrated in FIGS. 22 through 31 may be mounted with outward edge regions inserted into respective sealing interfaces or outward edge regions may be modified to have “V” or “N” shapes which may be inserted into the respective sealing interfaces. In such a configuration, closure of the window forces the outward edge to contact both the outward facing surface of the sash and the inward facing surface of the jamb that form the sealing interface. In this case, the outward edge region is shaped in an “N” shape, such that the outwardmost line is shorter than the jamb channel (sliding windows). This allows the infiltration blocker to be forced into either the interior or exterior facing surface of the jamb channel if a significant pressure differential exists between the indoors and outdoors.

In another embodiment, the infiltration blocker may be shaped to form a surface substantially parallel to the sash/frame and have a width similar to the sash/frame width. In such a case, it would be preferable for the end user to provide the depth of the pane in the sash to allow for design of the infiltration blocker surface parallel to the sash/frame surface gap that is optimal, similar to that preferred for the sheet to pane distance.

The infiltration blockers shown in the Figures described supra may comprise a non-porous flexible material. Thin pieces of thermoplastic film or sheet may be used, for example, polyethylene terephthalate having a thickness of approximately 0.002 to about 0.020 inch and preferably approximately 0.003 to about 0.010 inch. The thin pieces of non-porous flexible material may be attached to the plastic sheet or the edge seal along each perimeter edge of the supplemental window. The attachment to the sheet or edge seal may be accomplished by any of the means described supra, including welding (e.g., ultrasonic, laser, RF, etc.) or adhesive means. The infiltration blockers on the window sides and top are sized such that they deform, compress or bend, relative to their relaxed shapes, when in contact the window stop, jamb, frame, sill or header, thus covering potential infiltration regions between the sash stiles or sash rails and the respective jambs, frames, sill or header when the window is in the closed position. The edges of the edge seal and infiltration blockers that are not attached to the supplemental window may be curled, curved, polished or beaded to avoid exposed sharp edges.

The infiltration blockers described herein may be used in conjunction with any of the embodiments described supra. In addition, such infiltration blockers may be used in embodiments that omit the sheet of a supplemental window. Thus, in general, the infiltration blockers may be attached directly to a supplemental window part such as a post, seal or sheet. When used without the sheet material, attachment of the infiltration blocker to the window directly, or indirectly by attachment to a post or seal which in turn is attached to the window, is accomplished by the mechanisms described herein, e.g., suction cups, adhesives, dry adhesives, etc. or welding or adhering to other parts described herein.

While the embodiments described supra provide for attachment of the infiltration blocker to the supplemental window which in turn is attached to a window pane, attachment mechanisms may be used to releasably attach the infiltration blocker to one or more of the pane, sash rail or stile, jamb, frame casing, sill or header of the window.

As described supra, the infiltration blocker may form an angle, bend or arc such that sealing surfaces or extensions of such sealing surfaces through which infiltration may occur are contacted by the infiltration blocker on two sides of the sealing interface to the interior or inward of the sealing interface. Angles, bends or arcs in the infiltration blockers may be pre-formed by thermoforming or cold forming or bending such that the infiltration blocker may still undergo deformation when mounted, due to contacting a window surface (e.g., sill, jamb, frame, sash or header) or another supplemental window.

In each embodiment described supra, in addition to the attachment mechanisms described for mounting, a safety feature (e.g., a clip) attaching to a portion of the window not used for mounting (e.g., a frame, a sash or a protruding muntin) may be included. When provided, the safety feature is in mechanical communication with the frameless supplemental window such that in case of failure of the various attachment mechanisms described supra, the safety feature inhibits the frameless supplemental window from falling away from the fenestration.

Note that corner braces and constraints can be fabricated, for example, by injection molding, thermoforming or three-dimensional printing methods. As part of extrusion for fabricating the sheet and edging parts, injection molding or 3D printing operations for fabricating corner braces and constraints, printing, embossing or other means of part identification, material type and recyclability, installation instructions and mating indicators may be imparted on each such part. Other aspects of fabrication may include the chopping, cutting or slitting of materials, application of adhesives and associated protective covers for applied adhesives and packaging material. Another example of fabrication may include, prior to packaging, edge seals as shown in FIGS. 21A through 21F may each be wound tightly back on itself and kept tightly wound using adhesive (e.g., glue or tape attachment to the sheet material) or a clip to keep the edge seal in a tube-like state through mounting. Once mounted, the adhesive connection may be broken or the clip removed to allow the wound edge seal to relax and compress against the window pane and/or sash/frame. Formation of the sheet, edge seal and other supplemental window parts described supra into a custom supplemental window during fabrication may be performed to minimize installation complexity. Such formation may be by adhesive, or preferably welding, heat sealing, mechanically, etc. to aid in end-of-life recycling or re-use of the materials.

When an end user no longer wishes to use the custom supplemental parts, for example due to moving to a different location, the custom supplemental parts may be recycled or re-used by a subsequent occupant at the location of the installation. When recycling the custom supplemental parts, such recycling may be achieved by the end user through a local recycling program, sent to a local retailer for recycling or sent to the service provider for recycling. When sent to the service provider for recycling, the custom supplemental parts may also be resold, with refurbishment or remanufacturing if necessary, to a different end user having similar, though perhaps slightly different, design requirements as the original end user. For example, the shape of a plastic sheet might be altered slightly by cutting along an edge while other components are re-used without modification.

Alternatively, the service provider may separate the custom supplemental parts from multiple end users so that such parts may be recombined in different combinations to meet the design requirements of a new end user. Another recycling route that may be used by the service provider or fabricator is to have the received parts enter a recycling stream in which the parts re-enter a manufacturing stream at a raw material stage where they are reformed into a new shape or part. The materials used for corner braces, the plastic sheet, or the edging may be chosen to optimize certain characteristics, depending on the part and end user design choices. It is preferred that the materials used for each part are chosen so that each part may be reused, recycled or remanufactured.

For use as corner braces, supports, or posts, materials having sufficient stiffness while providing the supplemental window mechanical stability are desirable. As the custom supplemental parts may be exposed to sunlight for extended periods, ultraviolet stabilizers can be added to the materials to maintain optical and mechanical properties or materials with inherent stability to ultraviolet and visible light may be chosen. Suitable materials for the plastic sheet or edging include, polyethylene terephthalate, polyethylene terephthalate glycol-modified, acrylic such as polymethylmethacrylate, polyvinyl chloride, cellulose acetate, or polycarbonate as well as ultraviolet stabilized polypropylene or polyethylene. Flexible glass may also be suitable for use as a sheet material.

Plastic materials that may be useful for one or more of the supplemental window components may include vinyl, such as polyvinyl chloride or acrylic, polyethylene, polypropylene, or polycarbonate. When polycarbonate is used, polycarbonates may include those that are made by reacting carbon dioxide with organic compounds such as epoxides.

For use as edging material, materials that are also flexible and easily bent and shaped are preferred. For example, polyethylene terephthalate may be used in a thickness range of approximately 3 to 8 mil to allow for on-site adjustment of the edge seal by the spring, though a larger thickness may be used if no adjustment capability is required. If the supplemental window apparatus is used to provide protection of the window pane from potentially destructive forces, edging material thickness up to that of the sheet thickness may be beneficial as well, as destructive forces may be dissipated through deformation of the edge seal as well as deformation of the sheet. If transparency of the window opening is desired, materials having relatively high transparency, clarity and gloss as well as low haze are useful in the present invention. For use as spring material, polyethylene terephthalate strip and ring in a thickness range, respectively, of approximately 10 to 60 mil and approximately 5 to 20 mil has been found to yield acceptable results. For use as infiltration blocker material, a transparent, flexible non-porous material may be used such as polyethylene terephthalate in a thickness range of approximately 2 to 10 mil.

Additionally, the plastic sheet, edge seal and/or infiltration blocker may comprise other materials dispersed within it or in the form of layers. For example, a plastic sheet, edge seal or infiltration blocker comprising other materials is particularly useful when emissivity, transmittance, absorptance and/or reflectance control is desired. One type of such material may be the addition of a laminate, for example a multilayer laminate comprising an infrared reflective layer and a scratch resistant layer such as those found in currently available window films. Such sheets, edge seals or infiltration blockers may include materials such as transparent plastic that has been metalized or dyed, or may comprise ceramic (inorganic oxides such as tin oxide or indium oxide, or metal hexaboride or metal nitride or metal oxynitride or metal silicide, preferably less than 200 nm in diameter, more preferably less than 100 nm in diameter) film laminates that are applied as a thin layer to transparent sheets. Such materials may also act as a filter for reflecting most ultraviolet and/or infrared wavelengths while allowing transmission of visible light. For the purpose of laser welding, the plastic sheet or edging may comprise an infrared absorber near the joining surface of one of the parts to be welded.

Alternatively, the plastic sheet and/or edging may comprise materials that control the visible light transmitted for effecting privacy purposes. When using emissivity or reflectivity control layers or treatments, the sheet may be mounted on the interior or exterior side of the window pane to provide the surface treatment location that provides optimal energy savings. For example, during cold weather seasons, mounting a low-e or infrared reflective material to the interior of the pane is preferred, while during hot weather seasons it is preferable to mount the low-e or infrared reflective material to the exterior of the pane.

The plastic sheet may also have printing on the portion through which the window pane is visible. Such printing may include logos, decals or figures for desired aesthetic purposes, or line patterns, such as those used to inhibit bird strikes on the window. For plastic sheet parts, mechanical, optical and thermal conduction properties of the sheet may be optimized in different ways depending upon the end user product choices. When used on the exterior of the original window, high impact resistance may be desirable.

In the foregoing, use of expressions such as "comprise", "include", "incorporate", "is", "are", "have", "contain" are not intended to be exclusive, namely such expressions are to be construed to allow other unspecified items also to be present. Reference to the singular is to include reference to the plural and vice versa. In the accompanying claims, numerals included within parentheses (if any) are for assisting understanding of the claims and are not intended to influence claim scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A supplemental window apparatus comprising:

a substantially non porous sheet material having dimensions corresponding to a perimeter area of a windowpane of a window;

a spacer and attachment mechanism configured to attach the supplemental window apparatus to the windowpane with the sheet material positioned substantially parallel to the windowpane, wherein the spacer and attachment mechanism determine a distance between the windowpane and the sheet material when the supplemental window apparatus is attached to the windowpane;

a plurality of infiltration blockers attached to the sheet material and configured to substantially enclose a volume of gas between the windowpane and the sheet material when the supplemental window apparatus is installed on the window, the plurality of infiltration blockers each attached to the sheet material along respective edges of the sheet material, wherein infiltration blockers of the plurality of infiltration blockers attached to adjacent edges of the sheet material contact each other at a location proximate to a corner perimeter area of the sheet material, wherein a first infiltration blocker of the plurality of infiltration blockers attached along a first edge of the sheet material overlaps a second infiltration blocker of the plurality of infiltration blockers attached along a second edge of the sheet material, wherein the second edge is adjacent to the first edge.

2. The apparatus according to claim 1, wherein the first infiltration blocker and the second infiltration blocker overlap each other at the corner perimeter area of the sheet material.

3. The apparatus according to claim 1, wherein the first infiltration blocker and the second infiltration blocker overlap each other at a location outward from the corner perimeter area of the sheet material.

4. The apparatus according to claim 1, wherein the infiltration blockers attached to the sheet material along adjacent edges abut one another.

5. The apparatus according to claim 1 further comprising an adhesive configured to couple the infiltration blockers attached to adjacent edges of the sheet material at the corner perimeter area of the sheet material to enclose the volume of gas between the windowpane and the sheet material.

6. The apparatus according to claim 1, wherein at least one of the plurality of infiltration blockers contacts at least one window element of the window when the supplemental window apparatus is mounted to the windowpane.

7. The apparatus according to claim 6, wherein the at least one of the plurality of infiltration blockers further comprises an adhesive strip configured to attach the at least one of the plurality of infiltration blockers to the at least one window element.

8. The apparatus according to claim 6, wherein the at least one of the plurality of infiltration blockers is configured to flex when in contact with the at least one window element when the supplemental window apparatus is mounted to the windowpane.

9. The apparatus according to claim 6, wherein the at least one window element is one of a muntin, a sash, or a window frame of the window.

10. The apparatus according to claim 1, wherein the substantially non porous sheet material is rectangular in shape and comprises four infiltration blockers.

11. The apparatus according to claim 10, wherein a first infiltration blocker of the four infiltration blockers contacts a first window element of the window including the windowpane and a second infiltration blocker of the four infiltration blockers contacts a second window element of the window.

12. The apparatus according to claim 11, wherein the first window element is a sash or frame of the window and the second window element is a muntin of the window.

13. The apparatus according to claim 11, wherein the first window element is a first muntin of the window and the second window element is a second muntin of the window.

14. The apparatus according to claim 11, wherein the first window element is a sash or frame of the window and the second window element is a sash or frame of the window.

15. The apparatus according to claim 1, wherein the each of the plurality of infiltration blockers are located at a perimeter area of the sheet material and extend over only a portion of the sheet material.

16. The apparatus according to claim 1 further comprising an edge seal coupled to the sheet material.

17. The apparatus according to claim 16, wherein each of the plurality of infiltration blockers are attached to the edge seal.

* * * * *